US012464109B2

(12) United States Patent
Shimizu et al.

(10) Patent No.: US 12,464,109 B2
(45) Date of Patent: Nov. 4, 2025

(54) AIR FLOATING VIDEO DISPLAY APPARATUS

(71) Applicant: Maxell, Ltd., Kyoto (JP)

(72) Inventors: Takuya Shimizu, Kyoto (JP); Kazuhiko Tanaka, Kyoto (JP); Koji Hirata, Kyoto (JP); Koji Fujita, Kyoto (JP); Katsuyuki Watanabe, Kyoto (JP)

(73) Assignee: Maxell, Ltd., Kyoto (JP)

( * ) Notice: Subject to any disclaimer, the term of this patent is extended or adjusted under 35 U.S.C. 154(b) by 0 days.

(21) Appl. No.: 18/840,145

(22) PCT Filed: Feb. 8, 2023

(86) PCT No.: PCT/JP2023/004232
§ 371 (c)(1),
(2) Date: Aug. 21, 2024

(87) PCT Pub. No.: WO2023/162690
PCT Pub. Date: Aug. 31, 2023

(65) Prior Publication Data
US 2025/0168319 A1    May 22, 2025

(30) Foreign Application Priority Data
Feb. 22, 2022  (JP) ................................. 2022-025857

(51) Int. Cl.
*H04N 13/366* (2018.01)
*G02B 30/56* (2020.01)
(Continued)

(52) U.S. Cl.
CPC ........... *H04N 13/366* (2018.05); *G02B 30/56* (2020.01); *H04N 13/172* (2018.05);
(Continued)

(58) Field of Classification Search
CPC ........ G02B 30/56; G09F 9/00; H04N 13/122; H04N 13/172; H04N 13/275;
(Continued)

(56) References Cited

U.S. PATENT DOCUMENTS

| 2010/0110384 A1* | 5/2010 | Maekawa | ............... G03B 35/18 353/10 |
| 2013/0009862 A1* | 1/2013 | Chan | ................... G02B 27/0093 353/30 |

(Continued)

FOREIGN PATENT DOCUMENTS

| JP | 2019-128722 A | 8/2019 |
| WO | 2020/194699 A1 | 10/2020 |
| WO | 2021/171403 A1 | 9/2021 |

OTHER PUBLICATIONS

International Search Report and Written Opinion mailed on May 9, 2023, received for PCT Application PCT/JP2023/004232, filed on Feb. 8, 2023, 08 pages including English Translation.

*Primary Examiner* — Shahan Ur Rahaman
(74) *Attorney, Agent, or Firm* — XSENSUS LLP

(57) ABSTRACT

An air floating video display apparatus includes: a video display configured to display a video; a retroreflection plate; an imager; and a controller, a light flux reflected by the retroreflection plate forms an air floating video, the controller can set a virtual position of a 3D model, the video display displays a video, a video for stereoscopic viewing is displayed in the air floating video as a real image, and the virtual position of the 3D model set by the controller is a position shifted relative to a position of the air floating video which is a real image formed in air, in a direction opposite to a traveling direction of principal ray when the light flux reflected by the retroreflection plate forms the air floating video.

5 Claims, 38 Drawing Sheets

(51) Int. Cl.
*H04N 13/172* (2018.01)
*H04N 13/275* (2018.01)
*H04N 13/30* (2018.01)
*H04N 13/302* (2018.01)
*H04N 13/398* (2018.01)

(52) U.S. Cl.
CPC ......... *H04N 13/275* (2018.05); *H04N 13/302* (2018.05); *H04N 13/398* (2018.05); *H04N 2013/40* (2018.05)

(58) Field of Classification Search
CPC .. H04N 13/279; H04N 13/302; H04N 13/346; H04N 13/366; H04N 13/398; H04N 2013/40
See application file for complete search history.

(56) References Cited

U.S. PATENT DOCUMENTS

| | | | |
|---|---|---|---|
| 2018/0024373 A1 | 1/2018 | Joseph et al. | |
| 2019/0227489 A1* | 7/2019 | Tokuchi | G06V 40/113 |
| 2022/0155614 A1 | 5/2022 | Kikuta | |

* cited by examiner (1)

(2)

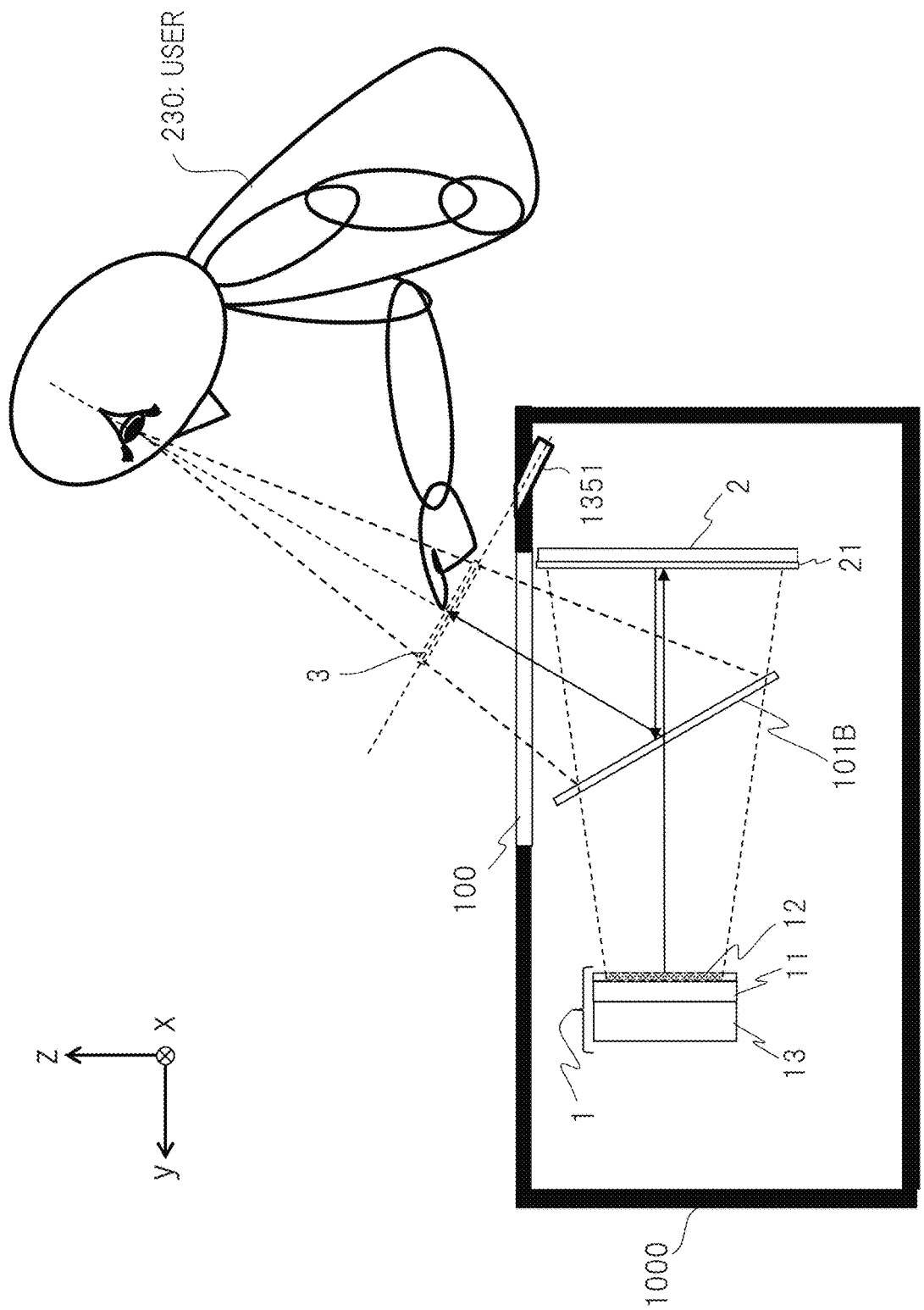

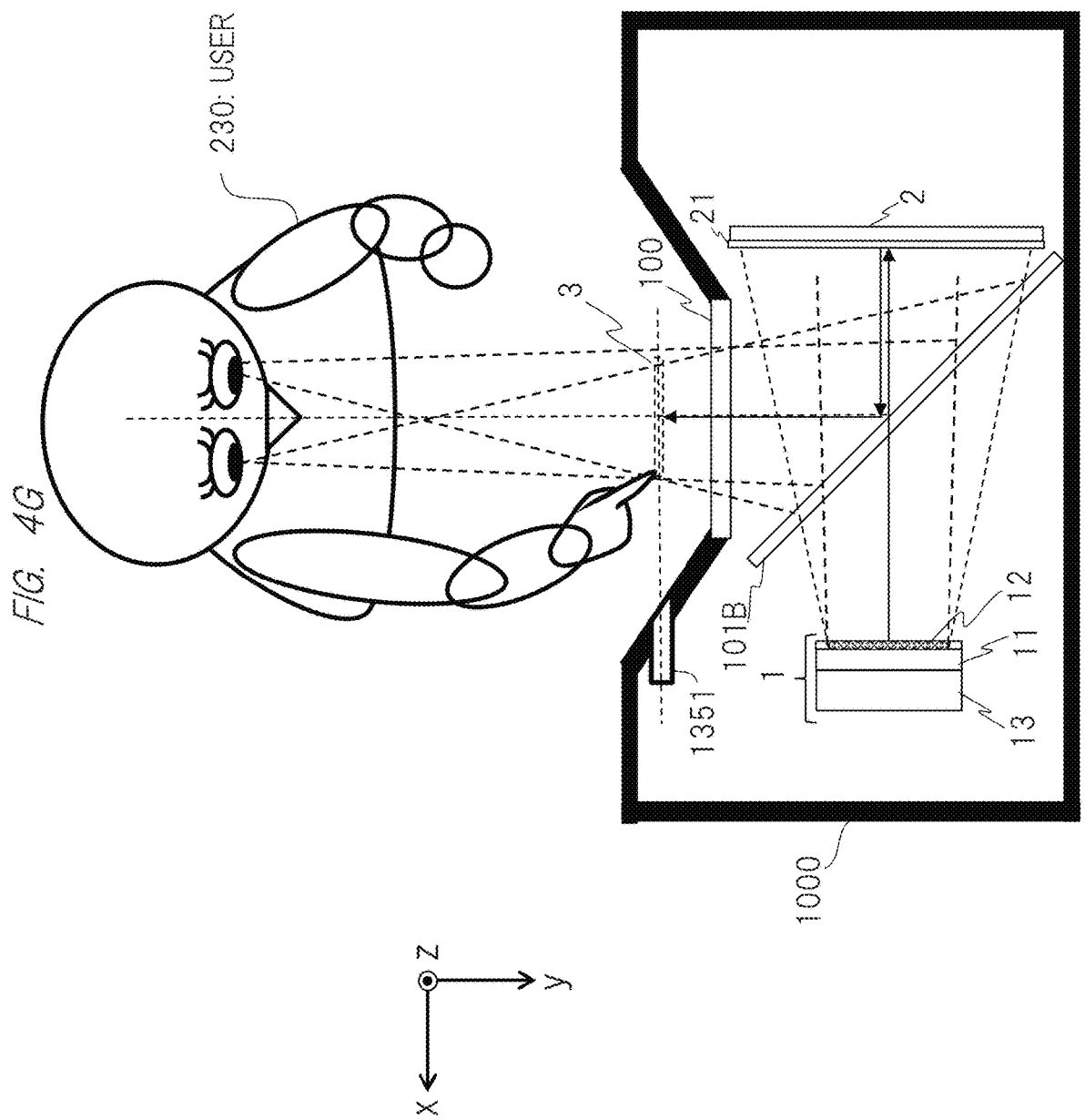

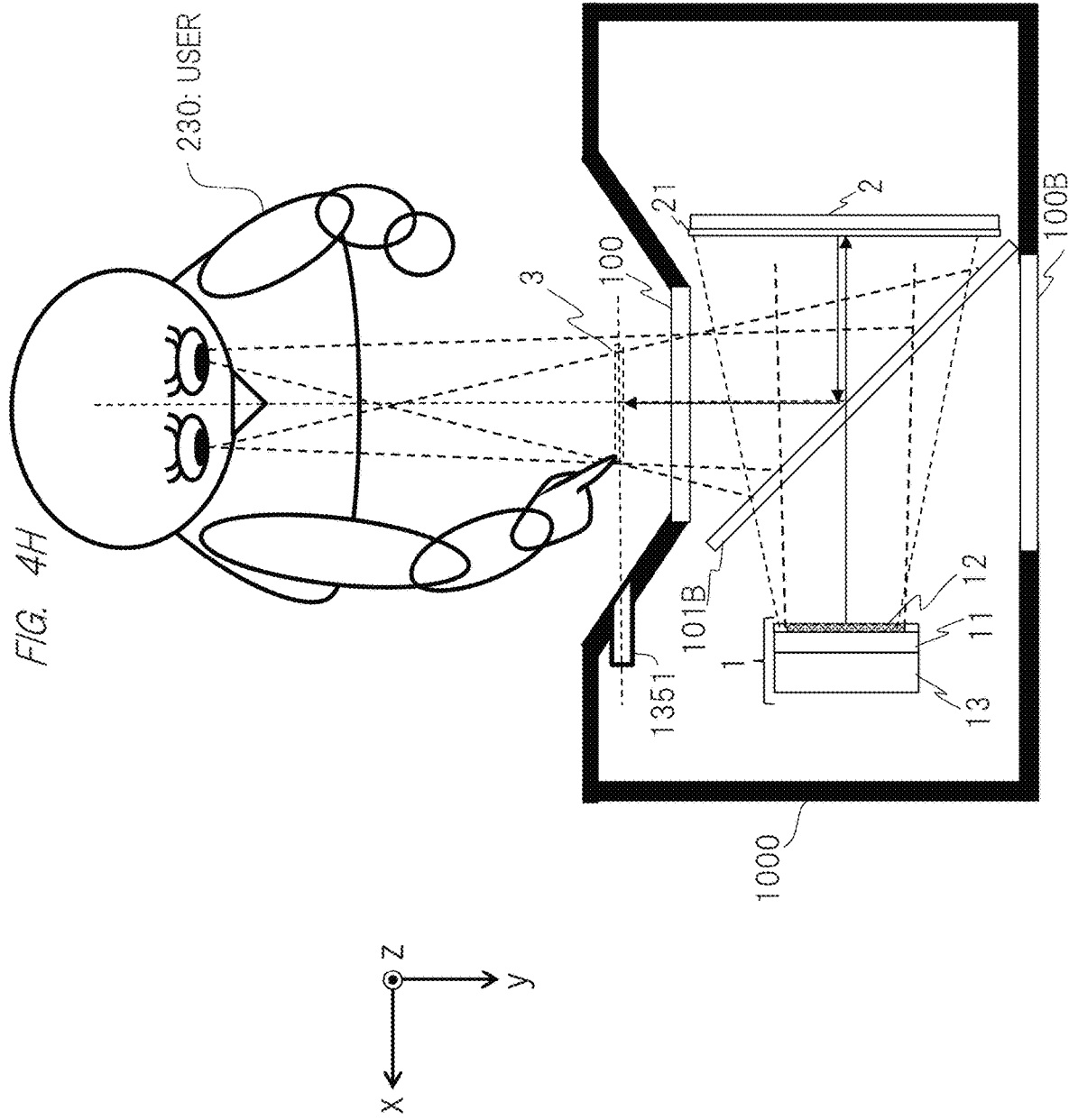

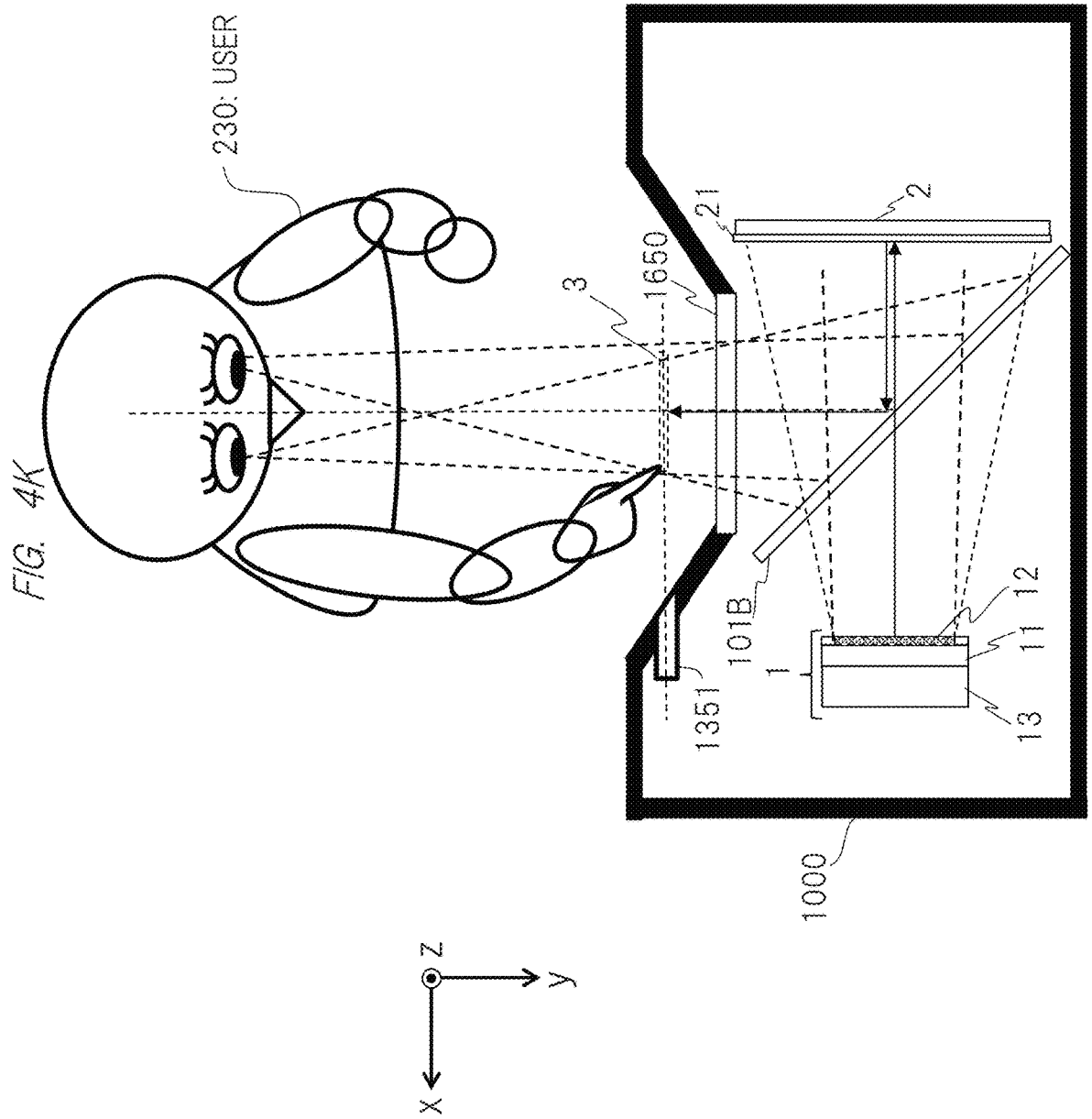

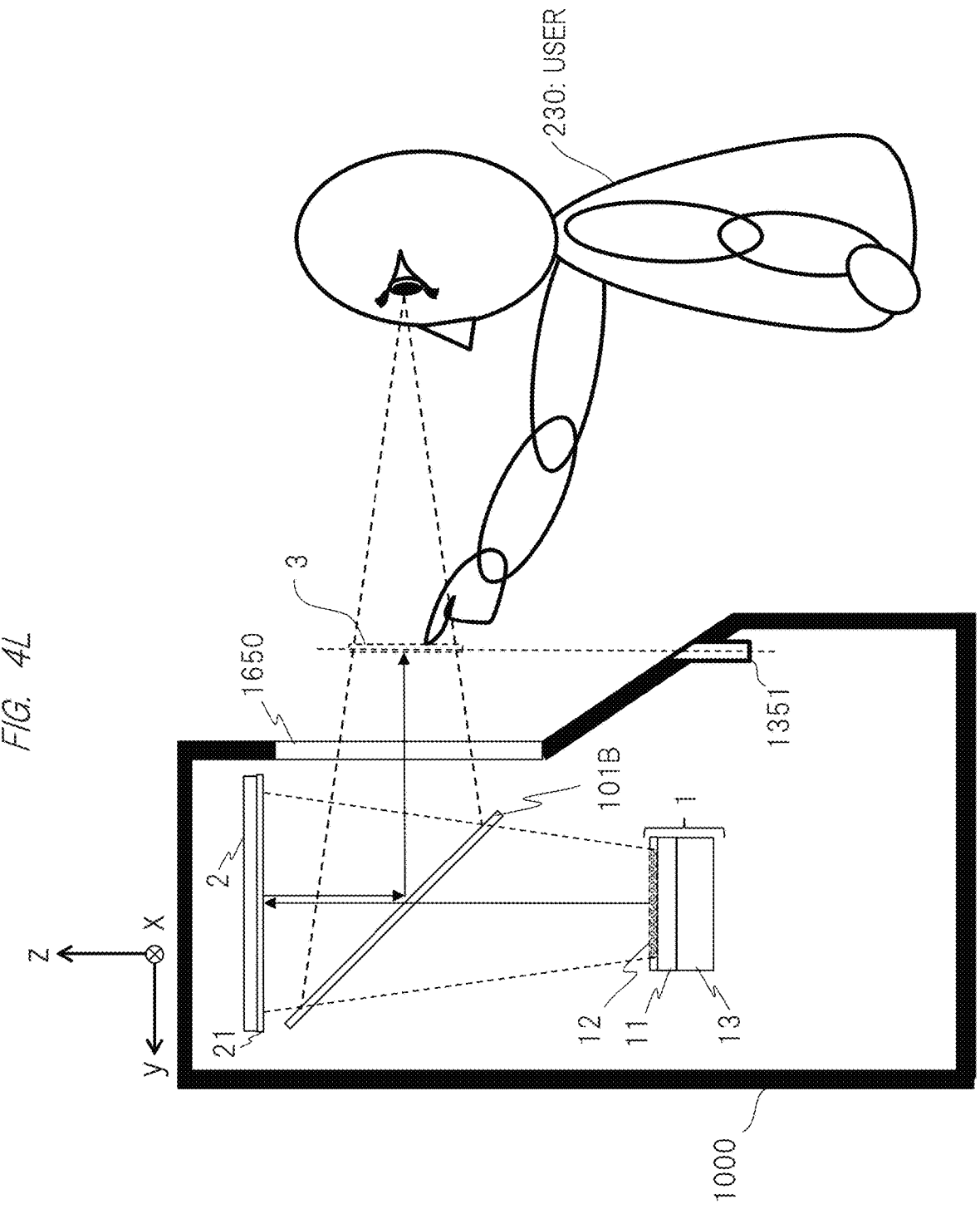

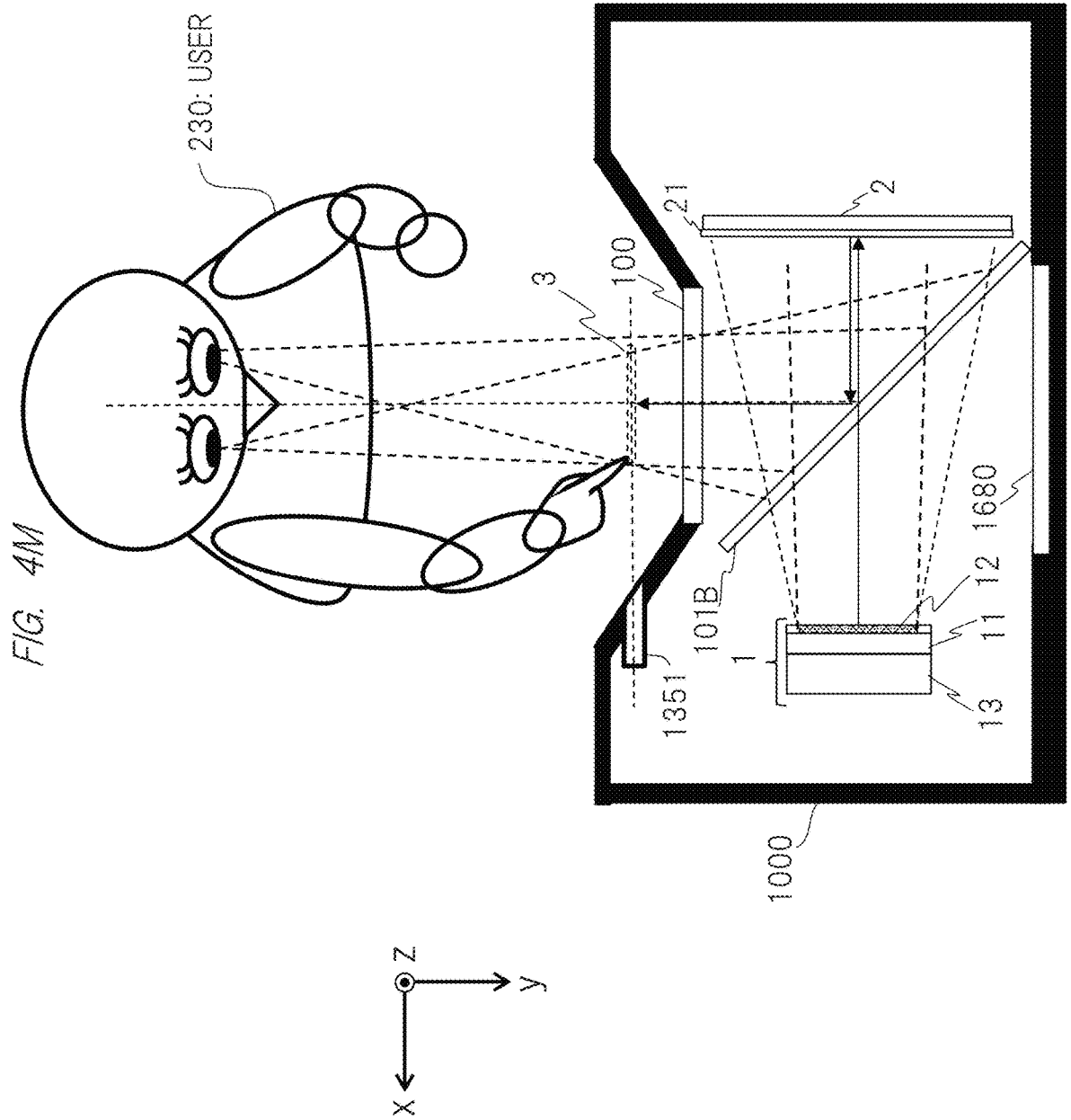

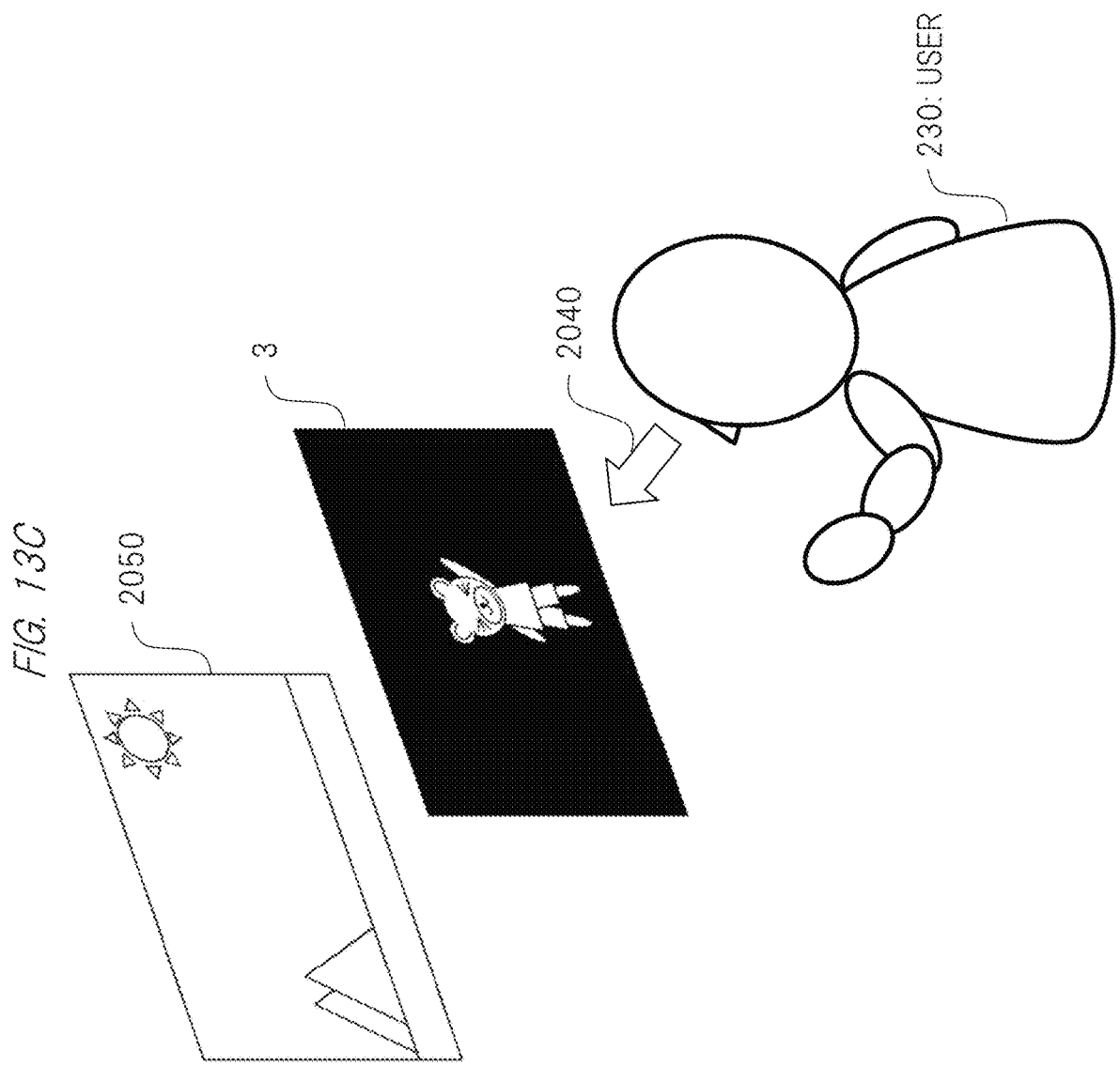

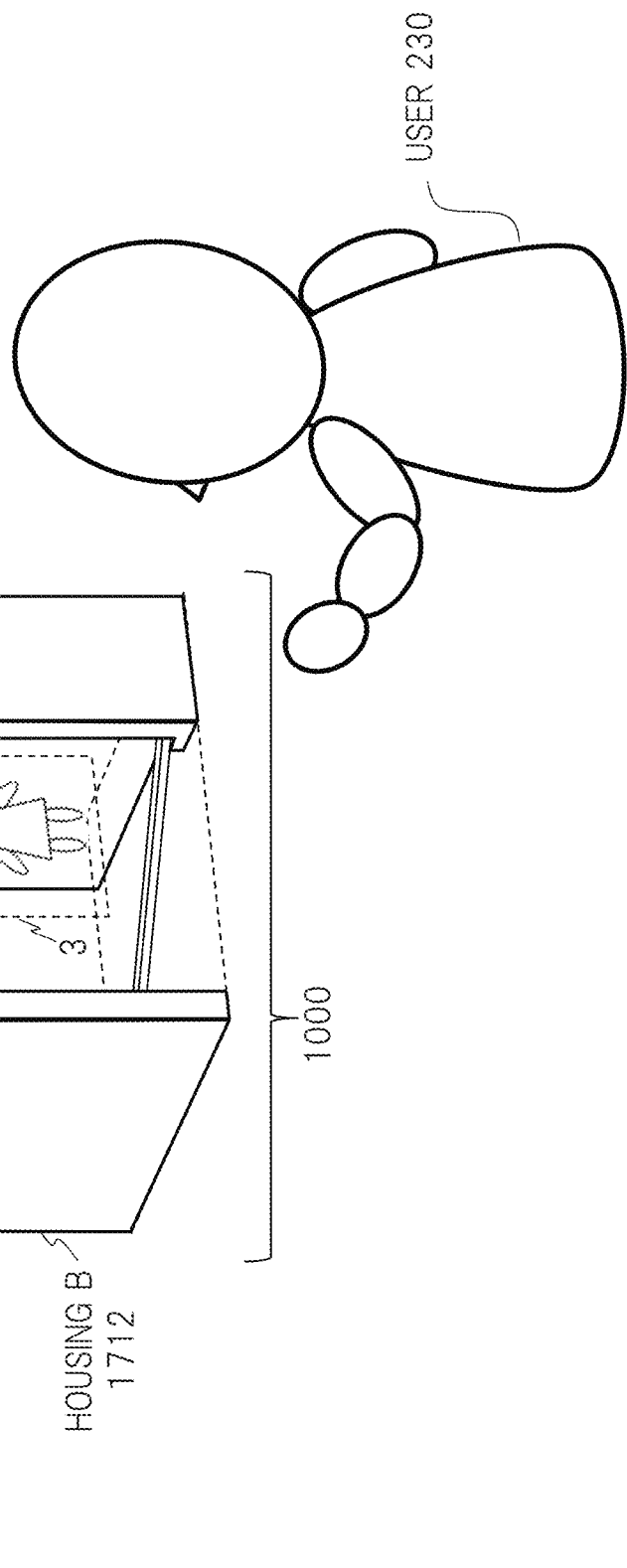

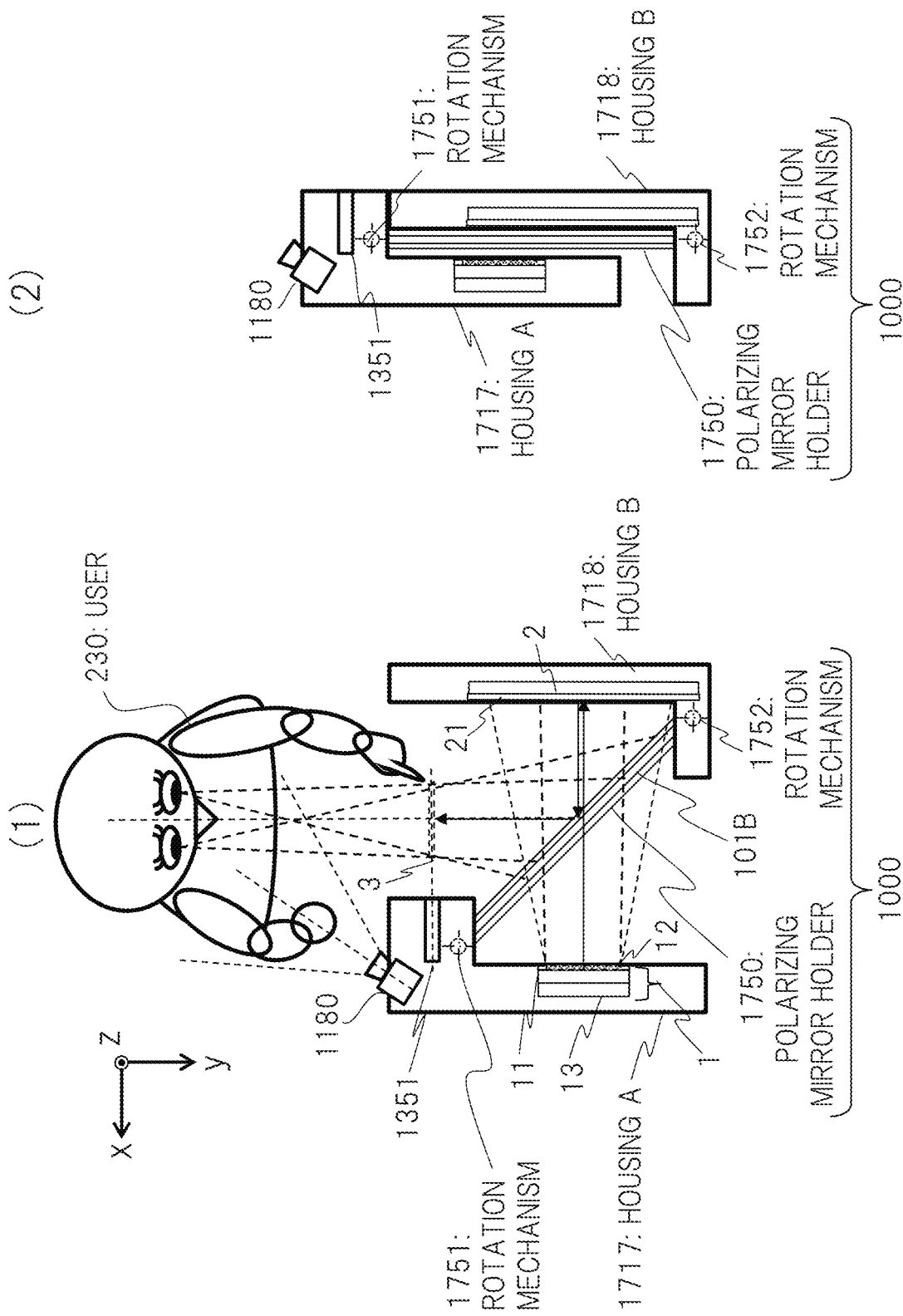

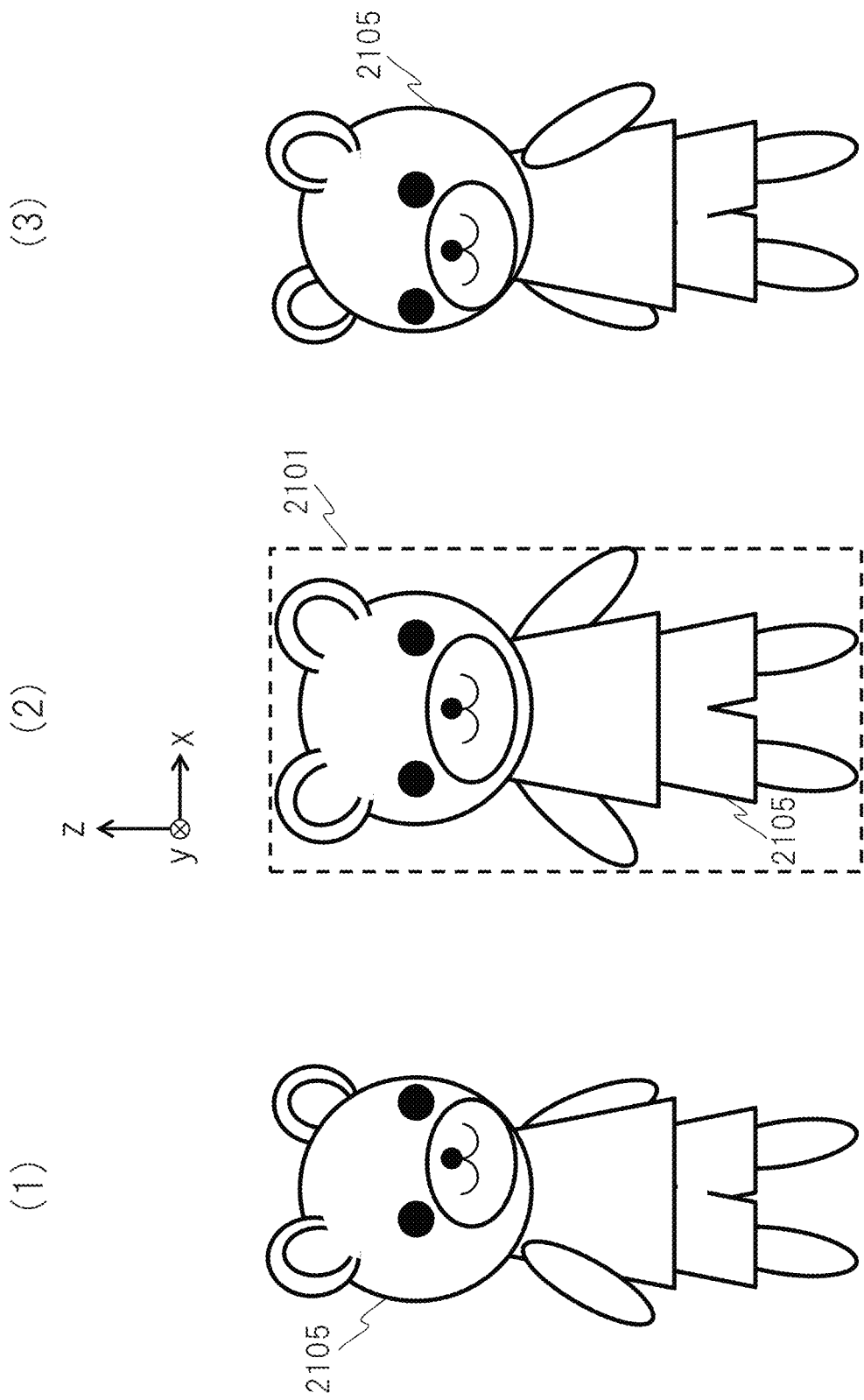

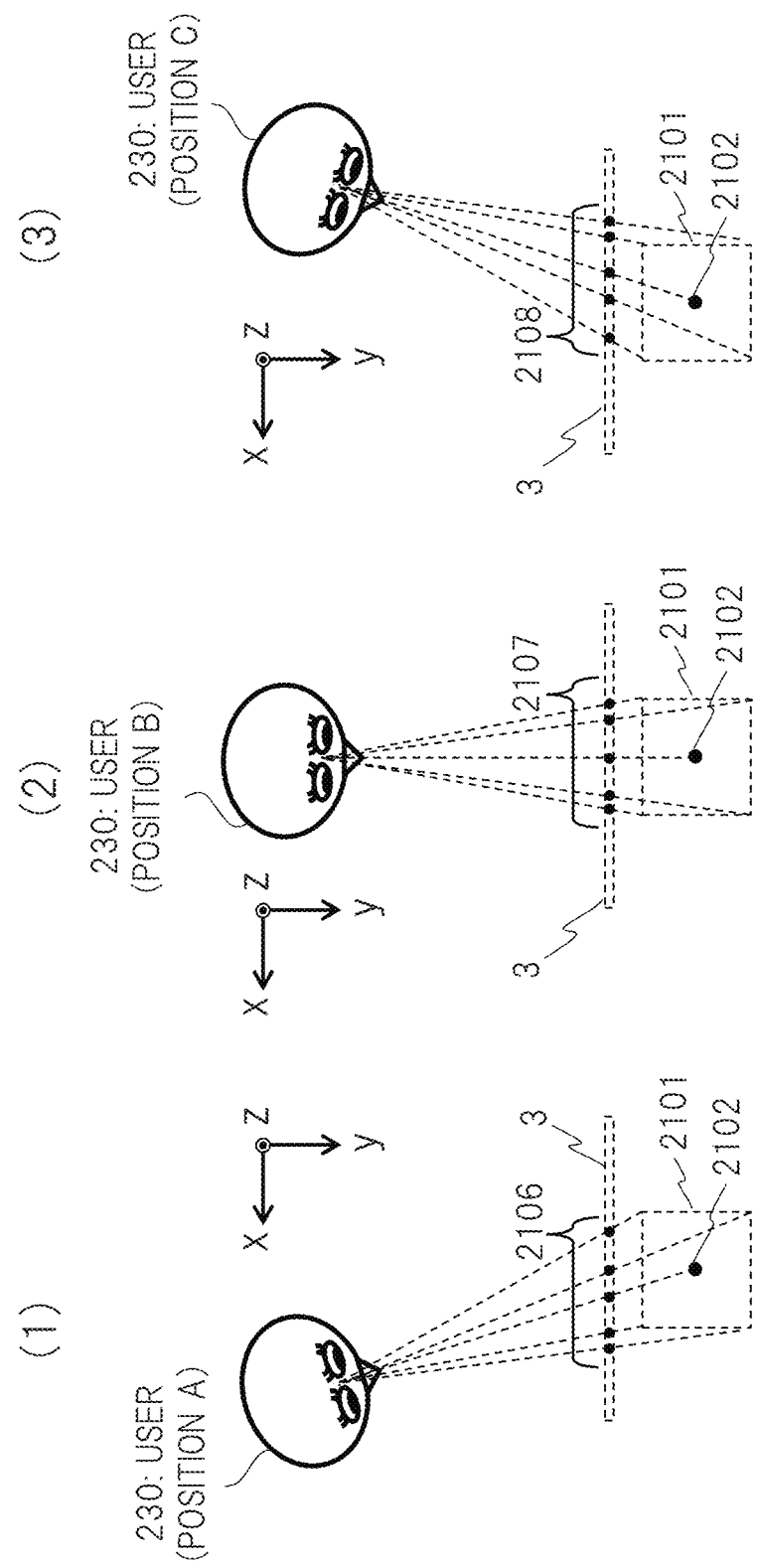

AIR FLOATING VIDEO DISPLAY APPARATUS

CROSS-REFERENCE TO RELATED APPLICATIONS

The present application is based on PCT filing PCT/JP2023/004232, filed Feb. 8, 2023, which claims priority from Japanese Patent Application No. 2022-025857, filed Feb. 22, 2022, the entire contents of each are incorporated herein by reference.

TECHNICAL FIELD

The present invention relates to an air floating video display apparatus.

BACKGROUND ART

For example, Patent Document 1 discloses an air floating information display technology.

RELATED ART DOCUMENTS

Patent Documents

Patent Document 1: Japanese Unexamined Patent Application Publication No. 2019-128722

SUMMARY OF THE INVENTION

Problems to be Solved by the Invention

However, in the disclosure of Patent Document 1, sufficient consideration has not been given to the configuration for obtaining practical brightness and quality of an air floating video, the configuration for enabling a user to visually recognize an air floating video more enjoyably, and the like.

An object of the present invention is to provide a more favorable air floating video display apparatus.

Means for Solving the Problems

In order to solve the problem described above, for example, the configuration described in claims is adopted. Although this application includes a plurality of means for solving the problem, one example thereof can be presented as an air floating video display apparatus that includes: a video display configured to display a video; a retroreflection plate which a light flux from the video display enters; an imager; and a controller, the light flux reflected by the retroreflection plate forms an air floating video as a real image in air, the controller can set a virtual position of a 3D model relative to the air floating video as a real image, the video display displays a video resulting from a rendering process of 3D data of the 3D model based on a viewpoint position of a user detected from an image captured by the imager and a virtual position of the 3D model, a video for stereoscopic viewing based on motion parallax for the 3D model is displayed in the air floating video as a real image, and the virtual position of the 3D model set by the controller is a position shifted relative to a position of the air floating video which is a real image formed in air, in a direction opposite to a traveling direction of principal ray when the light flux reflected by the retroreflection plate forms the air floating video.

Effects of the Invention

According to the present invention, it is possible to realize a more favorable air floating video display apparatus. Other problems, configurations, and effects will become apparent in the following description of embodiments.

BRIEF DESCRIPTION OF THE DRAWINGS

FIG. 4C is a diagram showing an example of the configuration of the air floating video display apparatus according to one embodiment of the present invention.

FIG. 4G is a diagram showing an example of the configuration of the air floating video display apparatus according to one embodiment of the present invention.

FIG. 4H is a diagram showing an example of the configuration of the air floating video display apparatus according to one embodiment of the present invention.

FIG. 4K is a diagram showing an example of the configuration of the air floating video display apparatus according to one embodiment of the present invention.

FIG. 4L is a diagram showing an example of the configuration of the air floating video display apparatus according to one embodiment of the present invention.

FIG. 4M is a diagram showing an example of the configuration of the air floating video display apparatus according to one embodiment of the present invention.

FIG. 13C is an explanatory diagram of an example of video display processing according to one embodiment of the present invention.

FIG. 14B is a diagram showing an example of the configuration of the air floating video display apparatus according to one embodiment of the present invention.

FIG. 14C is a diagram showing an example of the configuration of the air floating video display apparatus according to one embodiment of the present invention.

FIG. 15C is a diagram showing an example of the configuration of the air floating video display apparatus according to one embodiment of the present invention.

FIG. 15D is a diagram showing an example of the configuration of the air floating video display apparatus according to one embodiment of the present invention.

DETAILED DESCRIPTION OF PREFERRED EMBODIMENTS

Figure 1:
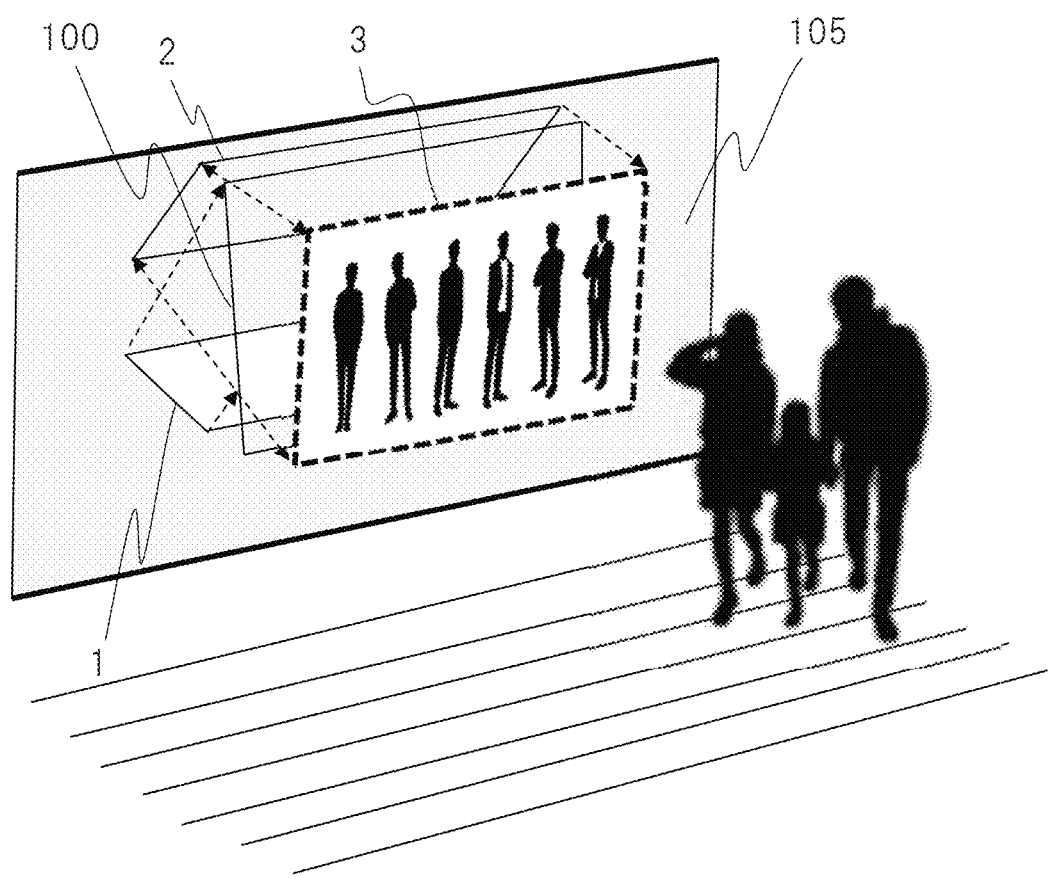
FIG. 1 is a diagram showing an example of usage form of an air floating video display apparatus according to one embodiment of the present invention.

Hereinafter, embodiments of the present invention will be described in detail with reference to drawings. Note that the present invention is not limited to the described embodiments, and various changes and modifications can be made by those skilled in the art within the scope of the technical idea disclosed in this specification. Further, in all the drawings for describing the present invention, components having the same function are denoted by the same reference characters, and the repetitive descriptions will be omitted in some cases.

The following embodiments relate to a video display apparatus capable of transmitting a video by video light from a video light emitting source through a transparent member that partitions a space such as a glass and displaying the video as an air floating video outside the transparent member. In the following description of the embodiments, a video floating in the air is expressed by the term "air floating video". Instead of this term, expressions such as "aerial image", "space image", "aerial floating video", "air floating optical image of a display image", "aerial floating optical image of a display image", etc. may be used. The term "air floating video" mainly used in the description of the embodiments is used as a representative example of these terms.

According to the following embodiments, for example, it is possible to realize a video display apparatus suitable for an ATM of a bank, a ticket vending machine of a station, a digital signage, or the like. For example, though a touch panel is generally used in an ATM of a bank, a ticket vending machine of a station, or the like at present, it becomes possible to display high-resolution video information above a transparent glass surface or a light-transmitting plate material in a state of floating in the air. At this time, by making the divergence angle of the emitted video light small, that is, an acute angle, and further aligning the video light with a specific polarized wave, only the normal reflected light is efficiently reflected with respect to the retroreflection plate, so that the light utilization efficiency can be increased, the ghost image which is generated in addition to the main air floating image and is a problem in the conventional retroreflective system can be suppressed, and a clear air floating video can be obtained. Also, with the apparatus including the light source of the present embodiment, it is possible to provide a novel and highly usable air floating video display apparatus (air floating video display system) capable of significantly reducing power consumption.

Further, it is also possible to provide an in-vehicle air floating video display apparatus capable of displaying a so-called unidirectional air floating video which can be visually recognized inside and/or outside the vehicle.

First Embodiment

<Example of Usage Form of Air Floating Video Display Apparatus>

FIG. 1 is a diagram showing an example of usage form of an air floating video display apparatus according to one embodiment of the present invention, and is a diagram showing an entire configuration of the air floating video display apparatus according to the present embodiment. Although a specific configuration of the air floating video display apparatus will be described in detail with reference to FIG. 2 and the like, light of a specific polarized wave with narrow-angle directional characteristics is emitted from a video display apparatus 1 as a video light flux, once enters a retroreflection plate 2 thorough reflection or the like on an optical system in the air floating video display apparatus, is retroreflected and passes through a transparent member 100 (glass or the like), thereby forming an aerial image (air floating video 3) which is a real image on the outside of the glass surface. In the following description of the embodiments, the retroreflection plate 2 (retroreflective plate) will be used as an example of a retroreflector. However, the retroreflection plate 2 of the present invention is not limited to a planar plate, and is used as an example of a concept including a sheet-like retroreflector attached to a planar or non-planar member or an entire assembly in which a sheet-like retroreflector is attached to a planar or non-planar member.

In a store or the like, a space is partitioned by a show window (referred to also as "window glass") 105 which is a translucent member such as glass. With the air floating video display apparatus of the present embodiment, the floating video can be displayed in one direction to the outside and/or the inside of the store (space) through such a transparent member.

In FIG. 1, the inner side of the window glass 105 (the inside of the store) is shown on the far side in the depth direction, and the outer side thereof (e.g., a sidewalk) is shown on the near side. On the other hand, it is also possible to form an aerial image at a desired position in the store by providing a reflector configured to reflect a specific polarized wave on the window glass 105 and reflecting the light by the reflector.

<Configuration Example of Optical System of Air Floating Video Display Apparatus>

Figure 2A:
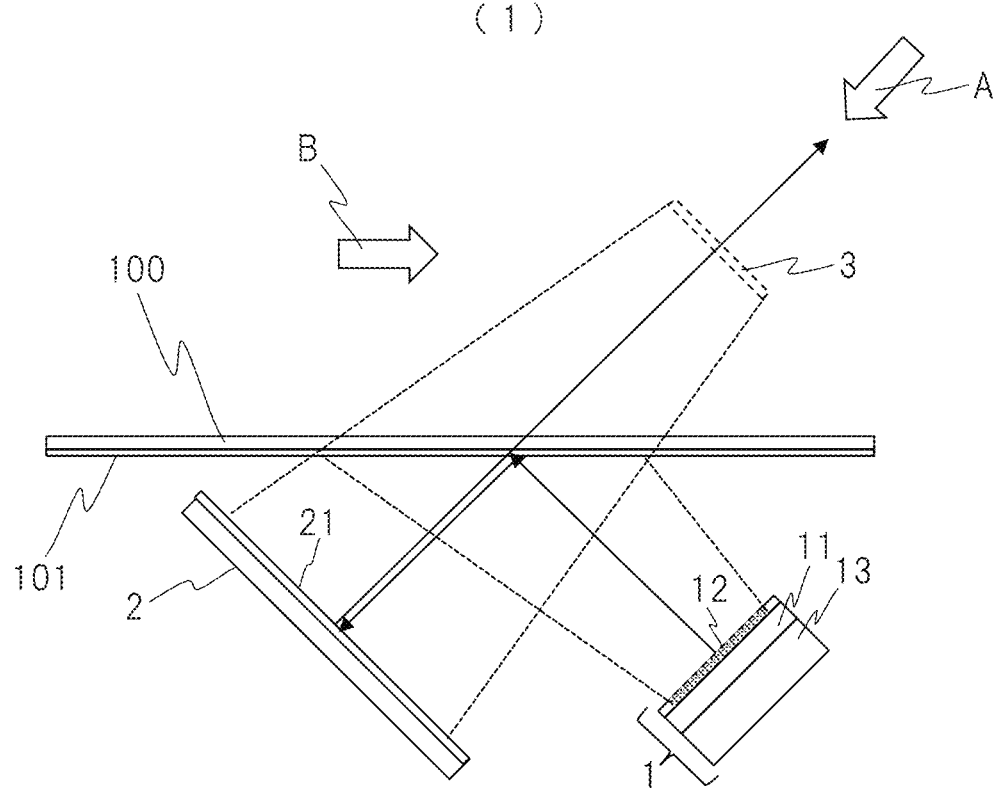
FIG. 2A is a diagram showing an example of a configuration of a main part and a configuration of a retroreflection portion of the air floating video display apparatus according to one embodiment of the present invention.
Figure 2A:
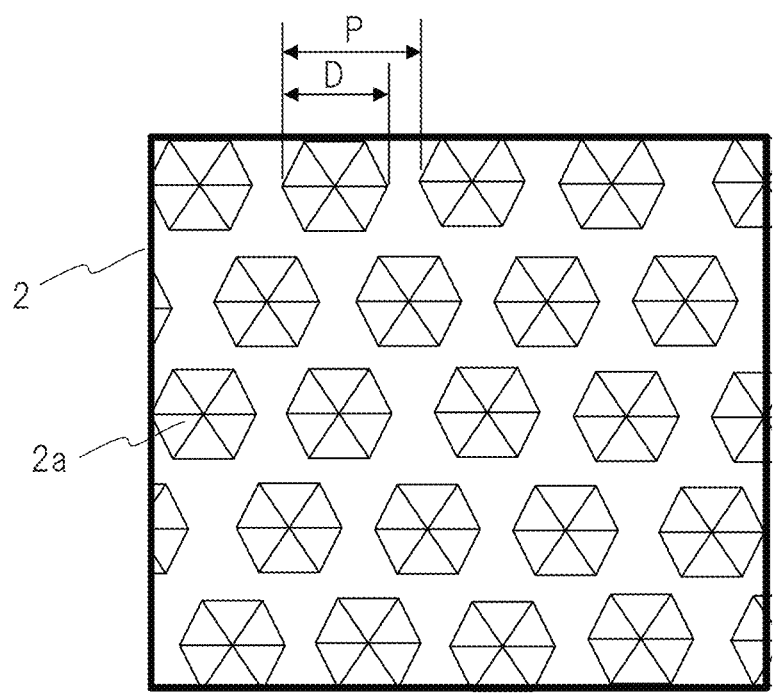

FIG. 2A is a diagram showing an example of a configuration of an optical system of the air floating video display apparatus according to one embodiment of the present invention. The configuration of the air floating video display apparatus will be described more specifically with reference to FIG. 2A. As shown in FIG. 2A(1), the display apparatus 1 which diverges video light of a specific polarized wave at a narrow angle is provided in the oblique direction of the transparent member 100 such as glass. The display apparatus 1 includes a liquid crystal display panel 11 and a light source apparatus 13 configured to generate light of a specific polarized wave having narrow-angle diffusion characteristics.

The video light of a specific polarized wave from the display apparatus 1 is reflected by a polarization separator 101 having a film selectively reflecting the video light of a specific polarized wave and provided on the transparent member 100 (in the drawing, the polarization separator 101 is formed in a sheet shape and is adhered to the transparent member 100), and enters the retroreflection plate 2. A λ/4 plate 21 is provided on the video light incident surface of the retroreflection plate 2. The video light passes through the λ/4 plate 21 twice at the time when the video light enters the retroreflection plate 2 and at the time when the video light is emitted from the retroreflection plate 2, whereby the video light is subjected to polarization conversion from a specific polarized wave to the other polarized wave. Here, since the polarization separator 101 which selectively reflects the video light of a specific polarized wave has a property of transmitting the polarized light of the other polarized wave subjected to the polarization conversion, the video light of the specific polarized wave after the polarization conversion passes through the polarization separator 101. The video light that has passed through the polarization separator 101 forms the air floating video 3, which is a real image, on the outside of the transparent member 100.

Here, a first example of a polarization design in the optical system in FIG. 2A will be described. For example, the configuration in which the video light of S polarization is emitted from the display apparatus 1 to the polarization separator 101 and the polarization separator 101 has the property of reflecting S polarization and transmitting P polarization is also possible. In this case, the video light of S polarization that has reached the polarization separator 101 from the display apparatus 1 is reflected by the polarization separator 101 and is directed toward the retroreflection plate 2. Since the video light passes through the λ/4 plate 21 provided on the incident surface of the retroreflection plate 2 twice when the video light is reflected by the retroreflection plate 2, the video light is converted from S-polarized light into P-polarized light. The video light converted into P-polarized light is directed toward the polarization separator 101 again. Here, since the polarization separator 101 has the property of reflecting S polarization and transmitting P polarization, the video light of P polarization passes through the polarization separator 101 and then passes through the transparent member 100. Since the video light that has passed through the transparent member 100 is the light generated by the retroreflection plate 2, the air floating video 3 which is an optical image of the displayed video of the display apparatus 1 is formed at a position having a mirror relationship with the displayed video of the display apparatus 1 with respect to the polarization separator 101. With the polarization design described above, the air floating video 3 can be favorably formed.

Next, a second example of the polarization design in the optical system in FIG. 2A will be described. For example, the configuration in which the video light of P polarization is emitted from the display apparatus 1 to the polarization separator 101 and the polarization separator 101 has the property of reflecting P polarization and transmitting S polarization is also possible. In this case, the video light of P polarization that has reached the polarization separator 101 from the display apparatus 1 is reflected by the polarization separator 101 and is directed toward the retroreflection plate 2. Since the video light passes through the λ/4 plate 21 provided on the incident surface of the retroreflection plate 2 twice when the video light is reflected by the retroreflection plate 2, the video light is converted from P-polarized light into S-polarized light. The video light converted into S-polarized light is directed toward the polarization separator 101 again. Here, since the polarization separator 101 has the property of reflecting P polarization and transmitting S polarization, the video light of S polarization passes through the polarization separator 101 and then passes through the transparent member 100. Since the video light that has passed through the transparent member 100 is the light generated by the retroreflection plate 2, the air floating video 3 which is an optical image of the displayed video of the display apparatus 1 is formed at a position having a mirror relationship with the displayed video of the display apparatus 1 with respect to the polarization separator 101. With the polarization design described above, the air floating video 3 can be favorably formed.

Note that the light that forms the air floating video 3 is a set of light rays converging from the retroreflection plate 2 to the optical image of the air floating video 3, and these light rays go straight even after passing through the optical image of the air floating video 3. Therefore, the air floating video 3 is a video having high directivity, unlike diffused video light formed on a screen by a general projector or the like. Therefore, in the configuration of FIG. 2A, when the user visually recognizes the air floating video 3 from the direction of an arrow A, the air floating video 3 is visually recognized as a bright video. However, when another person visually recognizes the video from the direction of an arrow B, the air floating video 3 cannot be visually recognized as a video at all. These characteristics are very suitable for use in a system that displays a video requiring high security or a highly confidential video that is desired to be kept secret from a person facing the user.

Note that, depending on the performance of the retroreflection plate 2, the polarization axes of the video light after the reflection may become uneven, and the reflection angles may also become uneven. Such uneven light does not maintain the polarization state and traveling angle assumed in design in some cases. For example, such light with the polarization state and traveling angle that are not assumed in design may directly enter the video display surface of the liquid crystal display panel 11 again from the position of the retroreflection plate 2 without passing through the polarization separator. Also, such light with the polarization state and traveling angle that are not assumed in design may enter the video display surface of the liquid crystal display panel 11 again after being reflected by components in the air floating video display apparatus. The light that has entered the video display surface of the liquid crystal display panel 11 again is reflected again on the video display surface of the liquid crystal display panel 11 constituting the display apparatus 1, so that a ghost image is generated and the image quality of the air floating image is deteriorated in some cases. Thus, in the present embodiment, an absorptive polarization plate 12 may be provided on the video display surface of the display apparatus 1. The video light emitted from the display apparatus 1 is transmitted through the absorptive polarization plate 12, and the reflected light returning from the polarization separator 101 is absorbed by the absorptive polarization plate 12, whereby the re-reflection described above can be suppressed. In this way, it is possible to prevent deterioration in image quality due to a ghost image of an air floating image. Specifically, in the configuration in which the video light of S polarization is emitted from the display apparatus 1 to the polarization separator 101, the polarization plate that absorbs P-polarized light can be used as the absorptive polarization plate 12. Also, in the configuration in which the video light of P polarization is emitted from the display apparatus 1 to the polarization separator 101, the polarization plate that absorbs S-polarized light can be used as the absorptive polarization plate 12.

The polarization separator 101 described above may be formed of, for example, a reflective polarization plate or a metal multilayer film that reflects a specific polarized wave.

Then, FIG. 2A(2) shows a surface shape of a retroreflection plate manufactured by Nippon Carbide Industries Co., Inc. used in this study as the typical retroreflection plate 2. The light ray that enters regularly arranged hexagonal columns is reflected by the wall surfaces and bottom surfaces of the hexagonal columns and emitted as retroreflected light in a direction corresponding to the incident light, and an air floating video which is a real image is displayed based on the video displayed on the display apparatus 1.

The resolution of the air floating image largely depends on the outer shape D and pitch P of the retroreflection portions of the retroreflection plate 2 shown in FIG. 2A(2), in addition to the resolution of the liquid crystal display panel 11. For example, when a 7-inch WUXGA (1920×1200 pixels) liquid crystal display panel is used, even if one pixel (one triplet) is about 80 m, one pixel of the air floating image is about 300 m if the diameter D of the retroreflection portion is 240 m and the pitch is 300 m, for example. Therefore, the effective resolution of the air floating video is reduced to about ⅓.

Therefore, in order to make the resolution of the air floating video equal to the resolution of the display apparatus 1, it is desired that the diameter and the pitch of the retroreflection portions are close to one pixel of the liquid crystal display panel. On the other hand, in order to suppress the occurrence of moire caused by the retroreflection plate and the pixels of the liquid crystal display panel, it is preferable to design each pitch ratio so as not to be an integral multiple of one pixel. Further, the shape is preferably arranged such that any one side of the retroreflection portion does not overlap with any one side of one pixel of the liquid crystal display panel.

Note that the surface shape of the retroreflection plate according to the present embodiment is not limited to the above example, and the retroreflection plate may have a variety of surface shapes to realize the retroreflection. Specifically, a retroreflective element in which triangular pyramidal prisms, hexagonal pyramidal prisms, other polygonal prisms, or combinations thereof are regularly arranged may be provided on the surface of the retroreflection plate of the present embodiment. Alternatively, a retroreflective element in which these prisms are regularly arranged to form cube corners may be provided on the surface of the retroreflection plate of the present embodiment. Moreover, a capsule-lens retroreflection element in which glass beads are regularly arranged may be provided on the surface of the retroreflection plate of the present embodiment. Since existing techniques can be used for the detailed configurations of these retroreflective elements, detailed description thereof will be omitted. Specifically, it is possible to use the techniques disclosed in Japanese Unexamined Patent Application Publications No. 2001-33609, No. 2001-264525, No. 2005-181555, No. 2008-70898, No. 2009-229942, and others.

<Another Configuration Example (1) of Optical System of Air Floating Video Display Apparatus>

Another configuration example of the optical system of the air floating video display apparatus will be described with reference to FIG. 2B. Note that it is assumed that components in FIG. 2B denoted by the same reference characters as those in FIG. 2A have the same functions and configurations as those in FIG. 2A. The repetitive descriptions for such components will be omitted to simplify the description.

Figure 2B:
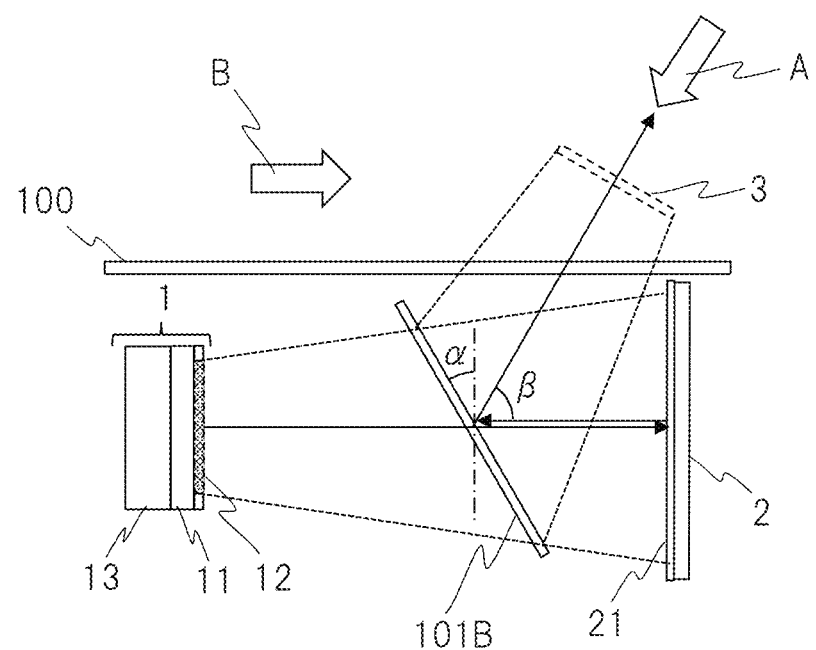
FIG. 2B is a diagram showing an example of a configuration of a main part and a configuration of a retroreflection portion of the air floating video display apparatus according to one embodiment of the present invention.

In the optical system in FIG. 2B, video light of a specific polarized wave is output from the display apparatus 1 as in FIG. 2A. The video light of a specific polarized wave output from the display apparatus 1 is input to a polarization separator 101B. The polarization separator 101B is a member that selectively transmits video light of a specific polarized wave. Unlike the polarization separator 101 in FIG. 2A, the polarization separator 101B is not integrated with the transparent member 100 but has a plate-like shape independently. Therefore, the polarization separator 101B may be expressed as a polarization separation plate. For example, the polarization separator 101B may be configured as a reflective polarization plate obtained by attaching a polarization separation sheet on a transparent member. Alternatively, the polarization separator 101B may be formed by attaching a metal multilayer film that selectively transmits a specific polarized wave and reflects the other specific polarized wave, on a transparent member. In FIG. 2B, the polarization separator 101B is configured so as to transmit the video light of a specific polarized wave output from the display apparatus 1.

The video light that has passed through the polarization separator 101B enters the retroreflection plate 2. The λ/4 plate 21 is provided on the video light incident surface of the retroreflection plate. The video light is subjected to polarization conversion from a specific polarized wave to the other polarized wave by passing through the λ/4 plate 21 twice at the time when it enters the retroreflection plate and at the time when it is emitted therefrom. Here, since the polarization separator 101B has a property of reflecting the light of the other polarized wave that has been subjected to the polarization conversion by the λ/4 plate 21, the video light after the polarization conversion is reflected by the polarization separator 101B. The video light reflected by the polarization separator 101B passes through the transparent member 100, and forms the air floating video 3 which is a real image outside the transparent member 100.

Here, a first example of polarization design in the optical system in FIG. 2B will be described. For example, the configuration in which the video light of P polarization is emitted from the display apparatus 1 to the polarization separator 101B and the polarization separator 101B has a property of reflecting S polarization and transmitting P polarization is also possible. In this case, the video light of P polarization that has reached the polarization separator 101B from the display apparatus 1 passes through the polarization separator 101B and travels toward the retroreflection plate 2. Since the video light passes through the λ/4 plate 21 provided on the incident surface of the retroreflection plate 2 twice when it is reflected by the retroreflection plate 2, the video light is converted from P-polarized light to S-polarized light. The video light converted into S-polarized light is directed to the polarization separator 101B again. Here, since the polarization separator 101B has a property of reflecting S polarization and transmitting P polarization, the video light of S polarization is reflected by the polarization separator 101 and passes through the transparent member 100. Since the video light that has passed through the transparent member 100 is the light generated by the retroreflection plate 2, the air floating video 3 which is an optical image of the displayed video of the display apparatus 1 is formed at a position having a mirror relationship with the displayed image of the display apparatus 1 with respect to the polarization separator 101B. With the polarization design described above, the air floating video 3 can be favorably formed.

Next, a second example of a polarization design in the optical system in FIG. 2B will be described. For example, the configuration in which the video light of S polarization is emitted from the display apparatus 1 to the polarization separator 101B and the polarization separator 101B has the property of reflecting P polarization and transmitting S polarization is also possible. In this case, the video light of S polarization that has reached the polarization separator 101B from the display apparatus 1 passes through the polarization separator 101B and is directed toward the retroreflection plate 2. Since the video light passes through the λ/4 plate 21 provided on the incident surface of the retroreflection plate 2 twice when the video light is reflected by the retroreflection plate 2, the video light is converted from S-polarized light into P-polarized light. The video light converted into P-polarized light is directed toward the polarization separator 101B again. Here, since the polarization separator 101B has the property of reflecting P polarization and transmitting S polarization, the video light of P polarization is reflected by the polarization separator 101 and then passes through the transparent member 100. Since the video light that has passed through the transparent member 100 is the light generated by the retroreflection plate 2, the air floating video 3 which is an optical image of the displayed video of the display apparatus 1 is formed at a position having a mirror relationship with the displayed video of the display apparatus 1 with respect to the polarization separator 101B. With the polarization design described above, the air floating video 3 can be favorably formed.

In FIG. 2B, the video display surface of the display apparatus 1 and the surface of the retroreflection plate 2 are arranged parallel to each other. The polarization separator 101B is arranged so as to be inclined at an angle α (for example, 30°) with respect to the video display surface of the display apparatus 1 and the surface of the retroreflection plate 2. Then, in the reflection by the polarization separator 101B, the traveling direction of the video light reflected by the polarization separator 101B (direction of principal light ray of the video light) differs by an angle β (for example, 60°) from the traveling direction of the video light emitted from the retroreflection plate 2 (direction of principal light ray of the video light). With this configuration, in the optical system in FIG. 2B, the video light is output at a predetermined angle shown in the drawing toward the outside of the transparent member 100, and the air floating video 3 which is a real image is formed. In the configuration of FIG. 2B, when the user visually recognizes the air floating video 3 from the direction of an arrow A, the air floating video 3 is visually recognized as a bright video. However, when another person visually recognizes the video from the direction of an arrow B, the air floating video 3 cannot be visually recognized as a video at all. These characteristics are particularly suitable for use in a system that displays a video requiring high security or a highly confidential video that is desired to be kept secret from a person facing the user.

As described above, although the optical system in FIG. 2B has a different configuration from the optical system in FIG. 2A, it is possible to form a favorable air floating video like the optical system in FIG. 2A.

Note that it is also possible to provide an absorptive polarization plate on the surface of the transparent member 100 on the side closer to the polarization separator 101B. As the absorptive polarization plate, an absorptive polarization plate that transmits the polarized wave of the video light from the polarization separator 101B and absorbs the polarized wave whose phase is different by 90° from the polarized wave of the video light from the polarization separator 101B can be provided. In this way, the external light that enters the transparent member 100 from the side of the air floating video 3 can be reduced by about 50%, while sufficiently transmitting the video light for forming the air floating video 3. As a result, it is possible to reduce stray light in the optical system in FIG. 2B due to external light entering the transparent member 100 from the side of the air floating video 3.

<Another Configuration Example (2) of Optical System of Air Floating Video Display Apparatus>

Another configuration example of the optical system of the air floating video display apparatus will be described with reference to FIG. 2C. Note that it is assumed that components in FIG. 2C denoted by the same reference characters as those in FIG. 2B have the same functions and configurations as those in FIG. 2B. The repetitive descriptions for such components will be omitted to simplify the description.

Figure 2C:
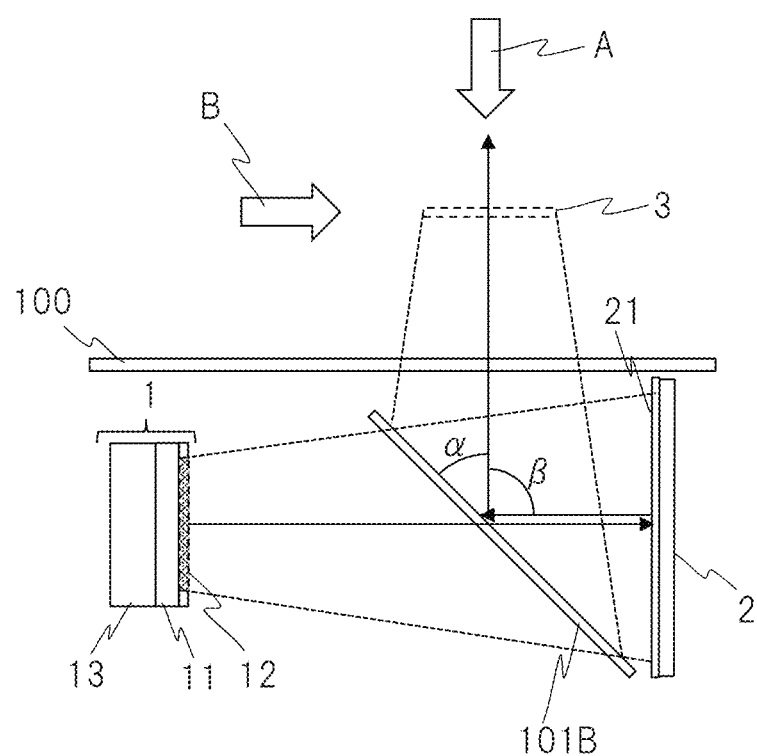
FIG. 2C is a diagram showing an example of a configuration of a main part and a configuration of a retroreflection portion of the air floating video display apparatus according to one embodiment of the present invention.

The optical system in FIG. 2C is different from the optical system in FIG. 2B only in the arrangement angle of the polarization separator 101B with respect to the video display surface of the display apparatus 1 and the surface of the retroreflection plate 2. All of the other configurations are the same as those of the optical system in FIG. 2B, and thus the repetitive descriptions will be omitted. The polarization design of the optical system in FIG. 2C is also similar to the polarization design of the optical system in FIG. 2B, and thus the repetitive descriptions will be omitted.

In the optical system in FIG. 2C, the polarization separator 101B is arranged so as to be inclined at an angle α with respect to the video display surface of the display apparatus 1 and the surface of the retroreflection plate 2. In FIG. 2C, the angle α is 45°. With this configuration, in the reflection of the polarization separator 101B, the angle S formed by the traveling direction of the video light reflected by the polarization separator 101B (direction of principal light ray of the video light) with respect to the traveling direction of the video light entering from the retroreflection plate 2 (direction of principal light ray of the video light) is 90°. As a result, the video display surface of the display apparatus 1 and the surface of the retroreflection plate 2 are in a perpendicular relationship with the traveling direction of the video light reflected by the polarization separator 101B, and the angular relationship of the surfaces constituting the optical system can be simplified. The angular relationship of the surfaces constituting the optical system can be more simplified if the surface of the transparent member 100 is arranged so as to be orthogonal to the traveling direction of the video light reflected by the polarization separator 101B. In the configuration in FIG. 2C, when the user visually recognizes the air floating video 3 from the direction of an arrow A, the air floating video 3 is visually recognized as a bright video. However, when another person visually recognizes the video from the direction of an arrow B, the air floating video 3 cannot be visually recognized as a video at all. These characteristics are particularly suitable for use in a system that displays a video requiring high security or a highly confidential video that is desired to be kept secret from a person facing the user.

As described above, although the optical system in FIG. 2C has a different configuration from the optical systems in FIG. 2A and FIG. 2B, it is possible to form a favorable air floating video like the optical systems in FIG. 2A and FIG. 2B. Furthermore, the angles of the surfaces constituting the optical system can be simplified.

Note that it is also possible to provide an absorptive polarization plate on the surface of the transparent member 100 on the side closer to the polarization separator 101B. As the absorptive polarization plate, an absorptive polarization plate that transmits the polarized wave of the video light from the polarization separator 101B and absorbs the polarized wave whose phase is different by 90° from the polarized wave of the video light from the polarization separator 101B can be provided. In this way, the external light that enters the transparent member 100 from the side of the air floating video 3 can be reduced by about 50%, while sufficiently transmitting the video light for forming the air floating video 3. As a result, it is possible to reduce stray light in the optical system in FIG. 2C due to external light entering the transparent member 100 from the side of the air floating video 3.

According to the optical systems in FIG. 2A, FIG. 2B, and FIG. 2C described above, it is possible to provide a brighter higher-quality air floating video.

<<Block Diagram of Internal Configuration of Air Floating Video Display Apparatus>>

Figure 3:
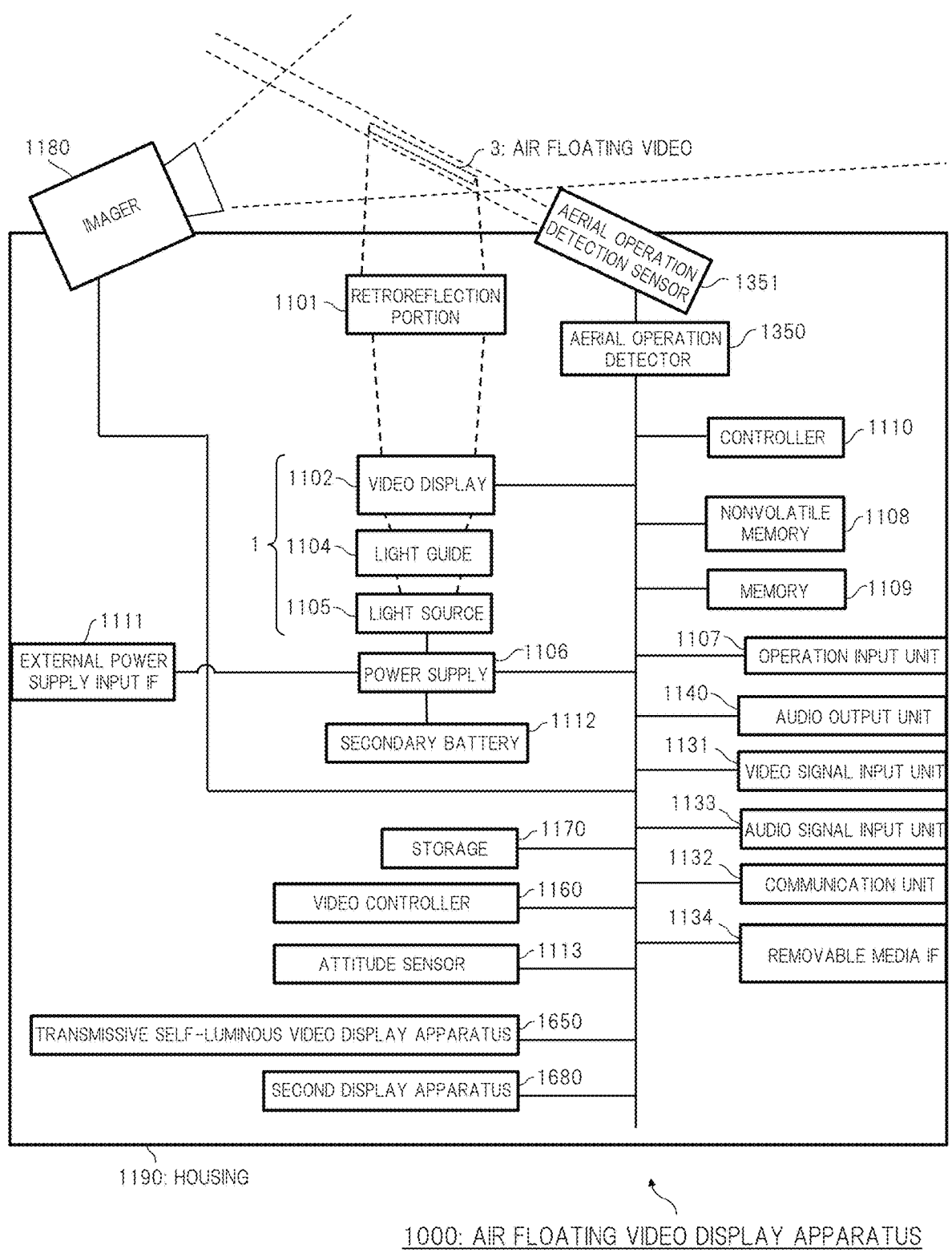
FIG. 3 is a diagram showing a configuration example of an air floating video display apparatus according to one embodiment of the present invention.

Next, a block diagram of an internal configuration of an air floating video display apparatus 1000 will be described. FIG. 3 is a block diagram showing an example of an internal configuration of the air floating video display apparatus 1000.

The air floating video display apparatus 1000 includes a retroreflection portion 1101, a video display 1102, a light guide 1104, a light source 1105, a power supply 1106, an external power supply input interface 1111, an operation input unit 1107, a nonvolatile memory 1108, a memory 1109, a controller 1110, a video signal input unit 1131, an audio signal input unit 1133, a communication unit 1132, an aerial operation detection sensor 1351, an aerial operation detector 1350, an audio output unit 1140, a video controller 1160, a storage 1170, an imager 1180, and the like. Note that the air floating video display apparatus 1000 may include a removable media interface 1134, an attitude sensor 1113, a transmissive self-luminous video display apparatus 1650, a second display apparatus 1680, a secondary battery 1112, and the like.

Each component of the air floating video display apparatus 1000 is arranged in a housing 1190. Note that the imager 1180 and the aerial operation detection sensor 1351 shown in FIG. 3 may be provided outside the housing 1190.

The retroreflection portion 1101 in FIG. 3 corresponds to the retroreflection plate 2 in FIG. 2A, FIG. 2B, and FIG. 2C. The retroreflection portion 1101 retroreflects the light modulated by the video display 1102. Of the reflected light from the retroreflection portion 1101, the light output to the outside of the air floating video display apparatus 1000 forms the air floating video 3.

The video display 1102 in FIG. 3 corresponds to the liquid crystal display panel 11 in FIG. 2A, FIG. 2B, and FIG. 2C. The light source 1105 in FIG. 3 corresponds to the light source apparatus 13 in FIG. 2A, FIG. 2B, and FIG. 2C. Further, the video display 1102, the light guide 1104, and the light source 1105 in FIG. 3 correspond to the display apparatus 1 in FIG. 2A, FIG. 2B, and FIG. 2C.

The video display 1102 is a display that generates a video by modulating transmitted light based on a video signal input under the control of the video controller 1160 to be described below. The video display 1102 corresponds to the liquid crystal display panel 11 in FIG. 2A, FIG. 2B, and FIG. 2C. As the video display 1102, for example, a transmissive liquid crystal panel is used. Alternatively, as the video display 1102, for example, a reflective liquid crystal panel using a method of modulating reflected light, a DMD (Digital Micromirror Device: registered trademark) panel, or the like may be used.

The light source 1105 is configured to generate light for the video display 1102, and is a solid-state light source such as an LED light source or a laser light source. The power supply 1106 converts an AC current input from the outside through the external power supply input interface 1111 into a DC current, and supplies power to the light source 1105. Further, the power supply 1106 supplies a necessary DC current to each unit in the air floating video display apparatus 1000. The secondary battery 1112 stores power supplied from the power supply 1106. Also, the secondary battery 1112 supplies power to the light source 1105 and other configurations that require power when power is not supplied from outside via the external power supply input interface 1111. In other words, when the air floating video display apparatus 1000 includes the secondary battery 1112, the user can use the air floating video display apparatus 1000 even when power is not supplied from outside.

The light guide 1104 guides the light generated by the light source 1105 and irradiates the video display 1102 with the light. A combination of the light guide 1104 and the light source 1105 may be referred to also as a backlight of the video display 1102. The light guide 1104 may have a configuration mainly made of glass. The light guide 1104 may have a configuration mainly made of plastic. The light guide 1104 may have a configuration using a mirror. Various configurations are possible as the combination of the light guide 1104 and the light source 1105. A specific configuration example of the combination of the light guide 1104 and the light source 1105 will be described later in detail.

The aerial operation detection sensor 1351 is a sensor that detects an operation on the air floating video 3 by a finger of a user 230. For example, the aerial operation detection sensor 1351 senses a range overlapping with the entire display range of the air floating video 3. Note that the aerial operation detection sensor 1351 may sense only a range overlapping with at least a part of the display range of the air floating video 3.

Specific examples of the aerial operation detection sensor 1351 include a distance sensor using invisible light such as infrared light, an invisible light laser, an ultrasonic wave, or the like. Also, the aerial operation detection sensor 1351 may be configured to be able to detect coordinates on a two-dimensional plane by combining a plurality of sensors. Further, the aerial operation detection sensor 1351 may be composed of a ToF (Time of Flight) type LiDAR (Light Detection and Ranging) or an image sensor.

The aerial operation detection sensor 1351 is not particularly limited as long as it can perform sensing for detecting a touch operation or the like on an object displayed as the air floating video 3 by a finger of the user. Such sensing can be performed by using an existing technique.

The aerial operation detector 1350 acquires a sensing signal from the aerial operation detection sensor 1351, and determines whether or not the finger of the user 230 has touched an object in the air floating video 3 and calculates the position (touch position) where the finger of the user 230 has touched the object, based on the sensing signal. The aerial operation detector 1350 is composed of, for example, a circuit such as a FPGA (Field Programmable Gate Array). Also, a part of the functions of the aerial operation detector 1350 may be implemented by software, for example, by a program for aerial operation detection executed by the controller 1110.

The aerial operation detection sensor 1351 and the aerial operation detector 1350 may be built in the air floating video display apparatus 1000, or may be provided outside separately from the air floating video display apparatus 1000. When provided separately from the air floating video display apparatus 1000, the aerial operation detection sensor 1351 and the aerial operation detector 1350 are configured to be able to transmit information and signals to the air floating video display apparatus 1000 via a wired or wireless communication connection path or video signal transmission path.

Also, the aerial operation detection sensor 1351 and the aerial operation detector 1350 may be provided separately. In this way, it is possible to construct a system in which the air floating video display apparatus 1000 without the aerial operation detection function is provided as a main body and only the aerial operation detection function can be added as an option. Further, the configuration in which only the aerial operation detection sensor 1351 is provided separately and the aerial operation detector 1350 is built in the air floating video display apparatus 1000 is also possible. In a case such as when it is desired to arrange the aerial operation detection sensor 1351 more freely with respect to the installation position of the air floating video display apparatus 1000, the configuration in which only the aerial operation detection sensor 1351 is provided separately is advantageous.

The imager 1180 is a camera having an image sensor, and is configured to capture the image of the space near the air floating video 3 and/or the face, arms, fingers, and the like of the user 230. A plurality of imagers 1180 may be provided. By using a plurality of imagers 1180 or by using an imager with a depth sensor, it is possible to assist the aerial operation detector 1350 in the detection processing of the touch operation on the air floating video 3 by the user 230. The imager 1180 may be provided separately from the air floating video display apparatus 1000. When the imager 1180 is provided separately from the air floating video display apparatus 1000, the imager 1180 may be configured to be able to transmit imaging signals to the air floating video display apparatus 1000 via a wired or wireless communication connection path or the like.

For example, when the aerial operation detection sensor 1351 is configured as an object intrusion sensor that detects whether or not an object has intruded a plane (intrusion detection plane) including the display plane of the air floating video 3, the aerial operation detection sensor 1351 may not be able to detect information indicating how far an object (e.g., a finger of the user) that has not intruded the intrusion detection plane is away from the intrusion detection plane or how close the object is to the intrusion detection plane.

In such a case, it is possible to calculate the distance between the object and the intrusion detection plane by using information such as depth calculation information of the object based on the captured images of the plurality of imagers 1180 or depth information of the object by the depth sensor. Further, these pieces of information and various kinds of information such as the distance between the object and the intrusion detection plane are used for various kinds of display control for the air floating video 3.

Alternatively, the aerial operation detector 1350 may detect a touch operation on the air floating video 3 by the user 230 based on the image captured by the imager 1180 without using the aerial operation detection sensor 1351.

Further, the imager 1180 may capture an image of the face of the user 230 who operates the air floating video 3, and the controller 1110 may perform the identification processing of the user 230. Also, in order to determine whether or not another person is standing around or behind the user 230 who operates the air floating video 3 and the person is peeking at the operation of the user 230 on the air floating video 3, the imager 1180 may capture an image of a range including the user 230 who operates the air floating video 3 and the surrounding region of the user 230.

The operation input unit 1107 is, for example, an operation button or a signal receiver or an infrared receiver such as a remote controller, and receives an input of a signal regarding an operation different from the aerial operation (touch operation) by the user 230. The operation input unit 1107 may be used by, for example, an administrator to operate the air floating video display apparatus 1000 apart from the above-described user 230 who performs the touch operation on the air floating video 3.

The video signal input unit 1131 is connected to an external video output unit and receives an input of video data. Various digital video input interfaces may be used as the video signal input unit 1131. For example, the video signal input unit 1131 can be configured by a video input interface of the HDMI (High-Definition Multimedia Interface (registered trademark)) standard, a video input interface of the DVI (Digital Visual Interface) standard, or a video input interface of the DisplayPort standard. Alternatively, an analog video input interface such as analog RGB or composite video may be provided. The audio signal input unit 1133 is connected to an external audio output unit and receives an input of audio data. The audio signal input unit 1133 can be configured by an audio input interface of the HDMI standard, an optical digital terminal interface, a coaxial digital terminal interface, or the like. In the case of the interface of the HDMI standard, the video signal input unit 1131 and the audio signal input unit 1133 may be configured as an interface having integrated terminal and cable. The audio output unit 1140 can output audio based on the audio data input to the audio signal input unit 1133. The audio output unit 1140 may be configured by a speaker. Also, the audio output unit 1140 may output a built-in operation sound or error warning sound. Alternatively, a configuration to output a digital signal to an external device like the Audio Return Channel function specified in the HDMI standard may be adopted as the audio output unit 1140.

The nonvolatile memory 1108 stores various kinds of data used in the air floating video display apparatus 1000. The data stored in the nonvolatile memory 1108 include, for example, data for various operations to be displayed in the air floating video 3, display icons, data of objects to be operated by user, layout information, and the like. The memory 1109 stores video data to be displayed as the air floating video 3, data for controlling the apparatus, and the like.

The controller 1110 controls the operation of each unit connected thereto. Also, the controller 1110 may perform arithmetic operation based on information acquired from each unit in the air floating video display apparatus 1000 in cooperation with a program stored in the memory 1109.

The communication unit 1132 communicates with an external device, an external server, or the like via a wired or wireless communication interface. When the communication unit 1132 has a wired communication interface, the wired communication interface may be configured by, for example, the LAN interface of the Ethernet standard. When the communication unit 1132 has a wireless communication interface, the wireless communication interface may be configured by, for example, the communication interface of the Wi-Fi standard, the communication interface of the Bluetooth standard, or the 4G or 5G mobile communication interface. Various kinds of data such as video data, image data, and audio data are transmitted and received through communication via the communication unit 1132.

Further, the removable media interface 1134 is an interface configured to connect removable recording media (removable media) The removable recording media (removable media) may be configured by a semiconductor memory such as solid state drive (SSD), a magnetic recording storage device such as hard disk drive (HDD), or an optical recording media such as an optical disc. The removable media interface 1134 can read various kinds of information such as video data, image data, audio data, and others recorded in the removable recording media. The video data, image data, and others recorded in the removable recording media are output as the air floating video 3 via the video display 1102 and retroreflection portion 1101.

The storage 1170 is a storage device that records various kinds of information, for example, various kinds of data such as video data, image data, and audio data. The storage 1170 may be configured by a magnetic recording storage device such as a hard disk drive (HDD), a semiconductor element memory such as a solid state drive (SSD), or the like. In the storage 1170, for example, various kinds of information, for example, various kinds of data such as video data, image data, and audio data may be recorded in advance at the time of product shipment. In addition, the storage 1170 may record various kinds of information, for example, various kinds of data such as video data, image data, and audio data acquired from an external device, an external server, or the like via the communication unit 1132.

The video data, the image data, and the like recorded in the storage 1170 are output as the air floating video 3 via the video display 1102 and the retroreflection portion 1101. Video data, image data, and the like of display icons, an object to be operated by a user, and the like which are displayed as the air floating video 3 are also recorded in the storage 1170.

Layout information of display icons, an object, and the like displayed as the air floating video 3, information of various kinds of metadata related to the object, and the like are also recorded in the storage 1170. The audio data recorded in the storage 1170 is output as audio from, for example, the audio output unit 1140.

The video controller 1160 performs various kinds of control related to a video signal to be input to the video display 1102. The video controller 1160 may be referred to as a video processing circuit, and may be configured by hardware such as ASIC, FPGA, or video processor. Note that the video controller 1160 may be referred to also as a video processing unit or an image processing unit. For example, the video controller 1160 performs the control of video switching for determining which of a video signal stored in the memory 1109 or a video signal (video data) input to the video signal input unit 1131 is to be input to the video display 1102.

Also, the video controller 1160 may perform the control to form a composite video as the air floating video 3 by generating a superimposed video signal obtained by superimposing the video signal stored in the memory 1109 and the video signal input from the video signal input unit 1131 and inputting the superimposed video signal to the video display 1102.

Further, the video controller 1160 may perform the control to perform image processing on the video signal input from the video signal input unit 1131, the video signal to be stored in the memory 1109, or the like. Examples of the image processing include scaling processing for enlarging, reducing, and deforming an image, brightness adjustment processing for changing luminance, contrast adjustment processing for changing a contrast curve of an image, and retinex processing for decomposing an image into light components and changing weighting for each component.

In addition, the video controller 1160 may perform special effect video processing or the like for assisting an aerial operation (touch operation) of the user 230 to the video signal to be input to the video display 1102. The special effect video processing is performed based on, for example, the detection result of the touch operation of the user 230 by the aerial operation detector 1350 and the captured image of the user 230 by the imager 1180.

The attitude sensor 1113 is a sensor configured by a gravity sensor, an acceleration sensor, or a combination thereof, and can detect the attitude with which the air floating video display apparatus 1000 is installed. Based on the attitude detection result of the attitude sensor 1113, the controller 1110 may control the operation of each connected unit. For example, when an unfavorable attitude as the usage state of the user is detected, control to stop the display of the video displayed on the video display 1102 and display an error message to the user may be performed. Alternatively, when the attitude sensor 1113 detects that the installation attitude of the air floating video display apparatus 1000 has changed, control to rotate the display direction of the video displayed on the video display 1102 may be performed.

As described above, the air floating video display apparatus 1000 is provided with various functions. However, the air floating video display apparatus 1000 does not need to have all of these functions, and may have any configuration as long as the apparatus has a function of forming the air floating video 3.

<Configuration Example of Air Floating Video Display Apparatus>

Next, the configuration example of the air floating video display apparatus will be described. As the layout of the components of the air floating video display apparatus according to the present embodiment, various layouts are possible depending on the usage form. Each layout in FIG. 4A to FIG. 4M will be described below. Note that, in any of the examples in FIG. 4A to FIG. 4M, a thick line surrounding the air floating video display apparatus 1000 indicates an example of the housing structure of the air floating video display apparatus 1000.

Figure 4A:
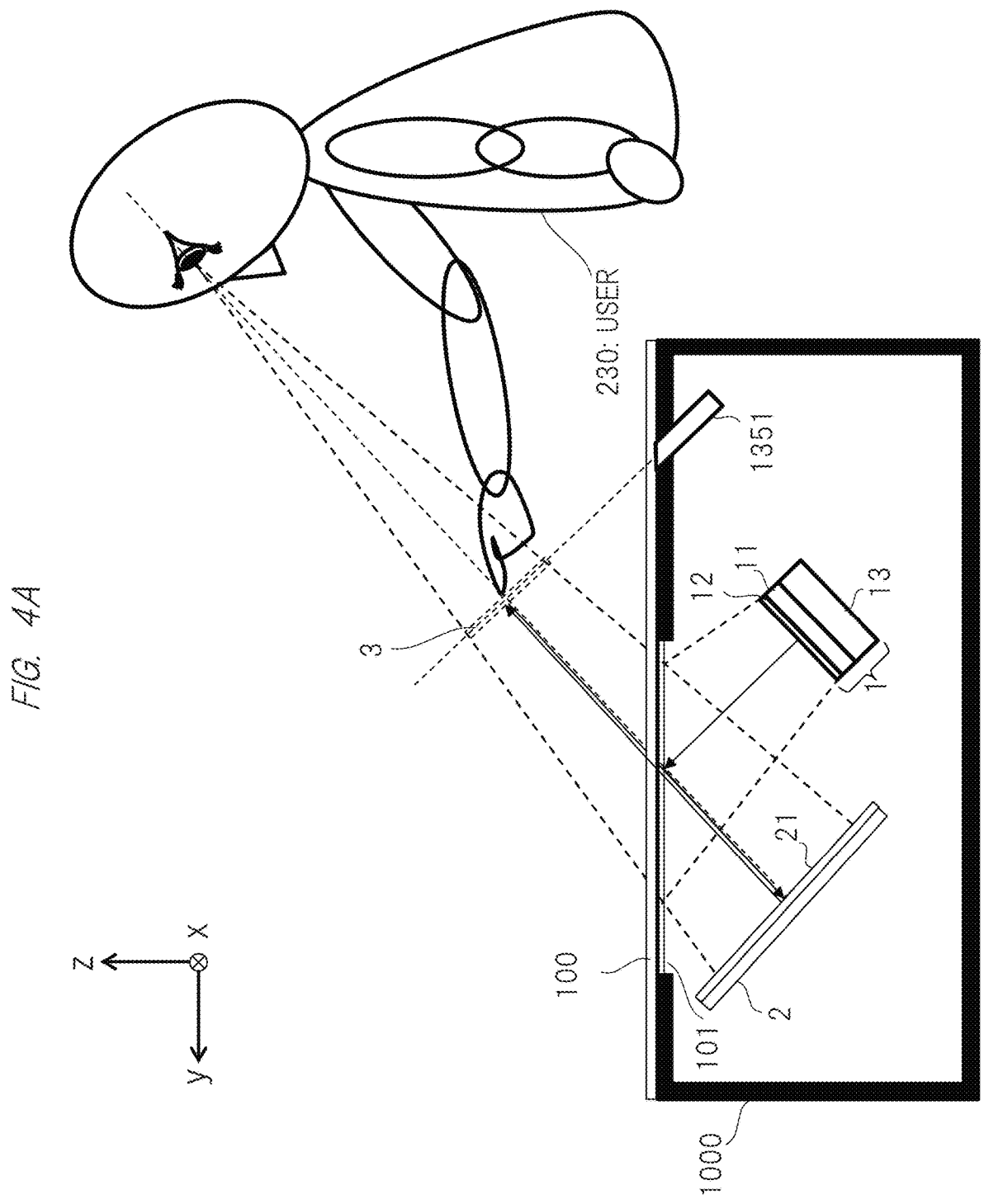
FIG. 4A is a diagram showing an example of the configuration of the air floating video display apparatus according to one embodiment of the present invention.

FIG. 4A is a diagram showing an example of the configuration of the air floating video display apparatus. The air floating video display apparatus 1000 shown in FIG. 4A is mounted with an optical system corresponding to the optical system shown in FIG. 2A. The air floating video display apparatus 1000 shown in FIG. 4A is installed horizontally such that the surface on the side where the air floating video 3 is formed faces upward. Namely, in FIG. 4A, the air floating video display apparatus 1000 has the transparent member 100 placed on an upper surface of the apparatus. The air floating video 3 is formed above the surface of the transparent member 100 of the air floating video display apparatus 1000. The light of the air floating video 3 travels obliquely upward. When the aerial operation detection sensor 1351 is provided as shown in the drawing, it is possible to detect the operation on the air floating video 3 by the finger of the user 230. Note that the x direction is the left-right direction when viewed from the user, the y direction is the front-rear direction (depth direction) when viewed from the user, and the z direction is the up-down direction (vertical direction). Hereinafter, since the definitions of the x direction, y direction, and z direction are the same in each drawing of FIG. 4A to FIG. 4M, repetitive description will be omitted.

Figure 4B:
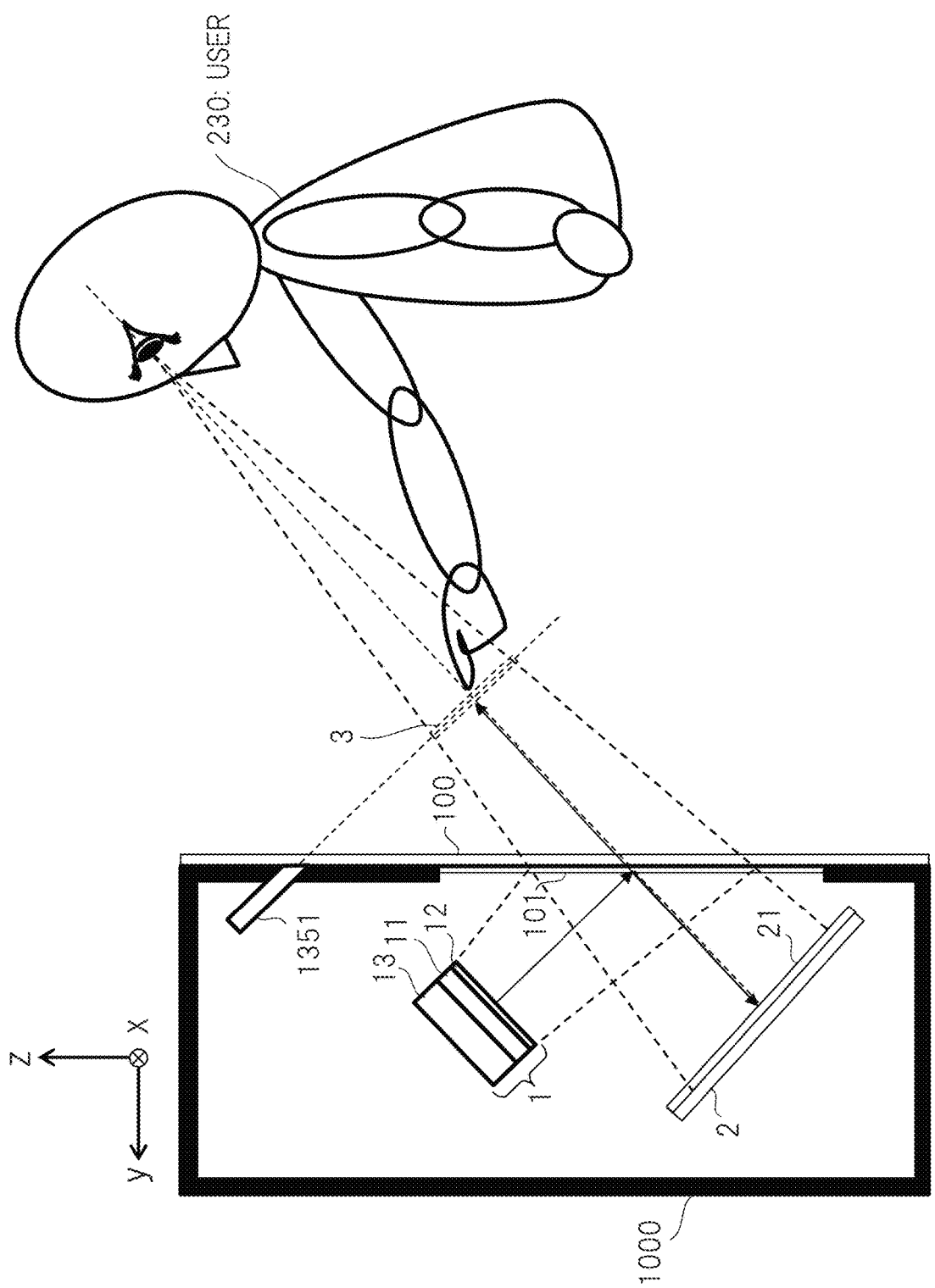
FIG. 4B is a diagram showing an example of the configuration of the air floating video display apparatus according to one embodiment of the present invention.

FIG. 4B is a diagram showing an example of the configuration of the air floating video display apparatus. The air floating video display apparatus 1000 shown in FIG. 4B is mounted with an optical system corresponding to the optical system shown in FIG. 2A. The air floating video display apparatus 1000 shown in FIG. 4B is installed vertically such that the surface on the side where the air floating video 3 is formed is located on the front side of the air floating video display apparatus 1000 (faces the user 230). Namely, in FIG. 4B, the air floating video display apparatus 1000 has the transparent member 100 placed on the front side of the apparatus (on the side of the user 230). The air floating video 3 is formed on the side of the user 230 with respect to the surface of the transparent member 100 of the air floating video display apparatus 1000. The light of the air floating video 3 travels obliquely upward. When the aerial operation detection sensor 1351 is provided as shown in the drawing, it is possible to detect the operation on the air floating video 3 by the finger of the user 230. Here, as shown in FIG. 4B, the aerial operation detection sensor 1351 can utilize the reflection of the sensing light by the nail of the user for touch detection by sensing the finger of the user 230 from above. Since a nail generally has a higher reflectance than a pad of a finger, this configuration can improve the accuracy of touch detection.

FIG. 4C is a diagram showing an example of the configuration of the air floating video display apparatus. The air floating video display apparatus 1000 shown in FIG. 4C is mounted with an optical system corresponding to the optical system shown in FIG. 2B. The air floating video display apparatus 1000 shown in FIG. 4C is installed horizontally such that the surface on the side where the air floating video 3 is formed faces upward. Namely, in FIG. 4C, the air floating video display apparatus 1000 has the transparent member 100 placed on the upper surface of the apparatus. The air floating video 3 is formed above the surface of the transparent member 100 of the air floating video display apparatus 1000. The light of the air floating video 3 travels obliquely upward. When the aerial operation detection sensor 1351 is provided as shown in the drawing, it is possible to detect the operation on the air floating video 3 by the finger of the user 230.

Figure 4D:
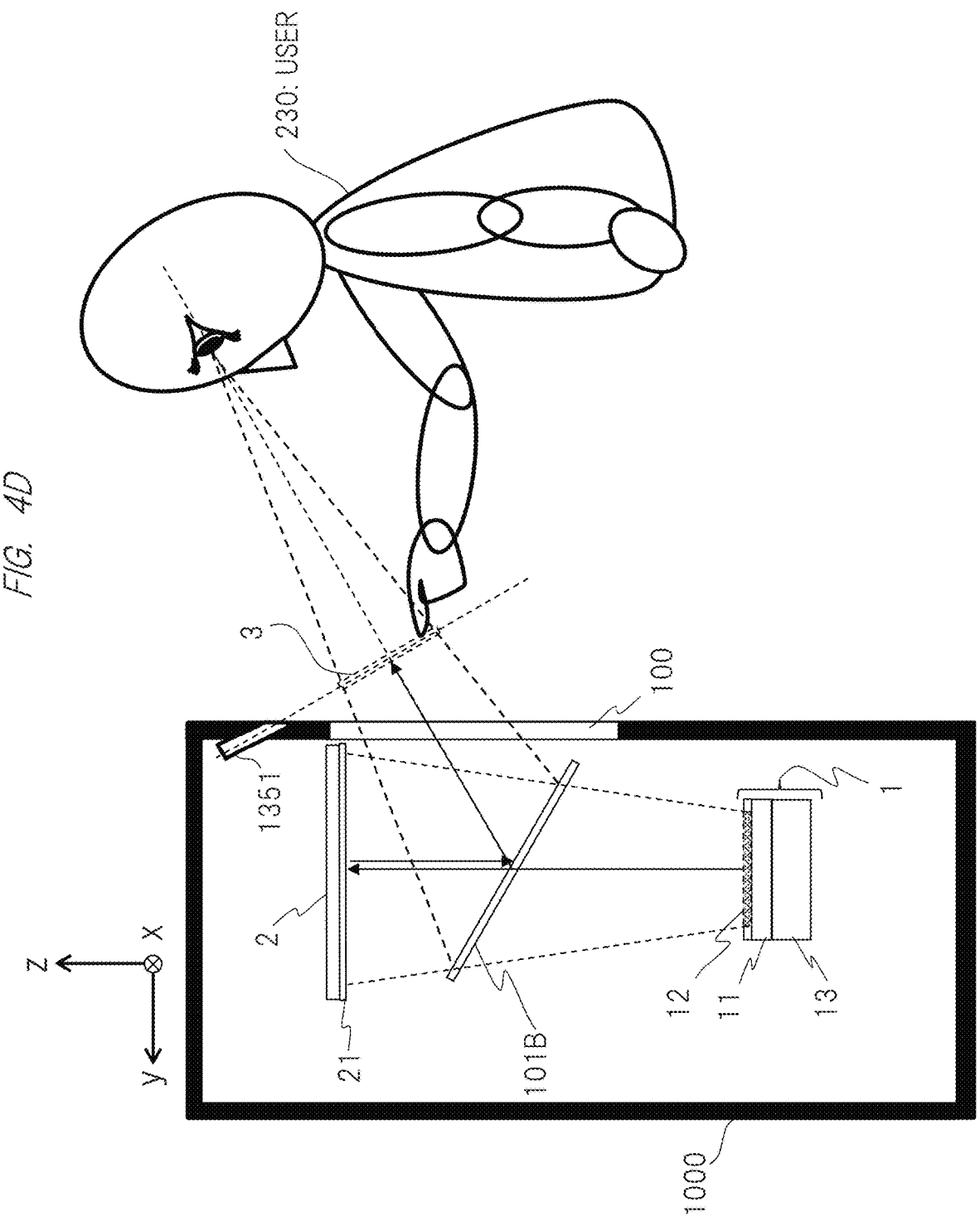
FIG. 4D is a diagram showing an example of the configuration of the air floating video display apparatus according to one embodiment of the present invention.

FIG. 4D is a diagram showing an example of the configuration of the air floating video display apparatus. The air floating video display apparatus 1000 shown in FIG. 4D is mounted with an optical system corresponding to the optical system shown in FIG. 2B. The air floating video display apparatus 1000 shown in FIG. 4D is installed vertically such that the surface on the side where the air floating video 3 is formed is located on the front side of the air floating video display apparatus 1000 (faces the user 230). Namely, in FIG. 4D, the air floating video display apparatus 1000 has the transparent member 100 placed on the front side of the apparatus (on the side of the user 230). The air floating video 3 is formed on the side of the user 230 with respect to the surface of the transparent member 100 of the air floating video display apparatus 1000. The light of the air floating video 3 travels obliquely upward. When the aerial operation detection sensor 1351 is provided as shown in the drawing, it is possible to detect the operation on the air floating video 3 by the finger of the user 230. Here, as shown in FIG. 4D, the aerial operation detection sensor 1351 can utilize the reflection of the sensing light by the nail of the user for touch detection by sensing the finger of the user 230 from above. Since a nail generally has a higher reflectance than a pad of a finger, this configuration can improve the accuracy of touch detection.

Figure 4E:
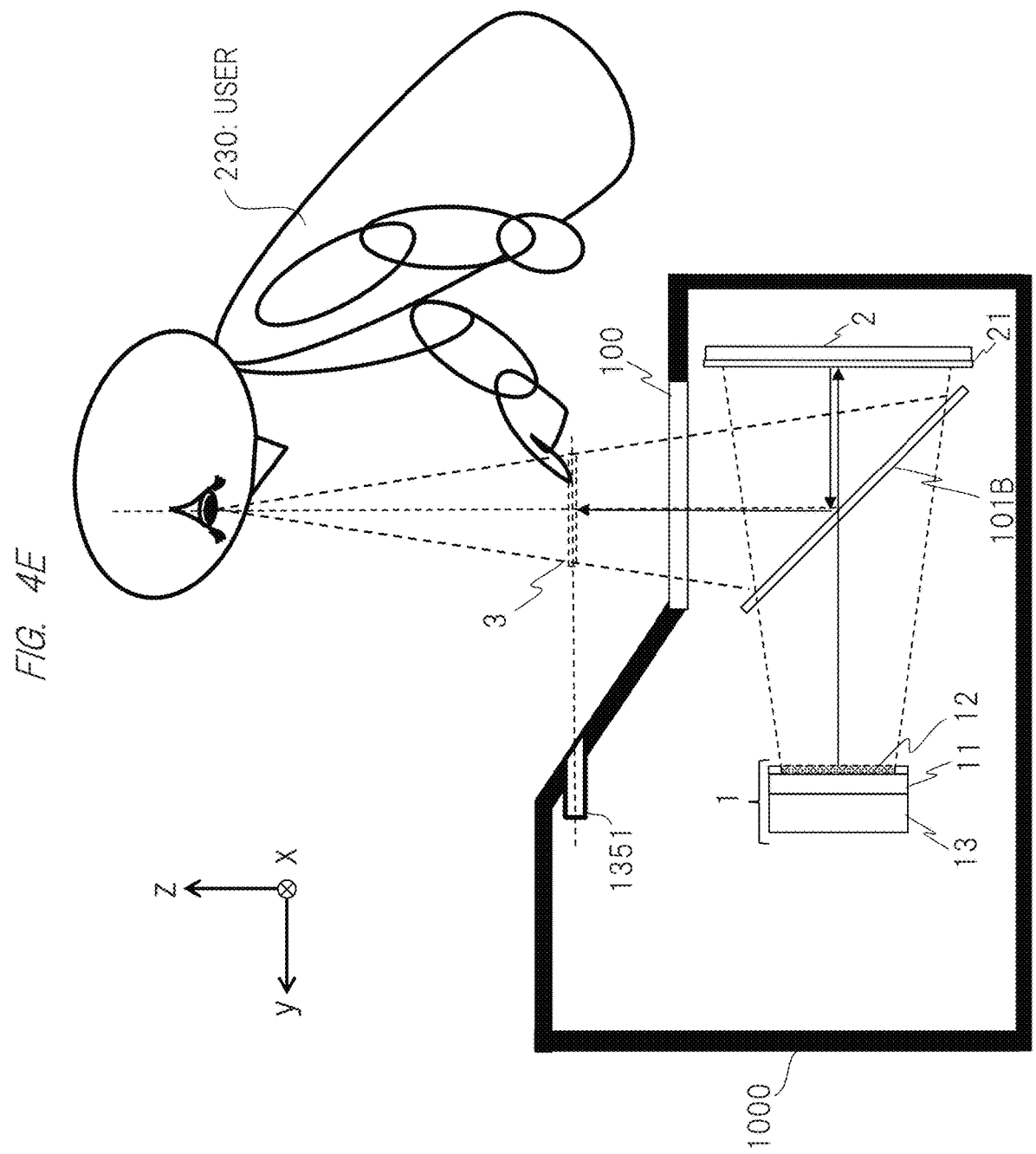
FIG. 4E is a diagram showing an example of the configuration of the air floating video display apparatus according to one embodiment of the present invention.

FIG. 4E is a diagram showing an example of the configuration of the air floating video display apparatus. The air floating video display apparatus 1000 shown in FIG. 4E is mounted with an optical system corresponding to the optical system shown in FIG. 2C. The air floating video display apparatus 1000 shown in FIG. 4E is installed horizontally such that the surface on the side where the air floating video 3 is formed faces upward. Namely, in FIG. 4E, the air floating video display apparatus 1000 has the transparent member 100 placed on the upper surface of the apparatus. The air floating video 3 is formed above the surface of the transparent member 100 of the air floating video display apparatus 1000. The light of the air floating video 3 travels directly upward. When the aerial operation detection sensor 1351 is provided as shown in the drawing, it is possible to detect the operation on the air floating video 3 by the finger of the user 230.

Figure 4F:
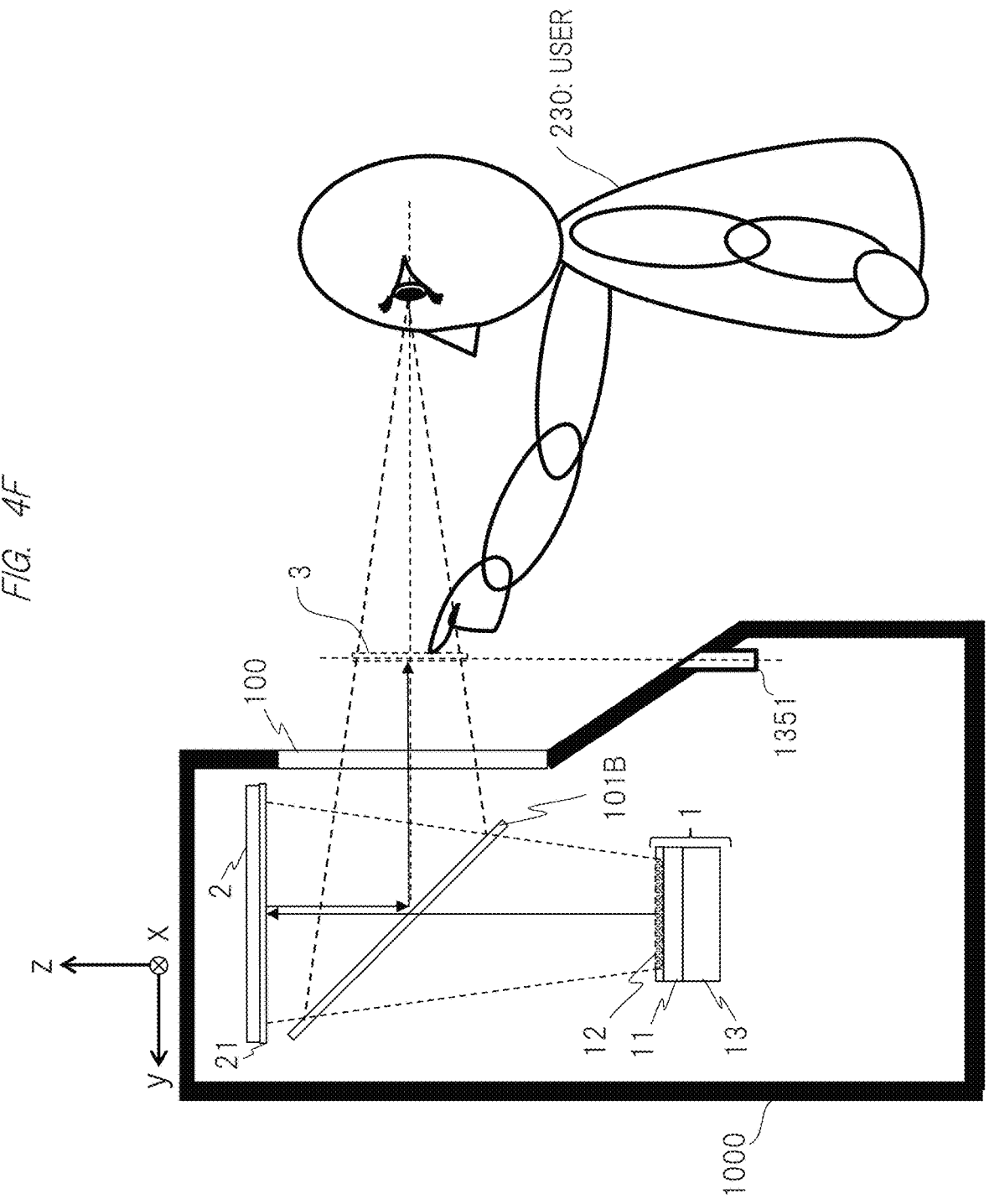
FIG. 4F is a diagram showing an example of the configuration of the air floating video display apparatus according to one embodiment of the present invention.

FIG. 4F is a diagram showing an example of the configuration of the air floating video display apparatus. The air floating video display apparatus 1000 shown in FIG. 4F is mounted with an optical system corresponding to the optical system shown in FIG. 2C. The air floating video display apparatus 1000 shown in FIG. 4F is installed vertically such that the surface on the side where the air floating video 3 is formed is located on the front side of the air floating video display apparatus 1000 (faces the user 230). Namely, in FIG. 4F, the air floating video display apparatus 1000 has the transparent member 100 placed on the front side of the apparatus (on the side of the user 230). The air floating video 3 is formed on the side of the user 230 with respect to the surface of the transparent member 100 of the air floating video display apparatus 1000. The light of the air floating video 3 travels toward the user. When the aerial operation detection sensor 1351 is provided as shown in the drawing, it is possible to detect the operation on the air floating video 3 by the finger of the user 230.

FIG. 4G is a diagram showing an example of the configuration of the air floating video display apparatus. The air floating video display apparatus 1000 shown in FIG. 4G is mounted with an optical system corresponding to the optical system shown in FIG. 2C. In the optical system of each air floating video display apparatus shown in FIG. 4A to FIG. 4F, the central optical path of the video light emitted from the display apparatus 1 is on the y-z plane. Namely, in the optical system of each air floating video display apparatus shown in FIG. 4A to FIG. 4F, the video light travels in the front-rear direction and the up-down direction when viewed from the user. On the other hand, in the optical system of the air floating video display apparatus shown in FIG. 4G, the central optical path of the video light emitted from the display apparatus 1 is on the x-y plane. Namely, in the optical system of the air floating video display apparatus shown in FIG. 4G, video light travels in the left-right direction and front-rear direction when viewed from the user. The air floating video display apparatus 1000 shown in FIG. 4G is installed such that the surface on the side where the air floating video 3 is formed is located on the front side of the apparatus (faces the user 230). Namely, in FIG. 4G, the air floating video display apparatus 1000 has the transparent member 100 placed on the front side of the apparatus (on the side of the user 230). The air floating video 3 is formed on the side of the user 230 with respect to the surface of the transparent member 100 of the air floating video display apparatus 1000. The light of the air floating video 3 travels toward the user. When the aerial operation detection sensor 1351 is provided as shown in the drawing, it is possible to detect the operation on the air floating video 3 by the finger of the user 230.

FIG. 4H is a diagram showing an example of the configuration of the air floating video display apparatus. The air floating video display apparatus 1000 in FIG. 4H is different from the air floating video display apparatus 1000 in FIG. 4G in that a window having a transparent plate 100B such as glass or plastic is provided on the rear side of the apparatus (on the opposite side of the position where the user 230 visually recognizes the air floating video 3, that is, on the opposite side of the traveling direction of the video light of the air floating video 3 toward the user 230). Since the other configuration is the same as that of the air floating video display apparatus in FIG. 4G, the repetitive description will be omitted. The air floating video display apparatus 1000 in FIG. 4H includes a window having the transparent plate 100B at a position on the opposite side of the traveling direction of the video light of the air floating video 3 with respect to the air floating video 3. Therefore, when the user 230 visually recognizes the air floating video 3, the user 230 can recognize the scenery behind the air floating video display apparatus 1000 as the background of the air floating video 3. Accordingly, the user 230 can perceive the air floating video 3 as if it is floating in the air in front of the scenery behind the air floating video display apparatus 1000. In this way, it is possible to further emphasize the sense of floating in the air of the air floating video 3.

Note that, depending on the polarization distribution of the video light output from the display apparatus 1 and the performance of the polarization separator 101B, there is a possibility that a part of the video light output from the display apparatus 1 is reflected by the polarization separator 101B and travels toward the transparent plate 100B. Depending on the coating property of the surface of the transparent plate 100B, the light may be reflected again on the surface of the transparent plate 100B and visually recognized by the user as stray light. Therefore, in order to prevent the stray light, the configuration in which the transparent plate 100B is not provided in the window on the rear side of the air floating video display apparatus 1000 is also possible.

Figure 4I:
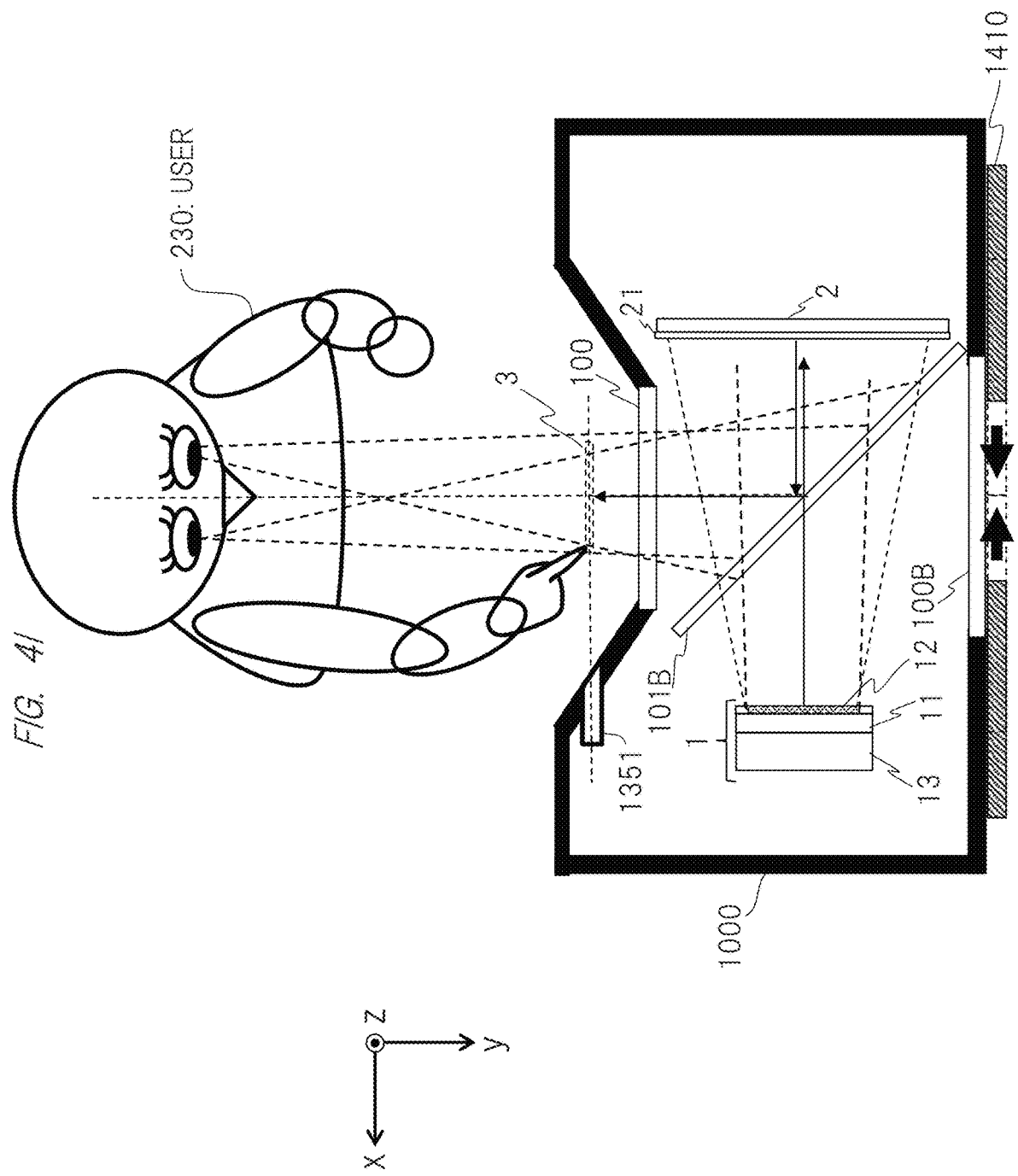
FIG. 4I is a diagram showing an example of the configuration of the air floating video display apparatus according to one embodiment of the present invention.

FIG. 4I is a diagram showing an example of the configuration of the air floating video display apparatus. The air floating video display apparatus 1000 in FIG. 4I is different from the air floating video display apparatus 1000 in FIG. 4H in that an opening/closing door 1410 for blocking light is provided on the window of the transparent plate 100B provided on the rear side of the apparatus (on the opposite side of the position where the user 230 visually recognizes the air floating video 3). Since the other configuration is the same as that of the air floating video display apparatus in FIG. 4H, the repetitive description will be omitted. The opening/closing door 1410 of the air floating video display apparatus 1000 in FIG. 4I includes, for example, a light-shielding plate and a mechanism for moving (sliding), rotating, or attaching/detaching the light-shielding plate, so that the state of the window (rear-side window) of the transparent plate 100B located on the rear side of the air floating video display apparatus 1000 can be switched between an open state and a light-shielding state. The movement (sliding) or rotation of the light-shielding plate of the opening/closing door 1410 may be electrically driven by a motor (not shown). The motor may be controlled by the controller 1110 in FIG. 3. Note that, in the example in FIG. 4I, the case in which the light-shielding plate of the opening/closing door 1410 is composed of two plate members is disclosed. On the other hand, the light-shielding plate of the opening/closing door 1410 may be composed of one plate member.

For example, when the scenery seen behind the window of the transparent plate 100B of the air floating video display apparatus 1000 is outdoors, the brightness of sunlight varies depending on the weather. If the sunlight outside is strong, the background of the air floating video 3 may become too bright, and the visibility of the air floating video 3 for the user 230 may be lowered. In such a case, if the rear-side window can be brought into the light-shielding state by moving (sliding), rotating, or attaching the light-shielding plate of the opening/closing door 1410, the background of the air floating video 3 becomes dark and the visibility of the air floating video 3 can be increased relatively. The shielding action by the light-shielding plate of the opening/closing door 1410 may be performed manually by the hand of the user 230. Alternatively, the shielding action by the light-shielding plate of the opening/closing door 1410 may be performed by a motor (not shown) under the control of the controller 1110 in response to the operation input via the operation input unit 1107 in FIG. 3.

Note that it is also possible to measure the brightness of the space beyond the rear-side window by providing an illuminance sensor on the back side of the air floating video display apparatus 1000 (the side opposite to the user 230), for example, near the rear-side window. In this case, the opening/closing action of the light-shielding plate of the opening/closing door 1410 may be performed by a motor (not shown) under the control of the controller 1110 in FIG. 3 based on the detection result of the illuminance sensor. By controlling the opening/closing action of the light-shielding plate of the opening/closing door 1410 in this manner, the visibility of the air floating video 3 can be favorably maintained even if the user 230 does not manually open and close the light-shielding plate of the opening/closing door 1410.

Further, the light-shielding plate of the opening/closing door 1410 may be configured to be manually attachable/detachable. Depending on the purpose of use and installation environment of the air floating video display apparatus 1000, the user can select whether the rear-side window is brought into an open state or a light-shielding state. If it is planned to use the air floating video display apparatus 1000 while keeping the rear-side window in the light-shieling state for a long period of time, the attachable/detachable light-shielding plate may be fixed in the light-shielding state. Meanwhile, if it is planned to use the air floating video display apparatus 1000 while keeping the rear-side window in the open state for a long period of time, the attachable/detachable light-shielding plate may be detached. The light-shielding plate may be attached and detached using screws, a hook structure, or a fitting structure.

Note that, even in the example of the air floating video display apparatus 1000 in FIG. 4I, depending on the polarization distribution of the video light output from the display apparatus 1 and the performance of the polarization separator 101B, there is a possibility that a part of the video light output from the display apparatus 1 is reflected by the polarization separator 101B and travels toward the transparent plate 100B. Depending on the coating property of the surface of the transparent plate 100B, the light may be reflected again on the surface of the transparent plate 100B and visually recognized by the user as stray light. Therefore, in order to prevent the stray light, the configuration in which the transparent plate 100B is not provided in the window on the rear side of the air floating video display apparatus 1000 is also possible. The above-described opening/closing door 1410 may be provided on the window that is not provided with the transparent plate 100B. In order to prevent the stray light, it is desirable that the inner surface of the light-shielding plate 1410 inside the housing has a coating or a material with low light reflectance.

Figure 4J:
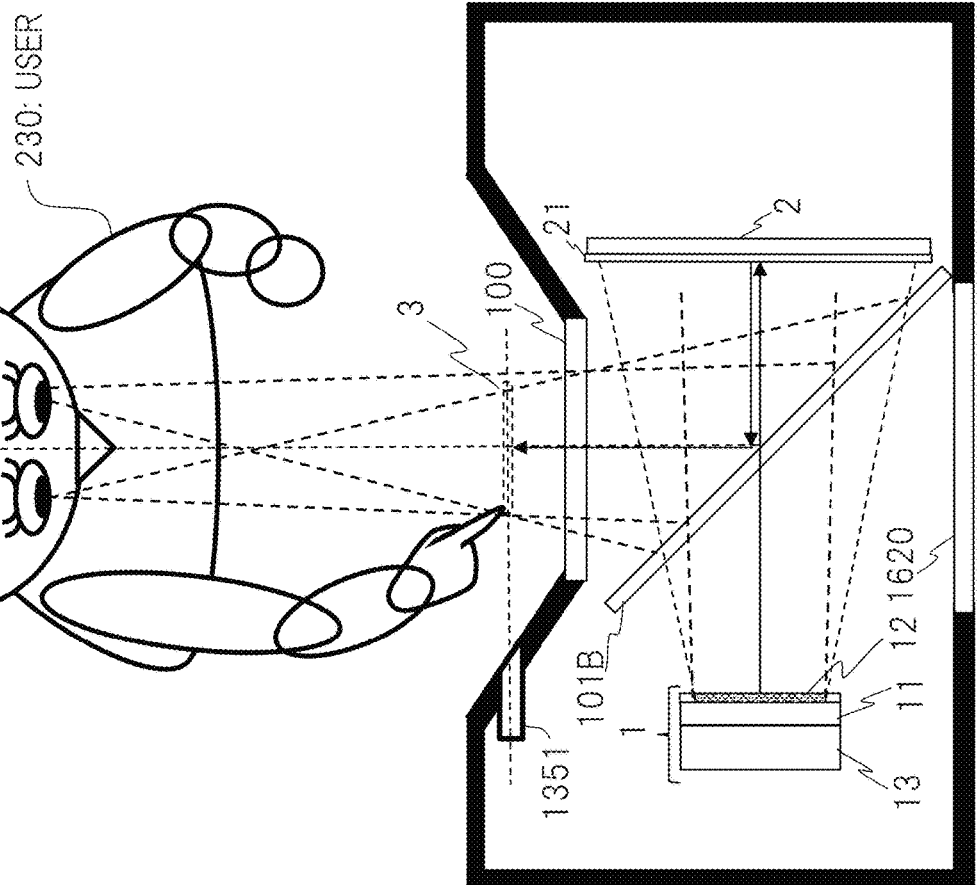
FIG. 4J is a diagram showing an example of the configuration of the air floating video display apparatus according to one embodiment of the present invention.

FIG. 4J is a diagram showing an example of the configuration of the air floating video display apparatus. The air floating video display apparatus 1000 in FIG. 4J is different from the air floating video display apparatus in FIG. 4H in that an electronically-controlled transmittance variable unit 1620 is arranged on the rear-side window instead of arranging the transparent plate 100B made of glass or plastic. Since the other configuration is the same as that of the air floating video display apparatus in FIG. 4H, the repetitive description will be omitted. An example of the electronically-controlled transmittance variable unit 1620 is a liquid crystal shutter or the like. Namely, the liquid crystal shutter can control the light transmittance by controlling the voltage applied to the liquid crystal element sandwiched between two polarization plates. Therefore, by controlling the liquid crystal shutter to increase the transmittance, the scenery beyond the rear-side window can be seen through the air floating video 3 on the background. Meanwhile, by controlling the liquid crystal shutter to reduce the transmittance, the scenery beyond the rear-side window cannot be seen through the air floating video 3 on the background. Further, since the halftone control is possible in the liquid crystal shutter, it can be set to, for example, a state of transmittance of 50%. For example, the controller 1110 can control the transmittance of the electronically-controlled transmittance variable unit 1620 in response to the operation input via the operation input unit 1107 in FIG. 3. With this configuration, in such a case where it is desired to see the scenery beyond the rear-side window as the background of the air floating video 3, but the scenery beyond the rear-side window on the background is too bright and the visibility of the air floating video 3 is lowered, the visibility of the air floating video 3 can be adjusted by controlling the transmittance of the electronically-controlled transmittance variable unit 1620.

Note that it is also possible to measure the brightness of the space beyond the rear-side window by providing an illuminance sensor on the back side of the air floating video display apparatus 1000 (the side opposite to the user 230), for example, near the rear-side window. In this case, the controller 1110 in FIG. 3 can control the transmittance of the electronically-controlled transmittance variable unit 1620 based on the detection result of the illuminance sensor. In this way, since the transmittance of the electronically-controlled transmittance variable unit 1620 can be adjusted based on the brightness of the space beyond the rear-side window even if the user 230 does not perform the operation input via the operation input unit 1107 in FIG. 3, it is possible to favorably maintain the visibility of the air floating video 3.

Furthermore, in the above example, the case where a liquid crystal shutter is used as the electronically-controlled transmittance variable unit 1620 has been described. Alternatively, electronic paper may be used as another example of the electronically-controlled transmittance variable unit 1620. Even in the case where electronic paper is used, the same effect as that described above can be obtained. Moreover, power consumption required to maintain the halftone state is very small in the electronic paper. Therefore, it is possible to realize the air floating video display apparatus with lower power consumption as compared with the case where a liquid crystal shutter is adopted.

FIG. 4K is a diagram showing an example of the configuration of the air floating video display apparatus. The air floating video display apparatus 1000 in FIG. 4K is different from the air floating video display apparatus in FIG. 4G in that a transmissive self-luminous video display apparatus 1650 is provided instead of the transparent member 100. Since the other configuration is the same as that of the air floating video display apparatus in FIG. 4G, the repetitive description will be omitted.

In the air floating video display apparatus 1000 in FIG. 4K, after the video light flux passes through the display surface of the transmissive self-luminous video display apparatus 1650, the air floating video 3 is formed outside the air floating video display apparatus 1000. Namely, when a video is being displayed on the transmissive self-luminous video display apparatus 1650 which is a two-dimensional flat display, the air floating video 3 can be displayed as a projected video on the front side of the user with respect to the video on the transmissive self-luminous video display apparatus 1650. At this time, the user 230 can visually recognize two videos at different depth positions at the same time. The transmissive self-luminous video display apparatus 1650 can be configured using existing techniques of a transmissive organic EL panel disclosed in, for example, Japanese Unexamined Patent Application Publication No. 2014-216761. Although the transmissive self-luminous video display apparatus 1650 is not shown in FIG. 3, it can be configured as a component of the air floating video display apparatus 1000 in FIG. 3 so as to be connected to the other processing units such as the controller 1110.

Here, for example, if the performance that both the background and objects such as characters are displayed on the transmissive self-luminous video display apparatus 1650 and then the objects such as characters only are moved to the air floating video 3 on the front side is executed, it is possible to provide the user 230 with a more effective video experience with surprising effects.

Further, if the inside of the air floating video display apparatus 1000 is set to the light-shielding state, the background of the transmissive self-luminous video display apparatus 1650 becomes sufficiently dark. Therefore, in the case where no video is displayed on the display apparatus 1 or the light source of the display apparatus 1 is turned off and the video is displayed only on the transmissive self-luminous video display apparatus 1650, the transmissive self-luminous video display apparatus 1650 appears to the user 230 as if it is an ordinary two-dimensional flat display rather than a transmissive display (since the air floating video 3 in the embodiment of the present invention is displayed as a real optical image in a space without a screen, the position where the air floating video 3 is to be displayed becomes an empty space when the light source of the display apparatus 1 is turned off). Therefore, if the characters and objects are suddenly displayed in the air as the air floating video 3 when the video is being displayed using the transmissive self-luminous video display apparatus 1650 as a general two-dimensional flat display, it is possible to provide the user 230 with a more effective video experience with surprising effects.

Note that the darker the inside of the air floating video display apparatus 1000 becomes, the more the transmissive self-luminous video display apparatus 1650 appears like a two-dimensional flat display. Therefore, an absorptive polarization plate (not shown) that transmits the polarized wave of the video light reflected by the polarization separator 101B and absorbs the polarized wave whose phase is different by 90° from this polarized wave may be provided on the inner surface of the transmissive self-luminous video display apparatus 1650 inside the air floating video display apparatus 1000 (the incident surface of the video light reflected by the polarization separator 101B to the transmissive self-luminous video display apparatus 1650, that is, the surface of the transmissive self-luminous video display apparatus 1650 on the side opposite to the air floating video 3). In this way, although the influence on the video light that forms the air floating video 3 is not so great, the light that enters the interior of the air floating video display apparatus 1000 from the outside via the transmissive self-luminous video display apparatus 1650 can be significantly reduced, and the interior of the air floating video display apparatus 1000 can be favorably made darker.

FIG. 4L is a diagram showing an example of the configuration of the air floating video display apparatus. The air floating video display apparatus 1000 in FIG. 4L is a modification of the air floating video display apparatus in FIG. 4K. The arrangement direction of the configuration in the air floating video display apparatus 1000 is different from that of the air floating video display apparatus shown in FIG. 4K, and is similar to that of the air floating video display apparatus shown in FIG. 4F. Since the functions, operations, and the like of each configuration are the same as those of the air floating video display apparatus in FIG. 4K, the repetitive description will be omitted.

In the air floating video display apparatus in FIG. 4L as well, after the light flux of the video light passes through the transmissive self-luminous video display apparatus 1650, the air floating video 3 is formed on the side of the user 230 with respect to the transmissive self-luminous video display apparatus 1650.

In both the example of the air floating video display apparatus in FIG. 4K and the example of the air floating video display apparatus in FIG. 4L, the air floating video 3 is displayed to be overlapped in front of the video of the transmissive self-luminous video display apparatus 1650 when viewed from the user 230. Here, the position of the air floating video 3 and the position of the video of the transmissive self-luminous video display apparatus 1650 are designed to be different in the depth direction. Therefore, when the user moves his or her head (position of the viewpoint), the depth of the two videos can be recognized based on the parallax. Therefore, by displaying two videos with different depth positions, a three-dimensional video experience can be more suitably provided to the user with naked eyes without the need for stereoscopic glasses or the like.

FIG. 4M is a diagram showing an example of the configuration of the air floating video display apparatus. In the air floating video display apparatus 1000 in FIG. 4M, a second display apparatus 1680 is provided on the rear side when viewed from the user with respect to the polarization separator 101B of the air floating video display apparatus in FIG. 4G. Since the other configuration is the same as that of the air floating video display apparatus in FIG. 4G, the repetitive description will be omitted.

In the configuration example shown in FIG. 4M, the second display apparatus 1680 is provided on the rear side of the display position of the air floating video 3, and the video display surface is directed toward the air floating video 3. With this configuration, when viewed from the user 230, two videos such as the video of the second display apparatus 1680 and the air floating video 3 which are displayed at two different depth positions can be visually recognized to be overlapped with each other. Namely, it can be said that the second display apparatus 1680 is arranged so as to display the video in the direction toward the user 230 who visually recognizes the air floating video 3. Although not shown in FIG. 3, the second display apparatus 1680 can be configured as a component of the air floating video display apparatus 1000 in FIG. 3 so as to be connected to other processors such as the controller 1110.

Note that the video light from the second display apparatus 1680 of the air floating video display apparatus 1000 in FIG. 4M is visually recognized by the user 230 after passing through the polarization separator 101B. Therefore, in order for the video light of the second display apparatus 1680 to pass through the polarization separator 101B more suitably, the video light output from the second display apparatus 1680 is desirably the light of a polarized wave having a vibration direction capable of passing through the polarization separator 101B more suitably. Namely, it is desirably the light of a polarized wave having the same vibration direction as the polarized wave of the video light output from the display apparatus 1. For example, when the video light output from the display apparatus 1 is S-polarized light, it is desirable that the video light output from the second display apparatus 1680 is also S-polarized light. Also, when the video light output from the display apparatus 1 is P-polarized light, it is desirable that the video light output from the second display apparatus 1680 is also P-polarized light.

The example of the air floating video display apparatus in FIG. 4M also has the same effect as those of the example of the air floating video display apparatus in FIG. 4K and the example of the air floating video display apparatus in FIG. 4L in that the second video is displayed behind the air floating video 3. However, unlike the example of the air floating video display apparatus in FIG. 4K and the example of the air floating video display apparatus in FIG. 4L, the light flux of the video light for forming the air floating video 3 does not pass through the second display apparatus 1680 in the example of the air floating video display apparatus in FIG. 4M. Therefore, the second display apparatus 1680 does not need to be a transmissive self-luminous video display apparatus, and may be a liquid crystal display that is a two-dimensional flat display. The second display apparatus 1680 may also be an organic EL display. Therefore, in the example of the air floating video display apparatus in FIG. 4M, the air floating video display apparatus 1000 can be realized at a lower cost than those in the example of the air floating video display apparatus in FIG. 4K and the example of the air floating video display apparatus in FIG. 4L.

Here, depending on the polarization distribution of the video light output from the display apparatus 1 and the performance of the polarization separator 101B, there is a possibility that a part of the video light output from the display apparatus 1 is reflected by the polarization separator 101B and travels toward the second apparatus 1680. This light (part of video light) may be reflected again on the surface of the second display apparatus 1680 and visually recognized by the user as stray light.

Therefore, in order to prevent the stray light, an absorptive polarization plate may be provided on the surface of the second display apparatus 1680. In this case, as the absorptive polarization plate, an absorptive polarization plate that transmits the polarized wave of the video light output from the second display apparatus 1680 and absorbs the polarized wave whose phase is different by 90° from the polarized wave of the video light output from the second display apparatus 1680 can be provided. Note that, when the second display apparatus 1680 is a liquid crystal display, an absorptive polarization plate is present also on the video emission side inside the liquid crystal display. However, when a cover glass (cover glass on the video display side) is present on the emission surface of the absorptive polarization plate on the video output side inside the liquid crystal display, it is not possible to prevent the stray light generated by the reflection of the cover glass by the light from outside of the liquid crystal display. Therefore, it is necessary to separately provide the above-mentioned absorptive polarization plate on the surface of the cover glass.

Note that, when a video is being displayed on the second display apparatus 1680 which is a two-dimensional flat display, the air floating video 3 can be displayed as a video on the front side of the user with respect to the video on the second display apparatus 1680. At this time, the user 230 can visually recognize two videos at different depth positions at the same time. By displaying the character on the air floating video 3 and displaying the background on the second display apparatus 1680, it is possible to provide an effect as if the user 230 is stereoscopically viewing the space in which the character exists.

Also, if the performance that both the background and objects such as characters are displayed on the second display apparatus 1680 and then the objects such as characters only are moved to the air floating video 3 on the front side is executed, it is possible to provide the user 230 with a more effective video experience with surprising effects.

<Display Apparatus>

Next, the display apparatus 1 of the present embodiment will be described with reference to the drawings. The display apparatus 1 of the present embodiment includes a video display element 11 (liquid crystal display panel) and the light source apparatus 13 constituting a light source thereof, and FIG. 5 shows the light source apparatus 13 together with the liquid crystal display panel as a developed perspective view.

Figure 5:
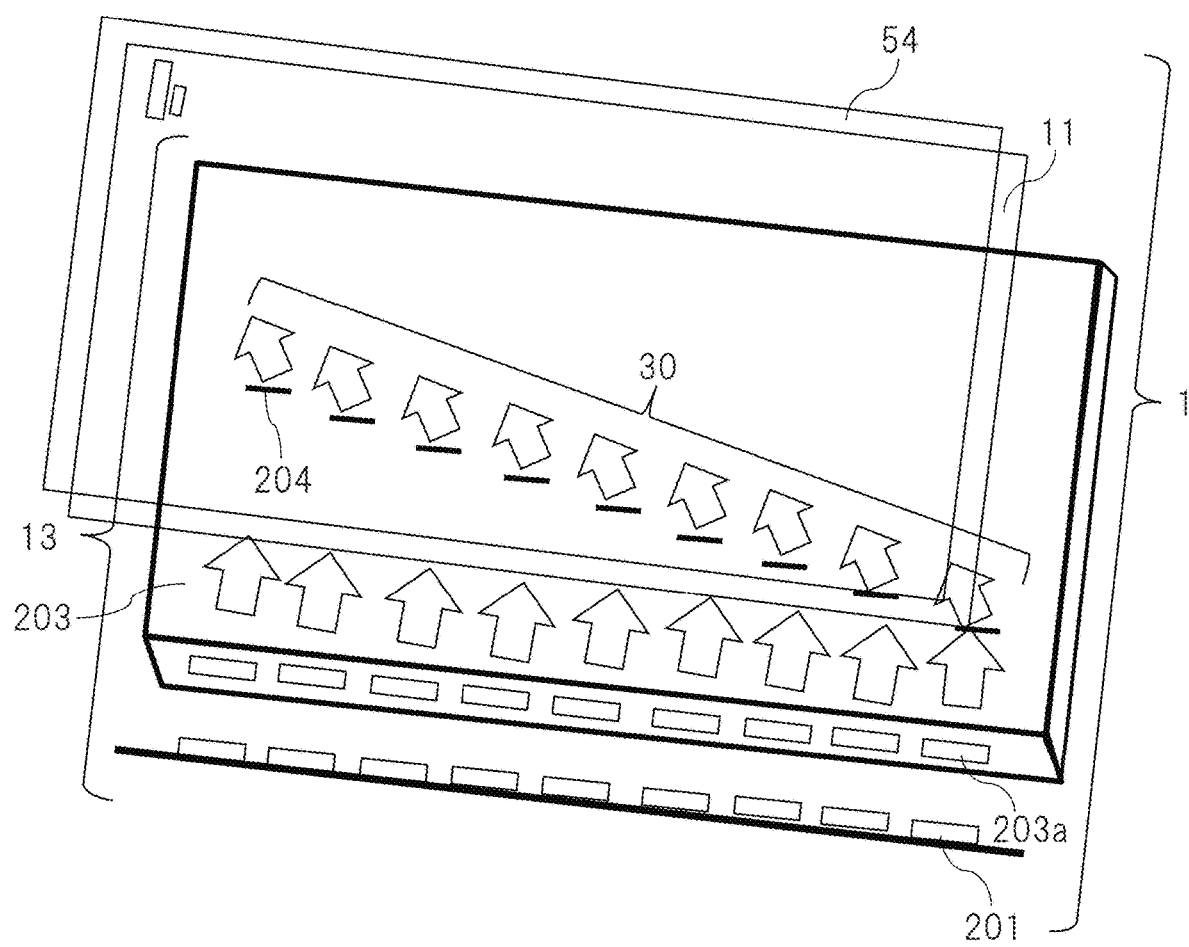
FIG. 5 is a cross-sectional view showing an example of a specific configuration of a light source apparatus according to one embodiment of the present invention.

In the liquid crystal display panel (video display element 11), as indicated by arrows 30 in FIG. 5, an illumination light flux having narrow-angle diffusion characteristics, that is, characteristics similar to laser light with strong directivity (straightness) and a polarization plane aligned in one direction is received from the light source apparatus 13 as a backlight apparatus. The liquid crystal display panel (video display element 11) modulates the received illumination light flux in accordance with an input video signal. The modulated video light is reflected by the retroreflection plate 2 and transmitted through the transparent member 100, thereby forming an air floating image as a real image (see FIG. 1).

Further, in FIG. 5, the display apparatus 1 includes the liquid crystal display panel 11, a light direction conversion panel 54 configured to control the directional characteristics of the light flux emitted from the light source apparatus 13, and a narrow-angle diffusion plate as needed (not shown). Namely, polarization plates are provided on both surfaces of the liquid crystal display panel 11, and video light of a specific polarized wave is emitted at the light intensity modulated by the video signal (see the arrows 30 in FIG. 5). Thus, a desired video is projected as the light of a specific polarized wave having high directivity (straightness) toward the retroreflection plate 2 via the light direction conversion panel 54, reflected by the retroreflection plate 2, and then transmitted toward the eyes of an observer outside the store (space), thereby forming the air floating video 3. Note that a protective cover 50 (see FIG. 6 and FIG. 7) may be provided on the surface of the light direction conversion panel 54 described above.

<Example of Display Apparatus (1)>

Figure 6:
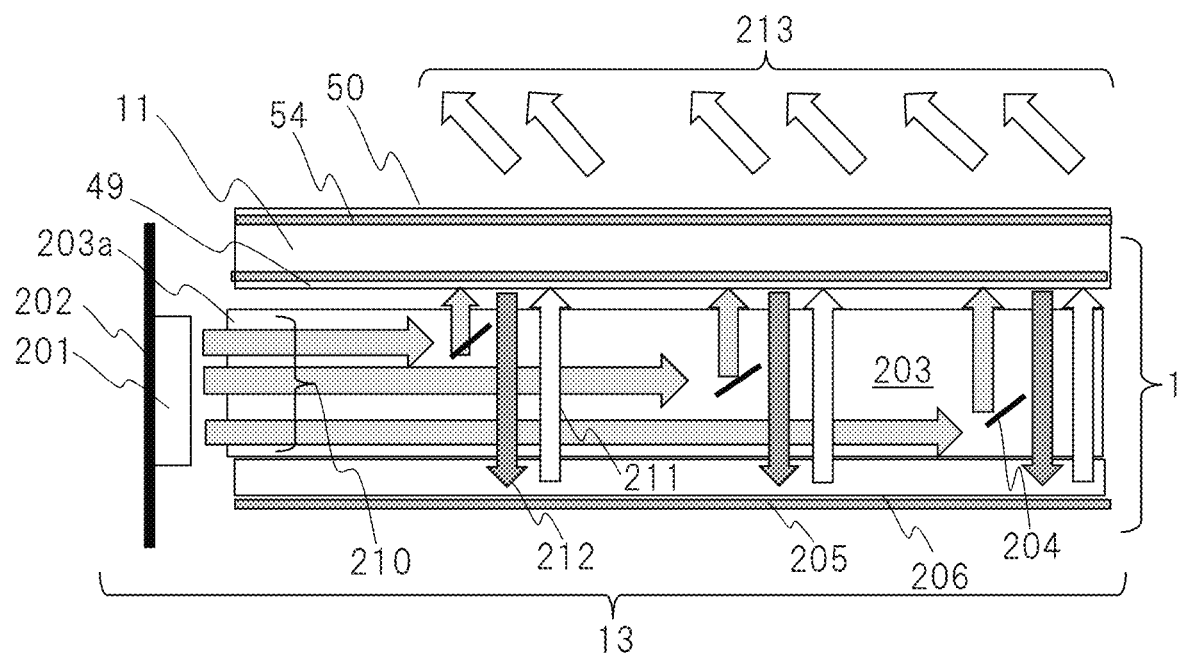
FIG. 6 is a cross-sectional view showing an example of the specific configuration of the light source apparatus according to one embodiment of the present invention.

FIG. 6 shows an example of a specific configuration of the display apparatus 1. In FIG. 6, the liquid crystal display panel 11 and the light direction conversion panel 54 are arranged on the light source apparatus 13 in FIG. 5. The light source apparatus 13 is formed of, for example, plastic or the like on a case shown in FIG. 5, and is configured to accommodate the LED element 201 and a light guide 203 therein. Also, as shown in FIG. 5 and the like, in order to convert the divergent light from each LED element 201 into a substantially parallel light flux, the end surface of the light guide 203 is provided with a lens shape in which the cross-sectional area gradually increases toward the opposite surface with respect to the light receiving portion and which has a function of gradually reducing the divergence angle when making total reflection plural times during the propagation therein. The liquid crystal display panel 11 constituting the display apparatus 1 is attached to the upper surface of the display apparatus 1. Further, the LED (Light Emitting Diode) element 201 which is a semiconductor light source and an LED substrate 202 on which a control circuit thereof is mounted are attached to one side surface (an end surface on the left side in this example) of the case of the light source apparatus 13. A heat sink which is a member for cooling heat generated in the LED element and the control circuit may be attached to an outer surface of the LED substrate 202.

Also, to a frame (not shown) of the liquid crystal display panel attached to the upper surface of the case of the light source apparatus 13, the liquid crystal display panel 11 attached to the frame, an FPC (Flexible Printed Circuits) board (not shown) electrically connected to the liquid crystal display panel 11, and the like are attached. Namely, the liquid crystal display panel 11 which is a video display element generates a display video by modulating the intensity of transmitted light based on a control signal from a control circuit (video controller 1160 in FIG. 3) constituting an electronic device together with the LED element 201 which is a solid-state light source. At this time, since the generated video light has a narrow diffusion angle and only a specific polarization component, it is possible to obtain a novel and unconventional video display apparatus which is close to a surface-emitting laser video source driven by a video signal. Note that, at present, it is impossible to obtain a laser light flux having the same size as the image obtained by the above-described display apparatus 1 by using a laser apparatus for both technical and safety reasons. Therefore, in the present embodiment, for example, light close to the above-described surface-emitting laser video light is obtained from a light flux from a general light source including an LED element.

Subsequently, the configuration of the optical system accommodated in the case of the light source apparatus 13 will be described in detail with reference to FIG. 6 and FIG. 7.

Figure 7:
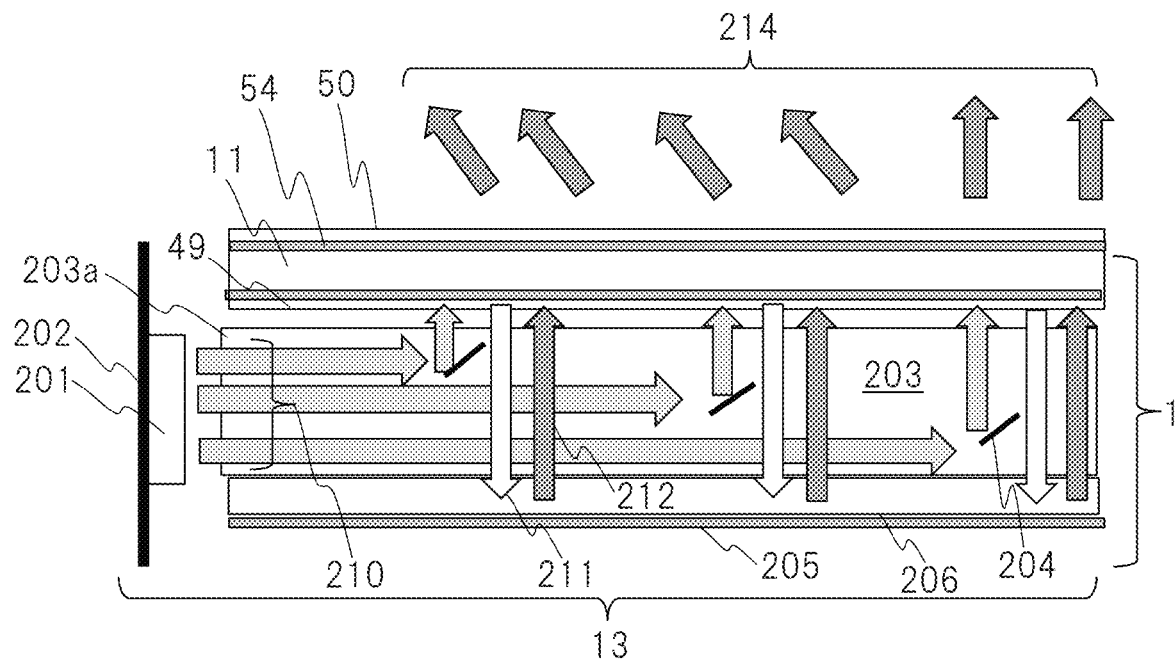
FIG. 7 is a cross-sectional view showing an example of the specific configuration of the light source apparatus according to one embodiment of the present invention.

Since FIG. 6 and FIG. 7 are cross-sectional views, only one of a plurality of LED elements 201 constituting the light source is shown, and the light from these elements is converted into substantially collimated light by the shape of a light-receiving end surface 203a of the light guide 203. Therefore, the light receiving portion on the end surface of the light guide and the LED element are attached while maintaining a predetermined positional relationship.

Note that each of the light guides 203 is formed of, for example, a translucent resin such as acrylic. Also, the LED light-receiving surface at one end of the light guide 203 has, for example, a conical convex outer peripheral surface obtained by rotating a parabolic cross section, the top thereof has a concave portion in which a convex portion (i.e., a convex lens surface) is formed at the central region, and the central region of the flat surface portion thereof has a convex lens surface protruding outward (or may be a concave lens surface recessed inward) (not shown). Note that the outer shape of the light receiving portion of the light guide to which the LED element 201 is attached is a paraboloid shape that forms a conical outer peripheral surface, and is set within a range of an angle at which light emitted from the LED element in the peripheral direction can be totally reflected inside the paraboloid, or has a reflection surface formed thereon.

On the other hand, each of the LED elements 201 is arranged at a predetermined position on the surface of the LED substrate 202 which is a circuit board for the LED elements. The LED substrate 202 is arranged and fixed to the LED collimator (the light-receiving end surface 203a) such that each of the LED elements 201 on the surface thereof is located at the central portion of the concave portion described above.

With such a configuration, the light emitted from the LED elements 201 can be extracted as substantially parallel light by the shape of the light-receiving end surface 203a of the light guide 203, and the utilization efficiency of the generated light can be improved.

As described above, the light source apparatus 13 is configured by attaching a light source unit, in which a plurality of LED elements 201 as light sources are arranged, to the light-receiving end surface 203a which is a light receiving portion provided on the end surface of the light guide 203, and the divergent light flux from the LED elements 201 is converted into substantially parallel light by the lens shape of the light-receiving end surface 203a on the end surface of the light guide, is guided through the inside of the light guide 203 (in the direction parallel to the drawing) as indicated by arrows, and is emitted toward the liquid crystal display panel 11 arranged substantially parallel to the light guide 203 (in the upward direction in the drawing) by a light flux direction converter 204. The uniformity of the light flux that enters the liquid crystal display panel 11 can be controlled by optimizing the distribution (density) of the light flux direction converter 204 by the shape inside the light guide or the shape of the surface of the light guide.

The above-described light flux direction converter 204 emits the light flux propagating through the inside of the light guide toward the liquid crystal display panel 11 (in the upward direction in the drawing) arranged substantially in parallel to the light guide 203 by the shape of the surface of the light guide or by providing a portion having a different refractive index inside the light guide. At this time, if the relative luminance ratio when comparing the luminance at the center of the screen with the luminance of the peripheral portion of the screen in a state in which the liquid crystal display panel 11 squarely faces the center of the screen and the viewpoint is placed at the same position as the diagonal dimension of the screen is 20% or more, there is no problem in practical use, and if the relative luminance ratio exceeds 30%, the characteristics will be even better.

Note that FIG. 6 is a cross-sectional layout drawing for describing the configuration and action of the light source of the present embodiment that performs polarization conversion in the light source apparatus 13 including the light guide 203 and the LED element 201 described above. In FIG. 6, the light source apparatus 13 is composed of, for example, the light guide 203 which is formed of plastic or the like and is provided with the light flux direction converter 204 on its surface or inside, the LED element 201 as a light source, a reflection sheet 205, a retardation plate 206, and a lenticular lens, and the liquid crystal display panel 11 including polarization plates on its light source light incident surface and video light emission surface is attached to the upper surface of the light source apparatus 13.

Also, a film-shaped or sheet-shaped reflective polarization plate 49 is provided on the light source light incident surface (lower surface in the drawing) of the liquid crystal display panel 11 corresponding to the light source apparatus 13, by which one polarized wave (e.g., a P-wave) 212 of the natural light flux 210 emitted from the LED element 201 is selectively reflected. The reflected light is reflected again by the reflection sheet 205 provided on one surface (lower side in the drawing) of the light guide 203, and is directed toward the liquid crystal display panel 11. Then, a retardation plate (λ/4 plate) is provided between the reflection sheet 205 and the light guide 203 or between the light guide 203 and the reflective polarization plate 49, and the light flux is reflected by the reflection sheet 205 to be made to pass through the retardation plate twice, so that the reflected light flux is converted from the P-polarized light to the S-polarized light and the utilization efficiency of the light source light as video light can be improved. The video light flux (arrows 213 in FIG. 6) whose light intensity is modulated by the video signal in the liquid crystal display panel 11 enters the retroreflection plate 2. An air floating image which is a real image can be obtained after the reflection on the retroreflection plate 2.

As with FIG. 6, FIG. 7 is a cross-sectional layout drawing for describing the configuration and action of the light source of the present embodiment that performs polarization conversion in the light source apparatus 13 including the light guide 203 and the LED element 201. The light source apparatus 13 is similarly composed of, for example, the light guide 203 which is formed of plastic or the like and is provided with the light flux direction converter 204 on its surface or inside, the LED element 201 as a light source, the reflection sheet 205, the retardation plate 206, and the lenticular lens. The liquid crystal display panel 11 including polarization plates on its light source light incident surface and video light emission surface is attached as the video display element to the upper surface of the light source apparatus 13.

Also, the film-shaped or sheet-shaped reflective polarization plate 49 is provided on the light source light incident surface (lower surface in the drawing) of the liquid crystal display panel 11 corresponding to the light source apparatus 13, by which one polarized wave (e.g., a S-wave) 211 of the natural light flux 210 emitted from the LED element 201 is selectively reflected. Namely, in the example in FIG. 7, the selective reflection property of the reflective polarization plate 49 is different from that in FIG. 6. The reflected light is reflected by the reflection sheet 205 provided on one surface (lower side in the drawing) of the light guide 203, and is directed toward the liquid crystal display panel 11. Then, a retardation plate (λ/4 plate) is provided between the reflection sheet 205 and the light guide 203 or between the light guide 203 and the reflective polarization plate 49, and the light flux is reflected by the reflection sheet 205 to be made to pass through the retardation plate twice, so that the reflected light flux is converted from the S-polarized light to the P-polarized light and the utilization efficiency of the light source light as video light can be improved. The video light flux (arrows 214 in FIG. 7) whose light intensity is modulated by the video signal in the liquid crystal display panel 11 enters the retroreflection plate 2. An air floating image which is a real image can be obtained after the reflection on the retroreflection plate 2.

In the light source apparatuses shown in FIG. 6 and FIG. 7, in addition to the action of the polarization plate provided on the light incident surface of the corresponding liquid crystal display panel 11, the polarization component on one side is reflected by the reflective polarization plate, and thus the contrast ratio theoretically obtained is the product of the reciprocal of the cross transmittance of the reflective polarization plate and the reciprocal of the cross transmittance obtained by the two polarization plates attached to the liquid crystal display panel. Therefore, high contrast performance can be obtained. In practice, it has been experimentally confirmed that the contrast performance of the display image is improved by 10 times or more. As a result, a high-quality video comparable to the video of a self-luminous organic EL can be obtained.

<Example of Display Apparatus (2)>

Figure 8:
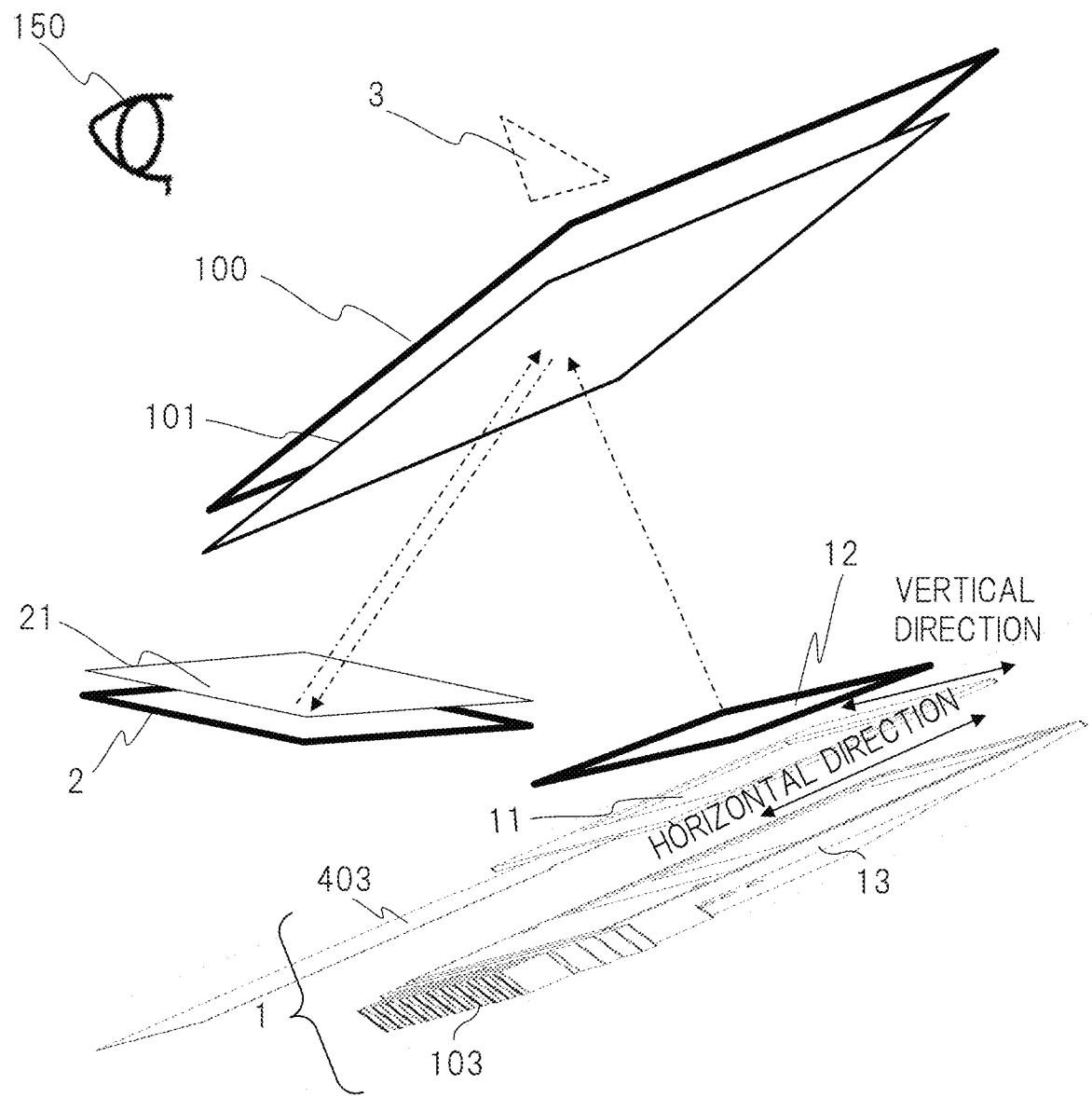
FIG. 8 is a layout drawing showing a main part of the air floating video display apparatus according to one embodiment of the present invention.

FIG. 8 shows another example of a specific configuration of the display apparatus 1. The light source apparatus 13 is configured by accommodating an LED, a collimator, a synthetic diffusion block, a light guide, and the like in a case made of, for example, plastic, and the liquid crystal display panel 11 is attached to the upper surface thereof. Further, LED (Light Emitting Diode) elements 14a and 14b which are semiconductor light sources and an LED substrate on which a control circuit thereof is mounted are attached to one side surface of the case of the light source apparatus 13, and a heat sink 103 which is a member for cooling the heat generated in the LED elements and the control circuit is attached to an outer surface of the LED substrate.

Also, to a frame of the liquid crystal display panel attached to the upper surface of the case, the liquid crystal display panel 11 attached to the frame, an FPC (Flexible Printed Circuits) board 403 electrically connected to the liquid crystal display panel 11, and the like are attached. Namely, the liquid crystal display panel 11 which is a liquid crystal display element generates a display video by modulating the intensity of transmitted light based on a control signal from a control circuit (not shown here) constituting an electronic device together with the LED elements 14a and 14b which are solid-state light sources.

<Example of Display Apparatus (3)>

Next, another example of the specific configuration of the display apparatus 1 (example of display apparatus (3)) will be described with reference to FIG. 9. The light source apparatus of the display apparatus 1 converts a divergent light flux of the light from the LED (in which P-polarized light and S-polarized light are mixed) into a substantially parallel light flux by a collimator 18, and the converted light flux is reflected by the reflection surface of the reflective light guide 304 toward the liquid crystal display panel 11. Such reflected light enters the reflective polarization plate 49 arranged between the liquid crystal display panel 11 and the reflective light guide 304. The reflective polarization plate 49 transmits the light of a specific polarized wave (for example, P-polarized light) and allows the transmitted polarized light to enter the liquid crystal display panel 11. Here, the polarized wave (for example, S-polarized wave) other than the specific polarized wave is reflected by the reflective polarization plate 49 and directed toward the reflective light guide 304 again.

The reflective polarization plate 49 is installed to be inclined with respect to the liquid crystal display panel 11 so as not to be perpendicular to the principal light ray of the light from the reflection surface of the reflective light guide 304. Then, the principal light ray of the light reflected by the reflective polarization plate 49 enters the transmission surface of the reflective light guide 304. The light that has entered the transmission surface of the reflective light guide 304 is transmitted through the back surface of the reflective light guide 304, is transmitted through a λ/4 plate 270 as a retardation plate, and is reflected by a reflection plate 271. The light reflected by the reflection plate 271 is transmitted through the λ/4 plate 270 again and is transmitted through the transmission surface of the reflective light guide 304. The light transmitted through the transmission surface of the reflective light guide 304 enters the reflective polarization plate 49 again.

At this time, since the light that enters the reflective polarization plate 49 again has passed through the λ/4 plate 270 twice, the polarization thereof is converted into a polarized wave (for example, P-polarized light) that can pass through the reflective polarization plate 49. Therefore, the light whose polarization has been converted passes through the reflective polarization plate 49 and enters the liquid crystal display panel 11. Regarding the polarization design related to polarization conversion, the polarization may be reversed from that in the above description (the S-polarized light and the P-polarized light may be reversed).

As a result, the light from the LED is aligned into a specific polarized wave (e.g., a P-polarized light) and enters the liquid crystal panel 11. Then, after the luminance is modulated in accordance with the video signal, the video is displayed on the panel surface. As in the above-described example, a plurality of LEDs constituting the light source are provided (however, only one LED is shown in FIG. 9 due to the vertical cross section), and these LEDs are attached at predetermined positions with respect to the collimators 18.

Note that each of the collimators 18 is formed of, for example, a translucent resin such as acrylic or glass. Further, the collimator 18 may have a conical convex outer peripheral surface obtained by rotating a parabolic cross section. Also, a concave portion in which a convex portion (i.e., a convex lens surface) is formed may be provided at the central portion of the top of the collimator 18 (on the side facing the LED substrate 102). In addition, a convex lens surface protruding outward (or may be a concave lens surface recessed inward) is provided at the central portion of the flat surface portion of the collimator 18 (on the opposite side of the top mentioned above). Note that the paraboloid that forms the conical outer peripheral surface of the collimator 18 is set within a range of an angle at which light emitted from the LED in the peripheral direction can be totally reflected inside the paraboloid, or has a reflection surface formed thereon.

Note that each of the LEDs is arranged at a predetermined position on the surface of the LED substrate 102 which is a circuit board for the LEDs. The LED substrate 102 is arranged and fixed to the collimator 18 such that each of the LEDs on the surface thereof is located at the central portion at the top of the conical convex portion (concave portion when there is the concave portion at the top).

With such a configuration, of the light emitted from the LED, in particular, the light emitted from the central portion thereof is condensed into parallel light by the convex lens surface forming the outer shape of the collimator 18. Also, the light emitted from the other portion toward the peripheral direction is reflected by the paraboloid forming the conical outer peripheral surface of the collimator 18, and is similarly condensed into parallel light. In other words, with the collimator 18 having a convex lens formed at the central portion thereof and a paraboloid formed in the peripheral portion thereof, it is possible to extract substantially all of the light generated by the LED as parallel light, and to improve the utilization efficiency of the generated light.

Figure 9:
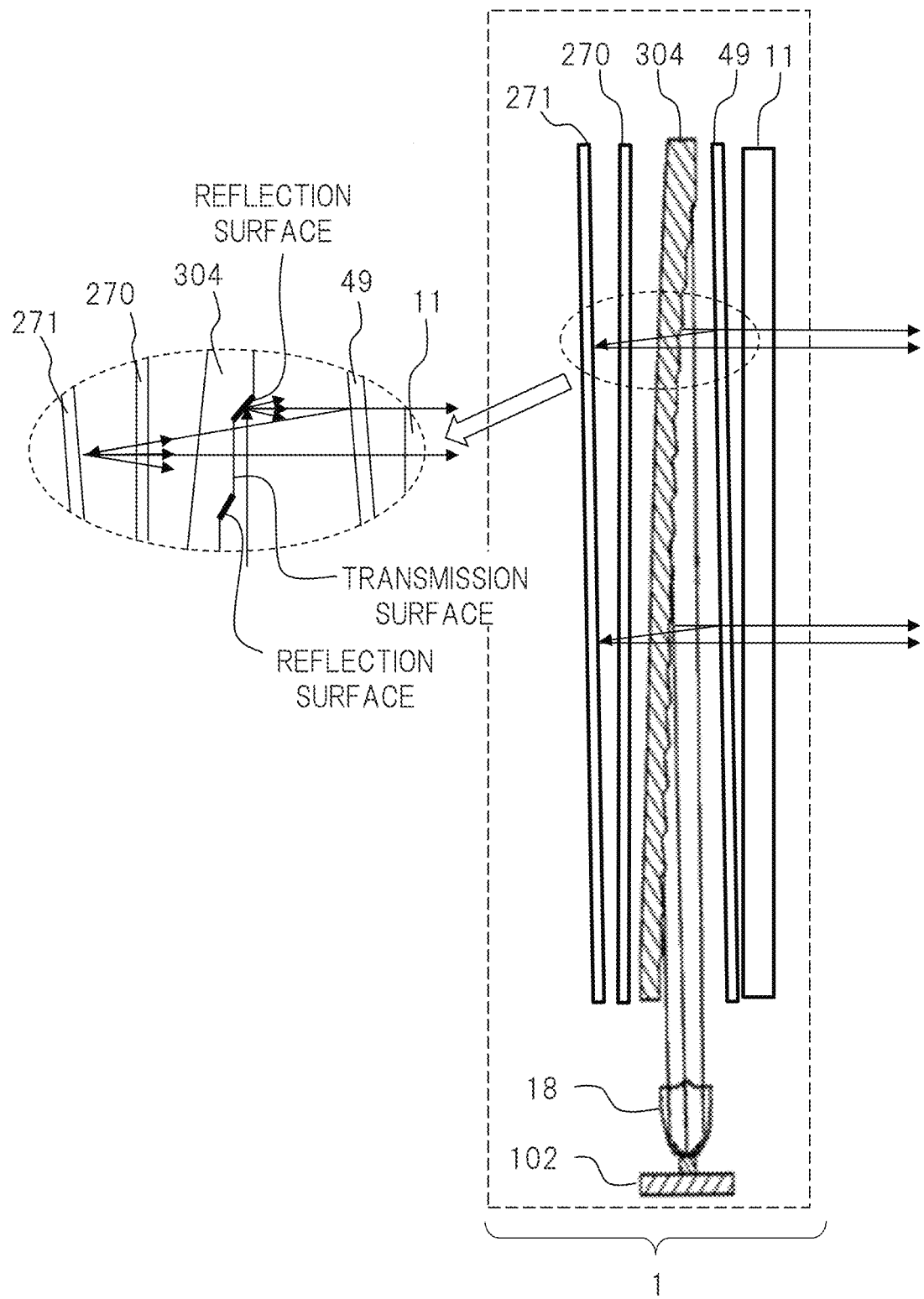
FIG. 9 is a cross-sectional view showing a configuration of a display apparatus according to one embodiment of the present invention.

Furthermore, the light converted into substantially parallel light by the collimator 18 shown in FIG. 9 is reflected by the reflective light guide 304. The light of a specific polarized wave of such light is transmitted through the reflective polarization plate 49 by the action of the reflective polarization plate 49, and the light of the other polarized wave reflected by the action of the reflective polarization plate 49 is transmitted through the light guide 304 again. The light is reflected by the reflection plate 271 located at a position opposite to the liquid crystal display panel 11 with respect to the reflective light guide 304. At this time, the polarization of the light is converted by passing through the λ/4 plate 270, which is a retardation plate, twice. The light reflected by the reflection plate 271 is transmitted through the light guide 304 again and enters the reflective polarization plate 49 provided on the opposite surface. Since the incident light has been subjected to polarization conversion, it is transmitted through the reflective polarization plate 49 and enters the liquid crystal display panel 11 with the aligned polarization direction. As a result, all of the light from the light source can be used, and the utilization efficiency of light in geometrical optics is doubled. Further, the degree of polarization (extinction ratio) of the reflective polarization plate is also multiplied with the extinction ratio of the entire system, so that the contrast ratio of the overall display apparatus is significantly improved by using the light source apparatus of the present embodiment. Also, by adjusting the surface roughness of the reflection surface of the reflective light guide 304 and the surface roughness of the reflection plate 271, the reflection diffusion angle of light on each reflection surface can be adjusted. It is preferable that the surface roughness of the reflection surface of the reflective light guide 304 and the surface roughness of the reflection plate 271 are adjusted for each design such that the uniformity of the light entering the liquid crystal display panel 11 becomes more favorable.

Note that the λ/4 plate 270 which is the retardation plate in FIG. 9 does not necessarily have the phase difference of λ/4 with respect to the polarized light that has vertically entered the λ/4 plate 270. In the configuration of FIG. 9, any retardation plate may be used as long as it can change the phase by 90° (λ/2) when the polarized light passes through it twice.

The thickness of the retardation plate may be adjusted in accordance with the incident angle distribution of polarized light.

<Example of Display Apparatus (4)>

Further, another example (example of display apparatus (4)) of the configuration of the optical system of the light source apparatus or the like of the display apparatus will be described with reference to FIG. 10. This is a configuration example in which a diffusion sheet is used instead of the reflective light guide 304 in the light source apparatus in the example of display apparatus (3). Specifically, two optical sheets (optical sheet 207A and optical sheet 207B) for converting the diffusion characteristics in the vertical direction and the horizontal direction of the drawing are provided on the light emission side of the collimator 18, and the light from the collimator 18 is made to enter between the two optical sheets (diffusion sheets).

Note that, this optical sheet may be composed of one sheet rather than two sheets. When composed of one sheet, the vertical and horizontal diffusion characteristics are adjusted by the fine shapes of the front surface and the back surface of the one optical sheet. Alternatively, a plurality of diffusion sheets may be used to share the function. Here, in the example in FIG. 10, it is preferable that the reflection diffusion characteristics by the front surface shapes and the back surface shapes of the optical sheet 207A and the optical sheet 207B are optimally designed with using the number of LEDs, the divergence angle from the LED substrate (optical element) 102, and optical specifications of the collimator 18 as design parameters such that the surface density of the light flux emitted from the liquid crystal display panel 11 is uniform. In other words, the diffusion characteristics are adjusted by the surface shapes of the plurality of diffusion sheets instead of the light guide.

Figure 10:
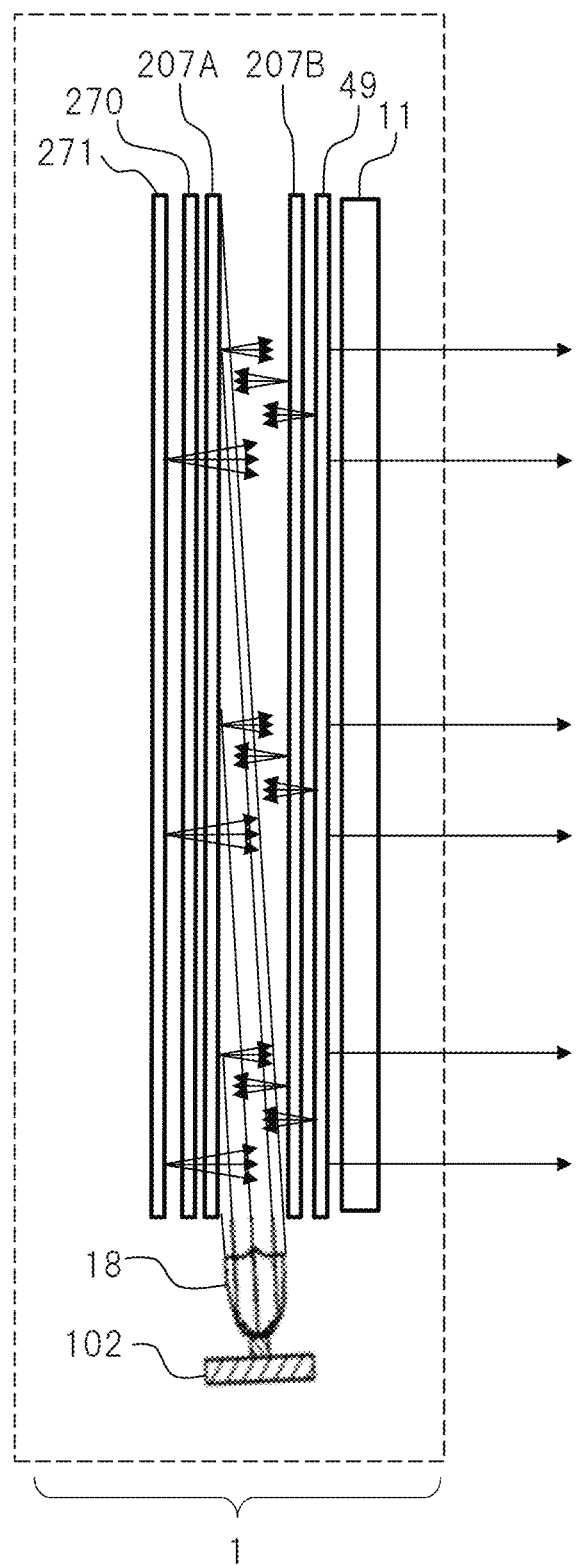
FIG. 10 is a cross-sectional view showing a configuration of the display apparatus according to one embodiment of the present invention.

In the example in FIG. 10, the polarization conversion is performed in the same manner as in the example of display apparatus (3) described above. Namely, in the example in FIG. 10, the reflective polarization plate 49 may be configured to have the property of reflecting the S-polarized light (and transmitting the P-polarized light). In that case, of the light emitted from the LED as a light source, the P-polarized light is transmitted and the transmitted light enters the liquid crystal display panel 11. Of the light emitted from the LED as a light source, the S-polarized light is reflected and the reflected light is transmitted through the retardation plate 270 shown in FIG. 10. The light that has passed through the retardation plate 270 is reflected by the reflection plate 271.

The light reflected by the reflection plate 271 is converted into the P-polarized light by passing through the retardation plate 270 again. The light that has been subjected to the polarization conversion is transmitted through the reflective polarization plate 49 and enters the liquid crystal display panel 11.

Note that the λ/4 plate 270 which is the retardation plate in FIG. 10 does not necessarily have the phase difference of λ/4 with respect to the polarized light that has vertically entered the λ/4 plate 270. In the configuration of FIG. 10, any retardation plate may be used as long as it can change the phase by 90° (λ/2) when the polarized light is transmitted through it twice. The thickness of the retardation plate may be adjusted in accordance with the incident angle distribution of polarized light. Also in FIG. 10, regarding the polarization design related to polarization conversion, the polarization may be reversed from that in the above description (the S-polarized light and the P-polarized light may be reversed).

Figure 12:
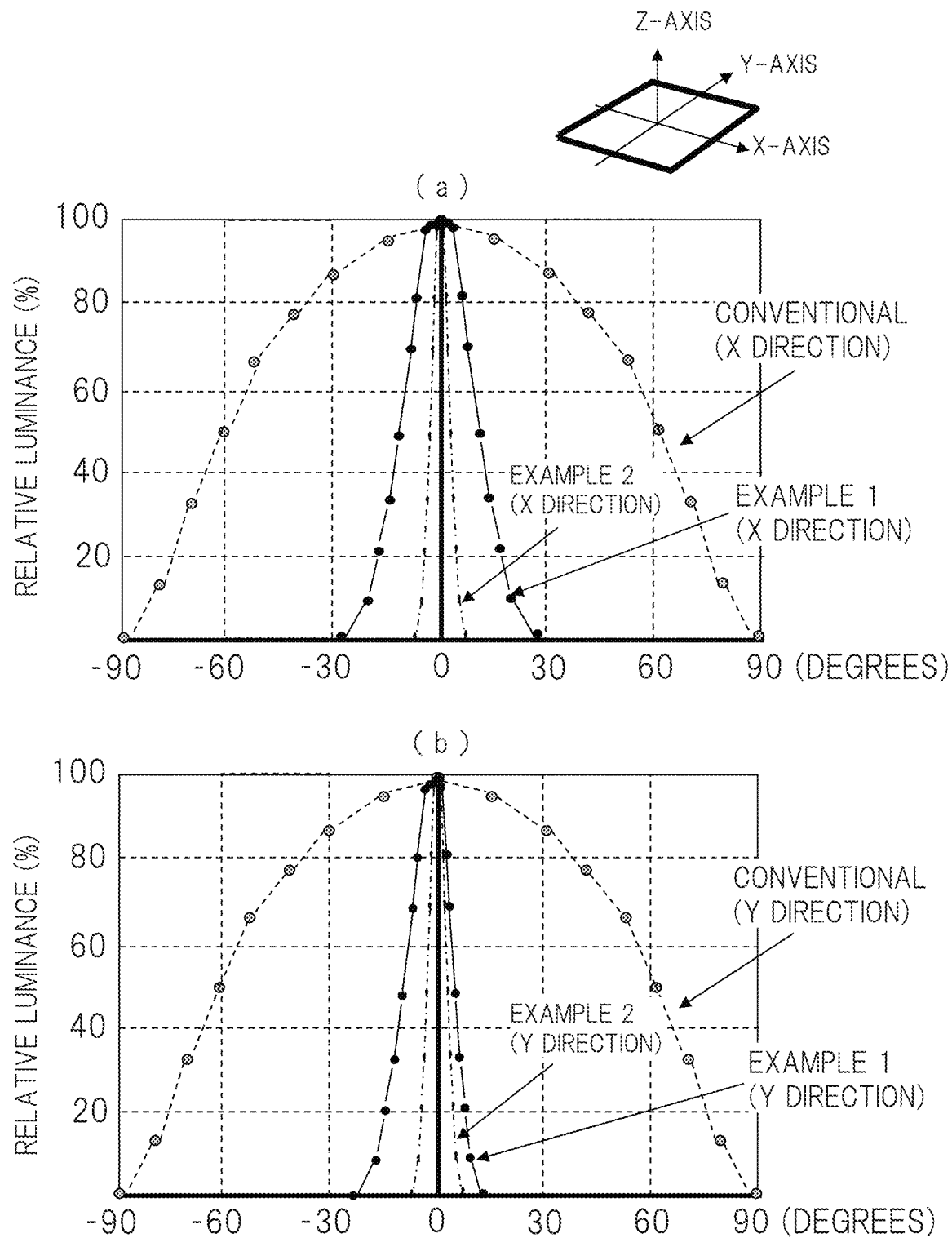
FIG. 12 is an explanatory diagram for describing diffusion characteristics of the video display apparatus according to one embodiment of the present invention.

In an apparatus for use in a general TV set, the light emitted from the liquid crystal display panel 11 has similar diffusion characteristics in both the horizontal direction of the screen (indicated by the X axis in FIG. 12(a)) and the vertical direction of the screen (indicated by the Y axis in FIG. 12(b)). On the other hand, in the diffusion characteristics of the light flux emitted from the liquid crystal display panel of the present embodiment, for example, as shown in Example 1 in FIG. 12, the viewing angle at which the luminance becomes 50% of that in front view (angle of 0 degrees) is 13 degrees, and this is 1/5 of 62 degrees in the apparatus for use in a general TV set. Similarly, the reflection angle of the reflective light guide, the area of the reflection surface, and the like are optimized such that the viewing angle in the vertical direction is made uneven in the upper and lower sides and the viewing angle on the upper side is suppressed to about 1/3 of the viewing angle on the lower side. As a result, the amount of video light toward the viewing direction is significantly improved as compared with the conventional liquid crystal TV, and the luminance is 50 times or more.

Further, in the viewing angle characteristics shown in Example 2 in FIG. 12, the viewing angle at which the luminance becomes 50% of that in front view (angle of 0 degrees) is 5 degrees, and this is 1/12 of 62 degrees in the apparatus for use in a general TV set. Similarly, the reflection angle of the reflective light guide, the area of the reflection surface, and the like are optimized such that the viewing angle in the vertical direction is made even in the upper and lower sides and the viewing angle is suppressed to about 1/12 of the apparatus for use in a general TV set. As a result, the amount of video light toward the viewing direction is significantly improved as compared with the conventional liquid crystal TV, and the luminance is 100 times or more.

As described above, by setting the viewing angle to a narrow angle, the amount of light flux toward the viewing direction can be concentrated, so that the utilization efficiency of light is significantly improved. As a result, even if a liquid crystal display panel for use in a general TV set is used, it is possible to realize a significant improvement in luminance with the same power consumption by controlling the light diffusion characteristics of the light source apparatus, and to provide the video display apparatus suitable for the information display system for bright outdoor use.

Figure 11:
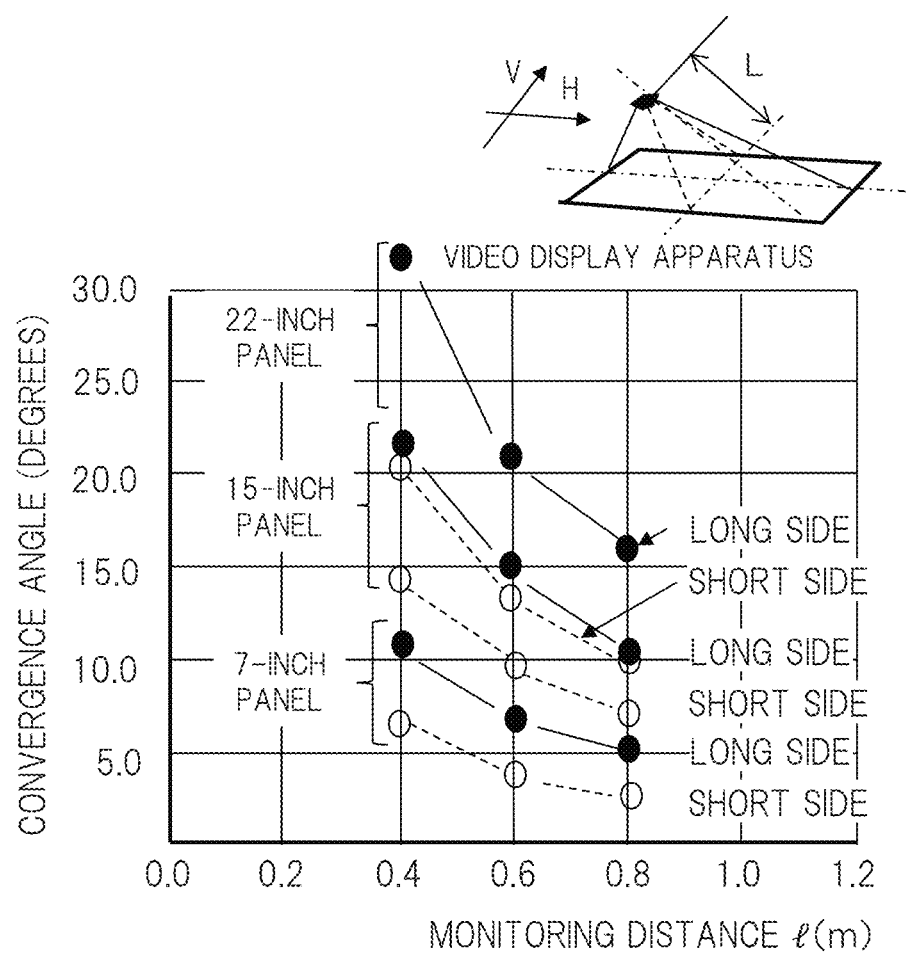
FIG. 11 is an explanatory diagram for describing light source diffusion characteristics of the video display apparatus according to one embodiment of the present invention.

When using a large liquid crystal display panel, the overall brightness of the screen is improved by directing the light in the periphery of the screen inward, that is, toward the observer who is squarely facing the center of the screen. FIG. 11 shows the convergence angle of the long side and the short side of the panel when the distance L from the observer to the panel and the panel size (screen ratio 16:10) are used as parameters. In the case of monitoring the screen as a vertically long screen, the convergence angle may be set in accordance with the short side. For example, in the case in which a 22-inch panel is used vertically and the monitoring distance is 0.8 m, the video light from the four corners of the screen can be effectively directed toward the observer by setting the convergence angle to 10 degrees.

Similarly, in the case in which a 15-inch panel is used vertically and the monitoring distance is 0.8 m, the video light from the four corners of the screen can be effectively directed toward the observer by setting the convergence angle to 7 degrees. As described above, the overall brightness of the screen can be improved by adjusting the video light in the periphery of the screen so as to be directed to the observer located at the optimum position to monitor the center of the screen depending on the size of the liquid crystal display panel and whether the liquid crystal display panel is used vertically or horizontally.

As a basic configuration, as shown in FIG. 9, a light flux having narrow-angle directional characteristics is made to enter the liquid crystal display panel 11 by the light source apparatus, and the luminance is modulated in accordance with a video signal, whereby the air floating video obtained by reflecting the video information displayed on the screen of the liquid crystal display panel 11 by the retroreflection plate is displayed outdoors or indoors through the transparent member 100.

By using the display apparatus and the light source apparatus according to the embodiment of the present invention described above, it is possible to realize the air floating video display apparatus with high light utilization efficiency.

<Example of Video Display Processing in Air Floating Video Display Apparatus>

Next, an example of the problem to be solved by the image processing of the present embodiment will be described with reference to FIG. 13A. In the air floating video display apparatus 1000, the rear side of the air floating video 3 is inside of the housing of the air floating video display apparatus 1000 when viewed from the user, and the user visually recognizes that the background of the air floating video 3 is black when it is sufficiently dark.

Here, an example of displaying a character "panda" 1525 in the air floating video 3 will be described with reference to FIG. 13A. First, in an image including a pixel region in which an image of the character "panda" 1525 is drawn and a transparent information region 1520 which is a background image as shown in FIG. 13A(1), the video controller 1160 in FIG. 3 separately recognizes the pixel region in which the image of the character "panda" 1525 is drawn and the transparent information region 1520 which is a background image.

As a method of separately recognizing the character image and the background image, for example, a background image layer and a character image layer in front of the background image layer are configured such that they can be processed as different layers in image processing by the video controller 1160, and the character image and the background image can be separately recognized based on the overlapping relationship when these layers are combined.

Here, the video controller 1160 recognizes the black of the pixel drawing an object such as the character image as different information from the transparent information pixel.

However, if it is assumed that the luminance of both the black of the pixel drawing the object and the transparent information pixel is 0, there is no difference in luminance between the pixel drawing the black of the image of the character "panda" 1525 and the pixel of the transparent information region 1520 which is a background image, when displaying the air floating video 3. Therefore, in the air floating video 3, as shown in FIG. 13A(2), neither the pixel drawing the black in the image of the character "panda" 1525 nor the pixel of the transparent information region 1520 has luminance, and they are recognized by the user as the same black space. In other words, the part drawing the black of the image of the character "panda" 1525 which is an object blends into the background, and only the non-black part of the character "panda" 1525 is recognized as a video floating in the display region of the air floating video 3.

An example of image processing in the present embodiment will be described with reference to FIG. 13B. FIG. 13B is a diagram illustrating an example of image processing that more preferably solves the problem that the black image region of the object blends into the background described in FIG. 13A. In each of FIG. 13B(1) and FIG. 13(2), the display state of the air floating video 3 is shown on the upper side, and input/output characteristics of the image processing for the object image are shown on the lower side. Note that the image of the object (character "panda" 1525) and data corresponding thereto may be read from the storage 1170 or the memory 1109 in FIG. 3. Alternatively, they may be input from the video signal input section 1131, or may be acquired via the communication unit 1132.

Here, in the state of FIG. 13B(1), the input/output characteristics of the image processing for the object image are not particularly adjusted and are in a linear state. In this case, the display state is similar to that shown in FIG. 13A(2), and the black image region of the object has blended into the background. On the other hand, in FIG. 13B(2), the video controller 1160 of the present embodiment adjusts the input/output characteristics of image processing for the image of the object (character "panda" 1525) as shown on the lower side.

Namely, the video controller 1160 performs image processing with the input/output characteristics that convert the input image of the object (character "panda" 1525) having the pixel with low luminance into the output image having the pixel with increased luminance. The image of the object (character "panda" 1525) is subjected to the image processing with the input/output characteristics, and then the video including the image of the object (character "panda" 1525) is input and displayed on the display apparatus 1. Then, in the display state of the air floating video 3, as shown in the upper side of FIG. 13B(2), the luminance of the pixel region in which black is drawn in the image of the character "panda" 1525 increases. As a result, in the region in which the image of the character "panda" 1525 is drawn, even the region in which black is drawn can be distinctively recognized by the user without blending into the black background, and the object can be displayed more favorably.

In other words, by using the image processing shown in FIG. 13B(2), the region in which the image of the character "panda" 1525 which is an object is displayed can be separately recognized from the black background which is inside of the housing of the air floating video display apparatus 1000 seen through the window, and the visibility of the object is improved. Therefore, for example, even the object in which the pixel with a luminance value of 0 is included in the pixels constituting the object before the above-described image processing (that is, at the time when the image of the object and the data corresponding thereto are read from the storage 1170 or the memory 1109 in FIG. 3, when the image of the object is input from the video signal input unit 1131, when data of the object is acquired via the communication unit 1132, or the like) is converted into the object in which the luminance value of the pixel in the low luminance region is increased through the image processing with the input/output characteristics by the video controller 1160, is displayed on the display apparatus 1, and then converted into the air floating video 3 by the optical system of the air floating video display apparatus 1000.

Namely, the object is converted into the state in which the pixels constituting the object do not include the pixel with the luminance value of 0 by the image processing with the input/output characteristics, is displayed on the display apparatus 1, and then converted into the air floating video 3 by the optical system of the air floating video display apparatus 1000.

Note that, as a method of performing the image processing with the input/output characteristics in FIG. 13B(2) to only the region of the image of the object (character "panda" 1525), for example, a background image layer and a character image layer in front of the background image layer are configured such that they can be processed as different layers in the image processing by the video controller 1160, the image processing with the input/output characteristics in FIG. 13B(2) is performed to the character image layer, and the image processing is not performed to the background image layer.

Thereafter, by combining these layers, the image processing to increase the luminance of the low luminance region in the input image is performed to only the character image as shown in FIG. 13B(2). Alternatively, as another method, after combining the layer of the character image and the layer of the background image, the image processing for the input/output characteristics shown in FIG. 13B(2) may be applied to only the region of the character image.

Further, the input/output video characteristics used in the image processing to increase the luminance of the low luminance region of the input video are not limited to the example shown in FIG. 13B(2). Any image processing can be used as long as it can increase the luminance of the low luminance region, and the so-called brightness adjustment is also possible. Alternatively, video processing for improving the visibility by controlling the gain that changes the weighting of Retinex processing disclosed in International Publication No. 2014/162533 may be performed.

According to the image processing of FIG. 13B(2) described above, the region drawing black in the region where images such as character and object are drawn can be recognized by the user without blending into the black background, and it is possible to realize a more favorable display.

Figure 13A:
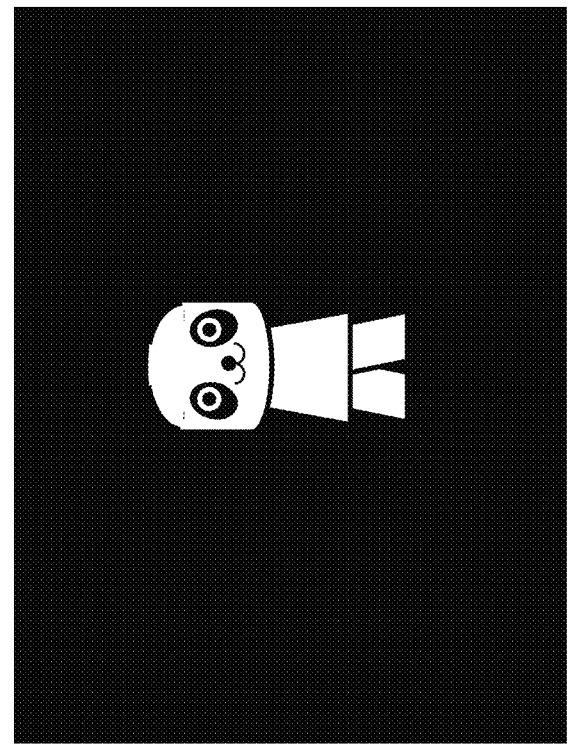
FIG. 13A is an explanatory diagram of an example of a problem to be solved by image processing according to one embodiment of the present invention.
Figure 13A:
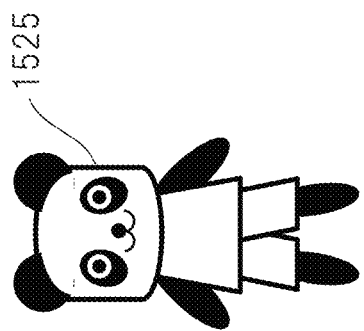
Figure 13B:
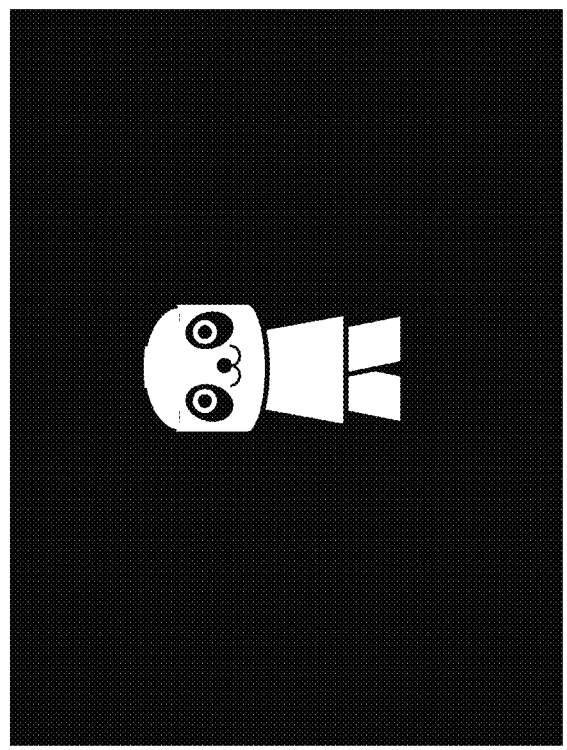
FIG. 13B is an explanatory diagram of an example of image processing according to one embodiment of the present invention.
Figure 13B:
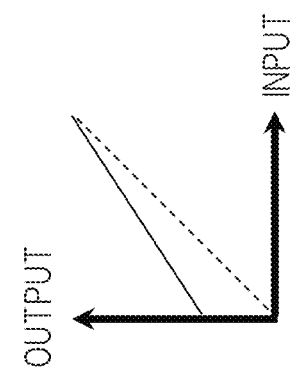
Figure 13B:
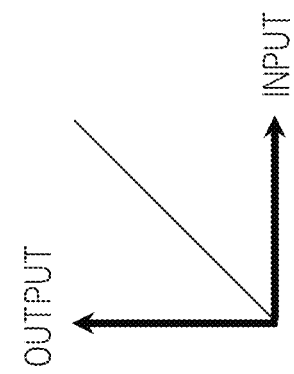

Note that the problems and more favorable image processing for the air floating video display apparatus in which black is seen in the background (for example, the air floating video display apparatus 1000 in FIG. 4A to FIG. 4G and the air floating video display apparatus 1000 in FIG. 4I and FIG. 4J in the state where the rear-side window is in the light-shielding state) have been described in the examples of FIG. 13A and FIG. 13B. However, the image processing is also effective in the apparatus other than these air floating video display apparatuses.

Specifically, in the air floating video display apparatus 1000 in FIG. 4H and the air floating video display apparatus 1000 in FIG. 4I and FIG. 4J in which the rear-side window is not in the light-shielding state, the background of the air floating video 3 is not black, but is the scenery on the rear side of the air floating video display apparatus 1000 beyond the window. In this case as well, the problem described in FIG. 13A and FIG. 13B similarly exists.

Namely, the part drawing the black in the image of the character "panda" 1525 that is an object blends into the scenery on the rear side of the air floating video display apparatus 1000 beyond the window. In this case as well, by using the image processing shown in FIG. 13B(2), the part drawing the black in the image of the character "panda" 1525 that is an object can be separately recognized from the scenery on the rear side of the air floating video display apparatus 1000 beyond the window, and the visibility of the object is improved.

Namely, by using the image processing shown in FIG. 13B(2), the region in which the image of the character "panda" 1525 that is an object is displayed can be separately recognized from the scenery on the rear side of the air floating video display apparatus 1000 beyond the window, so that it is possible to recognize that the character "panda" 1525 that is an object is present in front of the scenery and the visibility of the object is improved.

In addition, when another video (video of the transmissive self-luminous video display apparatus 1650, video of the second display apparatus 1680, or the like) is displayed at the different depth position from the air floating video 3 in the air floating video display apparatus 1000 in FIG. 4K, FIG. 4L, and FIG. 4M as described above, the background of the air floating video 2 is not the black but is the different video. In this case as well, the problem described in FIG. 13A and FIG. 13B similarly exists.

Namely, the part drawing the black in the image of the character "panda" 1525 that is an object blends into the different video displayed at the different depth position from the air floating video 3. In this case as well, by using the image processing shown in FIG. 13B(2), the part drawing the black in the image of the character "panda" 1525 that is an object can be separately recognized from the different video, and the visibility of the object is improved.

Namely, by using the image processing shown in FIG. 13B(2), the region in which the image of the character "panda" 1525 that is an object is displayed can be separately recognized from the different video, so that it is possible to recognize that the character "panda" 1525 that is an object is present in front of the different video and the visibility of the object is improved.

An example of the video display processing in the present embodiment will be described with reference to FIG. 13C. FIG. 13C is a video display example in which the air floating video 3 and a second image 2050 which is another video are simultaneously displayed in the video display examples of the present embodiment. The second image 2050 may correspond to the displayed video of the transmissive self-luminous video display apparatus 1650 in FIG. 4K or FIG. 4L. Also, the second image 2050 may correspond to the displayed video on the second display apparatus 1680 in FIG. 4M.

Namely, the video display example in FIG. 13C is a specific example of the video display of the air floating video display apparatus 1000 in FIG. 4K, FIG. 4L, and FIG. 4M. In the example of this drawing, a bear character is displayed in the air floating video 3. The region in the air floating video 3 other than the bear character is displayed in black, and is transparent as an air floating video. Further, the second image 2050 is a background image in which a plain, a mountain, and the sun are drawn.

Here, in FIG. 13C, the air floating video 3 and the second image 2050 are displayed at different depth positions. When the user 230 visually recognizes the two videos such as the air floating video 3 and the second image 2050 in the line of sight direction of the arrow 2040, the user 230 can visually recognize the two videos overlapped with each other. Specifically, the bear character in the air floating video 3 appears to be overlapped in front of the background of the plain, mountain, and sun drawn in the second image 2050.

Here, since the air floating video 3 is formed as a real image in the air, if the user 230 moves his/her viewpoint a little, the depth of the air floating video 3 and the second image 2050 can be recognized based on the parallax. Therefore, the user 230 can obtain a stronger sense of floating in the air with respect to the air floating video 3 while visually recognizing the two videos in the overlapped state.

Figure 13D:
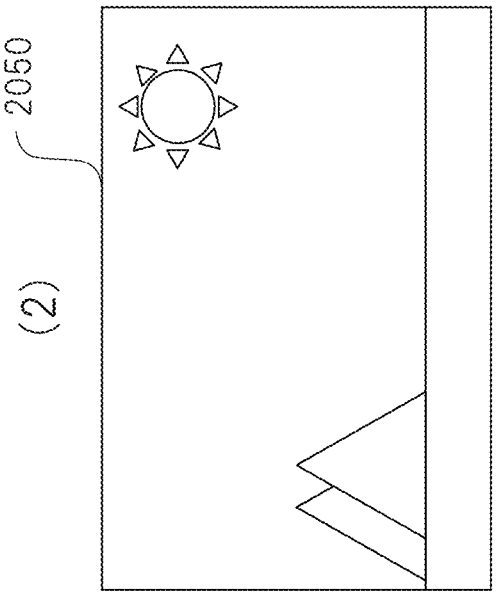
FIG. 13D is an explanatory diagram of an example of video display processing according to one embodiment of the present invention.
Figure 13D:
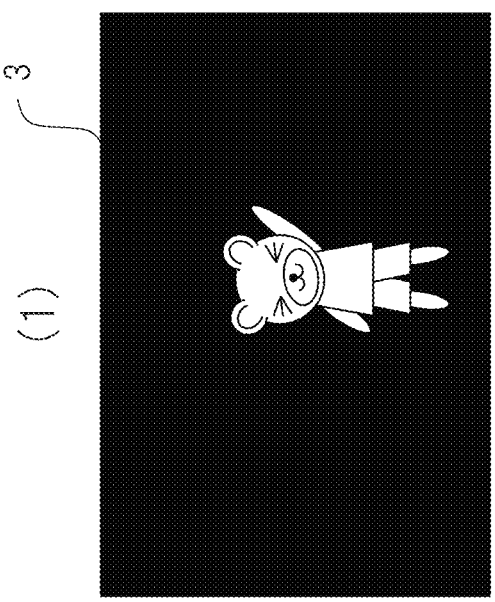
Figure 13D:
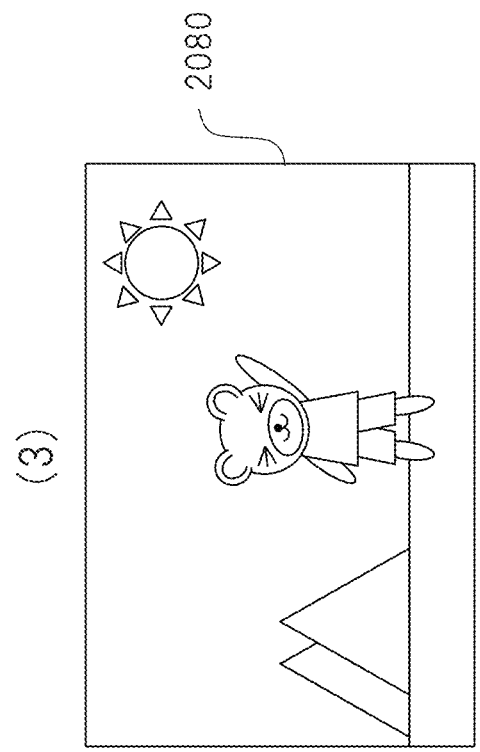

An example of the video display processing in the present embodiment will be described with reference to FIG. 13D. FIG. 13D(1) is a diagram of the air floating video 3 viewed from the line of sight direction of the user 230 in the example of the video display in the present embodiment in FIG. 13C. Here, a bear character is displayed in the air floating video 3. The region in air floating video 3 other than the bear character is displayed in black, and is transparent as an air floating video.

FIG. 13D(2) is a diagram of the second image 2050 viewed from the line of sight direction of the user 230 in the example of the video display in the present embodiment in FIG. 13C. In the example of this drawing, the second image 2050 is a background image in which a plain, a mountain, and the sun are drawn.

FIG. 13D(3) is a diagram showing a state in which the second image 2050 and the air floating video 3 appear to be overlapped with each other in the line of sight direction of the user 230 in the example of the video display in the present embodiment in FIG. 13C. Specifically, the bear character in the air floating video 3 appears to be overlapped in front of the background of the plain, mountain, and sun drawn in the second image 2050.

Here, in order to ensure the visibility of the air floating video 3 more favorably when displaying the air floating video 3 and the second image 2050 at the same time, it is desirable to pay attention to the balance in the brightness therebetween. If the second image 2050 is too bright compared to the brightness of the air floating video 3, the displayed video of the air floating video 3 will become transparent, and the second image 2050 which is the background seen through the air floating video 3 will be strongly visually recognized.

Therefore, the output of the light source of the air floating video 3, the luminance of the displayed video of the display apparatus 1, the output of the light source of the display apparatus that displays the second image 2050, and the luminance of the displayed video of the display apparatus are preferably set such that at least the brightness per unit area of the air floating video 3 at the display position of the air floating video 3 is greater than the brightness per unit area of the video light that reaches the display position of the air floating video 3 from the second image 2050.

Note that, since it is necessary to satisfy this condition only when displaying the air floating video 3 and the second image 2050 at the same time, the control to reduce the brightness of the second image 2050 by reducing the output of the light source of the display apparatus that displays the second image 2050 and/or the luminance of the displayed video of the display apparatus may be performed when the first display mode in which only the second image 2050 is displayed without displaying the air floating video 3 is switched to the second display mode in which the air floating video 3 and the second image 2050 are displayed at the same time. The controller 1110 in FIG. 3 can realize such control by controlling the display apparatus 1 and the display apparatus that displays the second image 2050 (transmissive self-luminous video display apparatus 1650 in FIG. 4K or FIG. 4L or second display apparatus 1680 in FIG. 4M).

Note that, in the case where the control to reduce the brightness of the second image 2050 is performed when the first display mode described above is switched to the second display mode described above, the brightness may be uniformly reduced over the entire screen of the second image 2050. Alternatively, instead of uniformly reducing the brightness over the entire screen of the second image 2050, only the part of the second image 2050 corresponding to the object displayed in the air floating video 3 is made to have the highest brightness reduction effect, and the brightness reduction effect may be gradually reduced in the surrounding region thereof. This is because, if the brightness of the second image 2050 is reduced only in the part where the air floating video 3 is visually recognized so as to be overlapped with the second image 2050, the visibility of the air floating video 3 can be sufficiently ensured.

Here, since the air floating video 3 and the second image 2050 are displayed at different depth positions, the overlapping position of the air floating video 3 with respect to the second image 2050 changes due to parallax when the user 230 slightly changes the viewpoint. Therefore, in the case where the brightness is reduced unevenly for the entire screen of the second image 2050 when the first display mode described above is switched to the second display mode described above, it is not desirable to sharply reduce the brightness based on the outline of the object displayed in the air floating video 3, and it is desirable to perform the gradation processing of brightness reduction effect, in which the brightness reduction effect is gradually varied depending on the positions as described above.

Note that, in the air floating video display apparatus 1000 in which the position of the object displayed in air floating video 3 is approximately at the center of air floating video 3, the position where the brightness reduction effect is highest in the gradation processing of brightness reduction effect may be set to the central position of the air floating video 3.

With the video display processing according to the present embodiment described above, the user 230 can visually recognize the air floating video 3 and the second image 2050 more favorably.

Note that the control not to display the second image 2050 may be performed when displaying the air floating video 3. Since the visibility of the air floating video 3 becomes higher when the second image 2050 is not displayed, this control is suitable for the air floating video display apparatus 1000 required to display the air floating video 3 such that the user can visually recognize the air floating video 3 without fail.

Second Embodiment

An example of a foldable configuration of the air floating video display apparatus will be described as the second embodiment of the present invention. Note that the air floating video display apparatus according to the present embodiment corresponds to the air floating video display apparatus described in the first embodiment whose configuration is changed to a foldable configuration. In the present embodiment, differences from the first embodiment will be described, and repetitive descriptions of the same configurations as in the first embodiment will be omitted. In the description of the following embodiment, the expression "containment" does not mean only to completely contain an element in a certain place. In other words, the term "containment" is used even when an element is partially contained in a certain place and partially exposed. Therefore, there is no problem if the term "containment" is read as "retention". In this case, "contain" may be read as "retain", and "contained" may be read as "retained".

Figure 14A:
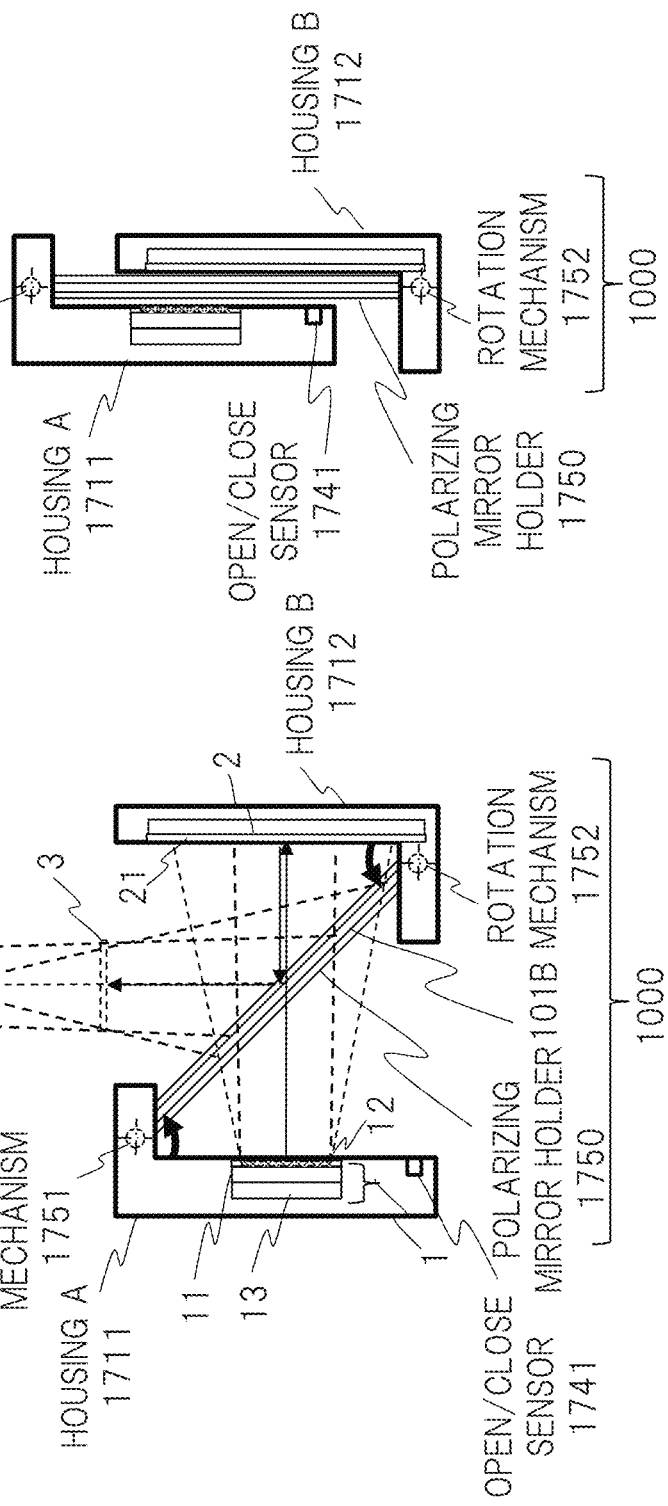
FIG. 14A is a diagram showing an example of the configuration of the air floating video display apparatus according to one embodiment of the present invention.

FIG. 14A shows an example of the foldable air floating video display apparatus 1000. The air floating video display apparatus 1000 in FIG. 14A includes a plurality of housings such as a housing A 1711 and a housing B 1712. The housing A 1711 and the housing B 1712 are connected via a polarizing mirror holder 1750 configured to retain the polarization separator 101B serving as a polarizing mirror. A rotation mechanism 1751 is provided at the connection portion between the polarizing mirror holder 1750 and the housing A 1711, and the air floating video display apparatus 1000 is configured such that the relative angle between the polarizing mirror holder 1750 (and polarization separator 101B) and the housing A 1711 can be changed by the rotation function of the rotation mechanism 1751. A rotation mechanism 1752 is provided at the connection portion between the polarizing mirror holder 1750 and the housing B 1712, and the air floating video display apparatus 1000 is configured such that the relative angle between the polarizing mirror holder 1750 (and polarization separator 101B) and the housing B 1712 can be changed by the rotation function of the rotation mechanism 1752.

Here, the state (usage state) in which the housing A 1711, the housing B 1712, and the polarization separator 101B are arranged in front of the user 230 at angles with which they form the letter N of the alphabet shown in FIG. 14A(1) will be described. Also, the arrangement state of the housing A 1711, the housing B 1712, and the polarization separator 101B at those angles may be referred to also as an N-shaped arrangement.

In the following embodiment, various configurations, functions, and modifications of the foldable air floating video display apparatus 1000 will be described. In these descriptions, various configurations, functions, and modifications other than the points limited to the folding function can be various configurations, functions, and modifications as the air floating video display apparatus in the N-shaped arrangement. In other words, these various configurations, functions, and modifications are effective also for the air floating video display apparatus in the N-shaped arrangement without the folding function.

Here, the display apparatus 1 including the light source apparatus (hereinafter, simply referred to also as light source) 13 and the liquid crystal display panel 11 displays video, and the video light from the display apparatus 1 is emitted to the polarization separator 101B. Of the video light from the display apparatus 1, the light that has passed through the polarization separator 101B passes through the $\lambda/4$ plate 21, is reflected by the retroreflection plate 2, passes through the $\lambda/4$ plate 21 again, and is emitted to the polarization separator 101B. The light that has been emitted from the $\lambda/4$ plate 21, entered the polarization separator 101B, and reflected by the polarization separator 101B forms the air floating video 3.

Since the details of the optical system in the present embodiment for forming the air floating video 3 have already been described in FIG. 2, FIG. 4, and others of the first embodiment, the repetitive description will be omitted.

Since the details of the light source 13 of the display apparatus 1 in the present embodiment have already been described in FIG. 5 to FIG. 12 of the first embodiment, the repetitive description will be omitted.

As described in FIG. 2 and FIG. 4 of the first embodiment, the absorptive polarization plate 12 may be provided on the video display surface of the liquid crystal display panel 11. The air floating video display apparatus according to the present embodiment may be configured to have each of the elements shown in the block diagram of the internal configuration shown in FIG. 3. In this case, each element in the housing 1190 shown in FIG. 3 may be configured to be contained or retained in any of the housing A 1711, the housing B 1712, and the polarizing mirror holder 1750.

However, if elements that require wiring for power supply lines from the power supply 1106 in FIG. 3 (various circuit boards, various processors, various interfaces, various sensors, and the like) or elements that require wired connection to the controller 1110 are separately arranged in the housing A 1711 and the housing B 1712, wiring for power supply lines and wire-connected control signal lines needs to be arranged through the internal structures of the rotation mechanism 1751, the rotation mechanism 1752, and the polarizing mirror holder 1750, so that the structure becomes more complicated.

Therefore, it is preferable that components that require power supply and components that require connection of wire-connected signal lines are contained in the housing A 1711 in which the display apparatus 1 to which power supply is indispensable is contained. In this case, the wiring for power supply lines and wired control signal lines through the internal structures of the rotation mechanism 1751, the rotation mechanism 1752, and the polarizing mirror holder 1750 is not necessary, and the air floating video display apparatus 1000 can be provided at lower cost. For the same reason, it is preferable that the power supply 1106 and the secondary battery 1112 are also contained in the housing A 1711 in which the display apparatus 1 having the power supply driven by the power thereof is contained.

Here, when the air floating video display apparatus 1000 is arranged in the usage state shown in FIG. 14A(1), a predetermined optical path length required optically is needed for the above-described optical path through which the video light from the display apparatus 1 forms the air floating video 3 via the retroreflection plate 2. Therefore, as for the air floating video display apparatus 1000 in the usage state, a space with a predetermined volume including at least the range of the light flux in the optical path of the video light reaching the retroreflection plate 2 from the display apparatus 1 is required between the housing A 1711 and the housing B 1712 facing thereto.

In each air floating video display apparatus 1000 shown in, for example, FIG. 4 according to the first embodiment of the present invention, a space with a predetermined volume including the range of the light flux in the optical path of the video light reaching the retroreflection plate 2 from the display apparatus 1 is maintained as it is in the housing of each air floating video display apparatus 1000 even in the state where the air floating video display apparatus 1000 is not in use. Therefore, each air floating video display apparatus 1000 shown in, for example, FIG. 4 according to the first embodiment of the present invention has a large volume even not in use, and has room for improvement in terms of portability and storability.

Therefore, in the air floating video display apparatus 1000 in FIG. 14A in the usage state, the housing A 1711, the housing B 1712, and the polarization separator 101B are arranged at the relative angles shown in FIG. 14A(1) such that the video light from the display apparatus 1 forms the air floating video 3 via the retroreflection plate 2. Specifically, a stopper for limiting the relative angle between the housing A 1711 and the polarizing mirror holder 1750 within an adjustment range is provided in the rotation mechanism 1751, and the stopper is configured such that the housing A 1711 and the polarizing mirror holder 1750 form the angle shown in FIG. 14A(1) as the upper limit of the opening angle.

Also, a stopper for limiting the relative angle between the housing B 1712 and the polarizing mirror holder 1750 within an adjustment range is provided in the rotation mechanism 1752, and the stopper is configured such that the housing B 1712 and the polarizing mirror holder 1750 form the angle shown in FIG. 14A(1) as the upper limit of the opening angle. The rotation mechanism 1751, the rotation mechanism 1752, and the stopper can be configured using existing techniques.

Also, the air floating video display apparatus 1000 in FIG. 14A is configured to be deformable such that the rotation mechanism 1751 rotates the housing A 1711 in the direction of the bold arrow shown in FIG. 14A(1) and the relative angle between the housing A 1711 and the polarizing mirror holder 1750 decreases. Further, the air floating video display apparatus 1000 in FIG. 14A is configured to be deformable such that the rotation mechanism 1752 rotates the housing B 1712 in the direction of the bold arrow shown in FIG. 14A(1) and the relative angle between the housing B 1712 and the polarizing mirror holder 1750 decreases. FIG. 14A(2) shows the shape of the air floating video display apparatus 1000 after deformation. Hereinafter, the state of the air floating video display apparatus 1000 folded as shown in FIG. 14A(2) is referred to as a folded state.

Here, the volume obtained by multiplying the maximum width (x direction), the maximum depth (y direction), and the maximum height (z direction) of the outer shape of the air floating video display apparatus 1000 is defined as the maximum volume of the outer shape of the air floating video display apparatus 1000. The maximum volume of the air floating video display apparatus 1000 in the folded state shown in FIG. 14A(2) is smaller than the maximum volume of the air floating video display apparatus 1000 in the usage state shown in FIG. 14A(1). Therefore, in the example shown in FIG. 14A, when using the air floating video display apparatus 1000, the user 230 can view the air floating video 3 by setting it into the usage state shown in FIG. 14A(1), and when not using the air floating video display apparatus 1000, the user 230 can conveniently carry and store it by setting it into the folded state shown in FIG. 14A(2) to reduce its maximum volume.

Note that it is not possible to form the air floating video 3 in the folded state shown in FIG. 14A(2). Therefore, in the folded state, it is not necessary to emit the video light from the display apparatus 1, and the light source 13 of the display apparatus 1 is preferably turned off. The control to turn off the light source 13 of the display apparatus 1 when changing from the usage state to the folded state can be performed by the controller 1110 based on the operation by the user via the operation input unit 1107 in FIG. 3.

Further, it is also possible to perform the control to turn off the light source 13 of the display apparatus 1 based on the detection result of an open/close sensor 1741 shown in FIG. 14A(1) and FIG. 14A(2) provided to detect whether or not the air floating video display apparatus 1000 is in the folded state. The open/close sensor 1741 can be composed of, for example, a proximity detection sensor using infrared light or the like. The proximity detection sensor can be composed of an active infrared sensor or the like which emits sensing light such as infrared light and detects the reflected light of the sensing light by itself.

Considering the efficiency of the wired connection, it is preferable that the open/close sensor 1741 that requires power supply is configured to be contained in the housing A 1711 in which the display apparatus 1 to which power supply is indispensable is contained. At this time, the open/close sensor 1741 may detect the distance between the housing A 1711 and the polarizing mirror holder 1750 and detect that the air floating video display apparatus 1000 is folded based on the detected distance.

Alternatively, the open/close sensor 1741 may detect the distance between the housing A 1711 and the housing B 1712 and detect that the air floating video display apparatus 1000 is folded based on the detected distance. In the case of detecting the distance between the housing A 1711 and the housing B 1712, the sensing light of the infrared light emitted by the open/close sensor 1741 which is an active infrared sensor may be configured so as to pass through the polarization separator 101B. The sensing light that has passed through the polarization separator 101B may be configured so as to be reflected by the retroreflection plate 2, pass through the polarization separator 101B again, and return to the open/close sensor 1741.

In the description of the first embodiment, the video light that forms the air floating video 3 passes through the λ/4 plate 21 twice before and after the reflection on the retroreflection plate 2 and is thus reflected by the polarization separator 101B, and this is different from the sensing light emitted by the open/close sensor 1741 in transmission and reflection characteristics. Therefore, in order to allow the sensing light of infrared light emitted by the open/close sensor 1741 which is an active infrared sensor to pass through the polarization separator 101B again and return to the open/close sensor 1741, the visible light which is the video light for forming the air floating video 3 and the infrared light which is the non-visible sensing light emitted by the open/close sensor 1741 which is an active infrared sensor need to have different optical properties for the polarization separator 101B. For example, as to the infrared region, the transmittance may be set to a predetermined transmittance such as about 50%, regardless of the polarization state.

As described above, it is possible to more surely detect that the air floating video display apparatus 1000 is in the folded state, by providing the open/close sensor 1741. Also, when the open/close sensor 1741 has detected that the air floating video display apparatus 1000 is in the folded state, it is possible to more favorably perform the control to turn off the light source 13 of the display apparatus 1.

Next, FIG. 14B shows a perspective view of one example of the air floating video display apparatus 1000 arranged in the usage state. In FIG. 14B, the air floating video display apparatus 1000 in FIG. 14A is shown as an example. In the usage state shown in FIG. 14B, the housing A 1711, the housing B 1712, and the polarization separator 101B are arranged in front of the user 230 at angles with which they form the letter N of the alphabet as in FIG. 14A(1). The polarization separator 101B is held in the polarizing mirror holder 1750. The user can visually recognize the air floating video 3 formed in front of the polarization separator 101B. In the example of the drawing, a character of a rabbit is displayed as the air floating video 3. As described above with reference to FIG. 14B, it is possible to favorably visually recognize the air floating video 3 in the usage state of the air floating video display apparatus 1000 having the folding function according to the present embodiment.

Next, the foldable air floating video display apparatus 1000 which is a modification of FIG. 14A will be described with reference to FIG. 14C. In the description of FIG. 14C, differences from FIG. 14A will be described, and repetitive descriptions of the same configurations as in FIG. 14A will be omitted.

The example shown in FIG. 14C is a configuration example in the case where the foldable air floating video display apparatus 1000 is provided with the imager 1180, the aerial operation detector 1350, and the like. A housing A 1717 in FIG. 14C extends toward the side of the user 230 as compared with the housing A 1711 in FIG. 14A. The front surface of the housing A 1717 (the surface on the side of the user 230) is located at a position closer to the user 230 than the air floating video 3. In the example in FIG. 14C, the extended part of the housing A 1717 is configured to include the aerial operation detector 1350. In this way, it is possible to detect an operation by the user 230 on the plane including the air floating video 3 in the usage state of the air floating video display apparatus 1000 shown in FIG. 14C(1). The configuration and function of the aerial operation detector 1350 are as described in the first embodiment, and the repetitive description will be omitted.

Further, in the housing A 1717 in FIG. 14C, the imager 1180 may be provided on the front surface (the surface on the side of the user 230) of the part of the housing A 1717 extending toward the side of the user 230 as compared with the housing A 1711 in FIG. 14A. In this way, the imager 1180 can image the user 230 in the usage state of the air floating video display apparatus 1000 shown in FIG. 14C(1). The controller 1110 may perform the identification process as to who the user 230 is based on the image captured by the imager 1180. The imager 1180 may image the range including the user 230 operating the air floating video 3 and the surrounding region of the user 230, and the controller 1110 may perform the identification process to identify whether or not the user 230 is present in front of the air floating video display apparatus 1000 based on the captured image. Further, the controller 1110 may calculate the distance from the user 230 to the air floating video display apparatus 1000 based on the captured image.

Here, when the imager 1180, the aerial operation detector 1350, and others are provided in the air floating video display apparatus 1000, they are preferably provided in the housing A 1717 as shown in FIG. 14C instead of in the housing B 1718. This is because, as described above with reference to FIG. 14A, components that require power supply and components that require connection of wired signal lines are preferably configured to be contained in the housing A in which the display apparatus 1 to which power supply is indispensable is contained.

Note that, even if the imager 1180 and the aerial operation detector 1350 are provided near the front surface of the housing A 1717 as shown in FIG. 14C, the folding function can be maintained as in the folded state shown in FIG. 14C(2).

As described above, with the air floating video display apparatus 1000 in FIG. 14C, it is possible to more favorably mount the detection function of the aerial operation by the user in the foldable air floating video display apparatus. Further, with the air floating video display apparatus 1000 in FIG. 14C, it is possible to mount the imaging function capable of imaging a user in the foldable air floating video display apparatus.

Third Embodiment

Next, the air floating video display apparatus 1000 capable of stereoscopic displaying based on motion parallax will be described as the third embodiment of the present invention. Note that the air floating video display apparatus according to the present embodiment is configured to be able to detect the position of the viewpoint of the user or the like by mounting an imager in the configuration of the air floating video display apparatus described in the first or second embodiment.

Also, the air floating video display apparatus according to the present embodiment can display the video generated (rendered) based on 3D data in the air floating video 3, and it is possible to allow the user to stereoscopically view a stereoscopic video of the 3D model of the 3D data in a pseudo manner by varying the generation process (rendering process) of the video in accordance with the position of the detected viewpoint or the like. In the present embodiment, the differences from the first and second embodiments will be described, and repetitive descriptions of the same configurations as in the first and second embodiments will be omitted.

An example of the air floating video display apparatus capable of stereoscopic displaying based on motion parallax will be described with reference to the air floating video display apparatus 1000 in FIG. 15A. In the description with reference to FIG. 15A, the differences from FIG. 14C will be described, and repetitive descriptions of the same configurations as in FIG. 14C will be omitted.

In the air floating video display apparatus 1000, the 3D data about 3D models such as 3D objects and 3D characters may be obtained via the communication unit 1132 and the removable media interface 1134 in FIG. 3 and stored in the storage 1170. When in use, the 3D data is developed from the storage 1170 to the memory 1109 and used by the video controller 1160 or a GPU (Graphic Processing Unit) different from the video controller 1160.

Figure 15A:
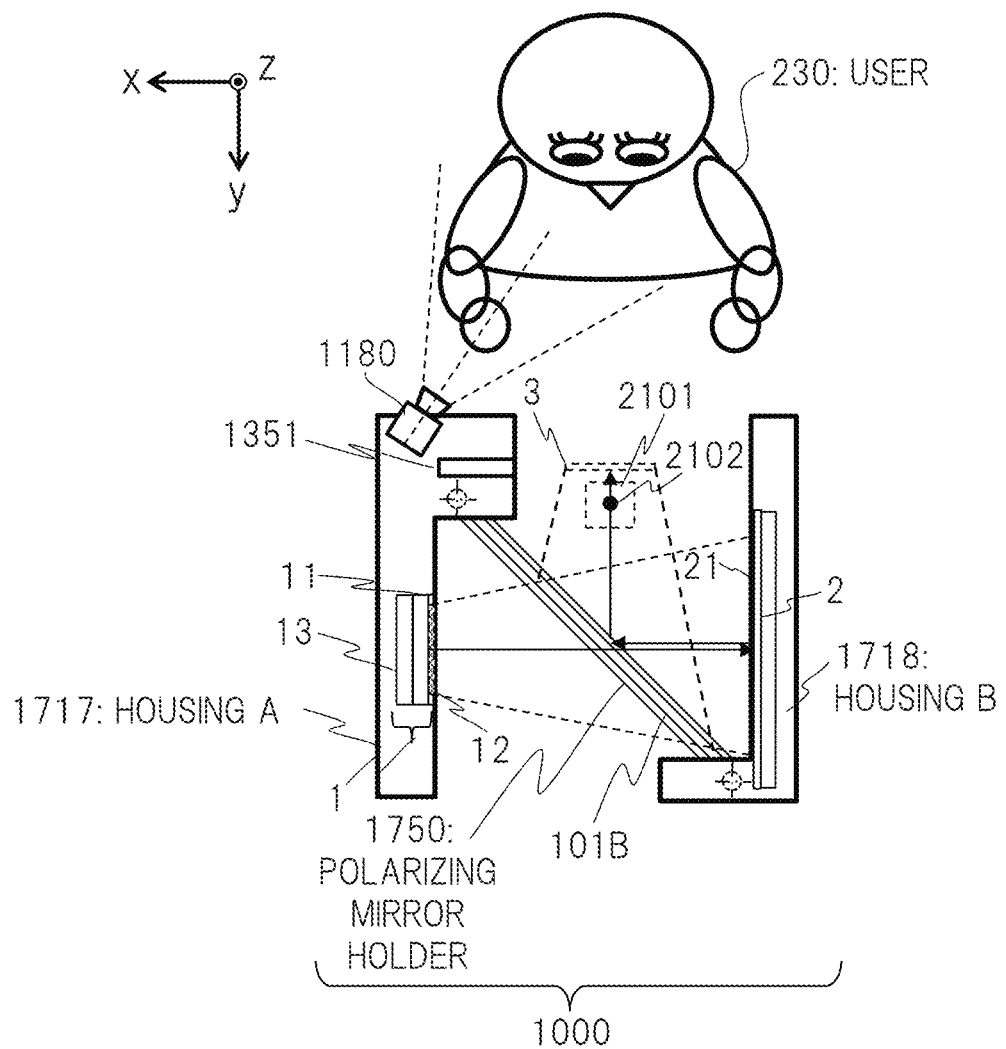
FIG. 15A is a diagram showing an example of the configuration of the air floating video display apparatus according to one embodiment of the present invention.

In the example of FIG. 15A, the air floating video display apparatus 1000 is provided with the imager 1180. Based on the image captured by the imager 1180, the position of the face or eyes of the user 230, the intermediate position between the eyes, and the like are detected as viewpoint position information. These positions are detected not only in the direction parallel to the plane of the air floating video 3 but also in the direction corresponding to the depth direction of the air floating video 3.

Namely, the positions in any of the x direction, the y direction, and the z direction in FIG. 15A are detected. The controller 1110 in FIG. 3 may control the detection process of these positions. Also, existing face detection technique, eye position detection technique, and viewpoint detection technique may be used for the detection process. The number of imagers 1180 is not limited to one, and imagers may be provided at two or more different positions such that detection of these positions may be performed based on a plurality of captured images if necessary for accuracy. In general, as the number of imagers arranged at different positions increases, the face detection, eye position detection, and viewpoint detection can be performed more accurately.

In the air floating video display apparatus 1000 in FIG. 15A, the position of the stereoscopic image of the 3D model of the 3D data is set to a position in real space under the control of the controller 1110 in FIG. 3. In FIG. 15A, the controller 1110 sets a virtual spatial region 2101 corresponding to a bounding box indicating the spatial region in which the 3D model in the 3D data exists and a virtual reference point 2102 serving as a reference point for motion parallax in stereoscopic viewing of the 3D model of the 3D data.

Note that the position of the virtual reference point 2102 on the horizontal plane may be the geometric center point or the geometric center of gravity on the horizontal cross section of the main object of the 3D model, or may be the point in the vicinity of these points. In addition, the position of the virtual reference point 2102 on the horizontal plane may be the geometric center point or the geometric center of gravity on the horizontal cross section of a bounding box indicating the spatial region in which the 3D model exists. If there is a plane corresponding to the ground in the 3D data, it is possible to obtain a more natural stereoscopic effect by setting the position of the virtual reference point 2102 in the vertical direction to the position of the plane corresponding to the ground.

Here, in the air floating video display apparatus 1000 in FIG. 15A, the virtual spatial region 2101 in which the 3D model exists is set at a position on the far side as viewed from the user relative to the air floating video 3 formed as a real image. Similarly, the virtual reference point 2102 serving as the reference point for motion parallax in the stereoscopic viewing of the 3D model is also set at a position on the far side as viewed from the user relative to the air floating video 3 as a real image. Here, the position on the far side as viewed from the user relative to the air floating video 3 as a real image means a position shifted by a predetermined distance relative to the air floating video 3 as a real image in a second direction (positive y direction in the drawing) opposite to a first direction (negative y direction in the drawing) corresponding to the traveling direction of the principal ray of light that forms the air floating video 3 as a real image, in the optical arrangement of the air floating video display apparatus 1000.

Since the light flux that has passed through the retroreflection plate 2 reaches the air floating video 3 formed as a real image in the air floating video display apparatus 1000 in FIG. 15A, the position shifted by a predetermined distance in the second direction (positive y direction in the drawing) means a position shifted by a predetermined distance toward the retroreflection plate 2 relative to the position of the air floating video 3 on the optical path of the light flux that reaches the air floating video 3 formed as a real image from the retroreflection plate 2.

Note that the information on the settings of the virtual spatial region 2101 and the virtual reference point 2102 may be stored in the storage 1170 or the non-volatile memory 1108 in FIG. 3 in association with the 3D data of the 3D model under the control of the controller 1110 in FIG. 3. When in use, the information may be read from the storage 1170 or the non-volatile memory 1108 and developed in the memory 1109. Also, under the control of the controller 1110, the information may be transmitted to the video controller 1160 or a GPU (Graphic Processing Unit) different from the video controller 1160 for use in the controller or the processor.

The effects of setting the virtual spatial region 2101 and the virtual reference point 2102 as described above in the air floating video display apparatus 1000 in FIG. 15A will be described later.

Figure 15B:
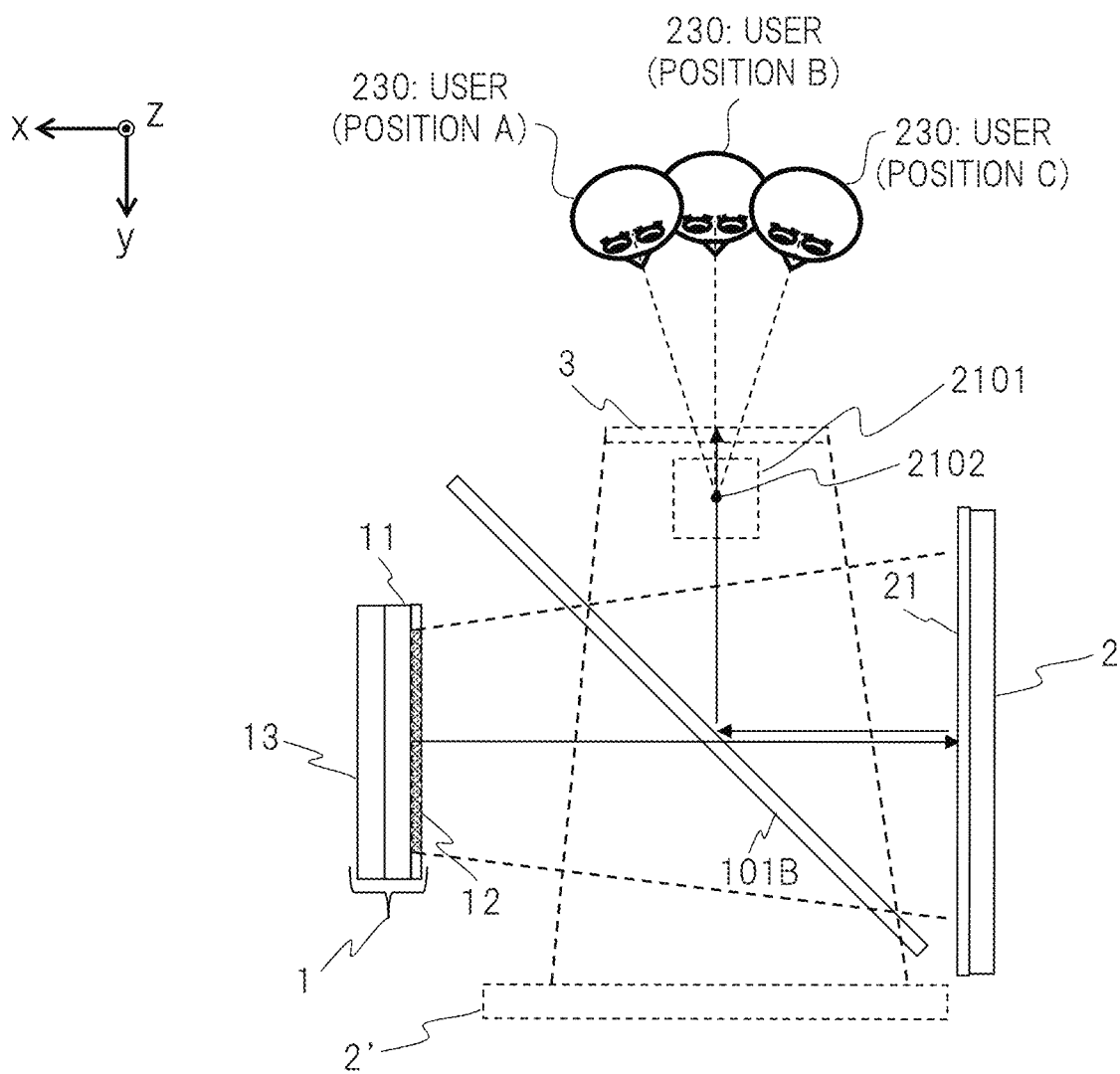
FIG. 15B is a diagram showing an example of the configuration of the air floating video display apparatus according to one embodiment of the present invention.

Next, a specific process of stereoscopic displaying based on motion parallax in the air floating video display apparatus 1000 in FIG. 15A will be described with reference to FIG. 15B. FIG. 15B is a diagram showing details of the positional relationship among the optical elements of the air floating video display apparatus 1000, the virtual spatial region 2101, and the virtual reference point 2102 in FIG. 15A. In addition, in the air floating video display apparatus 1000 in FIG. 15A, the position of the face or eyes of the user 230, the intermediate position between the eyes, and the like are detected as the viewpoint position information based on the image captured by the imager 1180 as described with reference to FIG. 15A.

Therefore, in FIG. 15B, a viewpoint position A, a viewpoint position B, and a viewpoint position C are illustrated as examples of the viewpoint position of the user 230. At each position, the user 230 can visually recognize the 3D model existing in the virtual spatial region 2101. In order for the user 230 to stereoscopically view the 3D model existing in the spatial region 2101 in a pseudo manner, it is necessary to display different rendering images in the air floating video 3 for the viewpoint positions A, B, and C of the user 230 each having different viewing angles.

In FIG. 15B, a position of a virtual retroreflection plate 2' is shown at a position plane-symmetrical to the retroreflection plate 2 based on the polarization separator 101B.

Next, an example of visually recognizing the 3D model in the air floating video display apparatus 1000 in FIG. 15A will be described with reference to FIG. 15C. FIG. 15C illustrates an example in which a 3D model 2015 of a bear character is displayed.

FIG. 15C(1) shows a display example and a visual recognition example of the 3D model 2105 viewed from the user viewpoint position C in FIG. 15B. FIG. 15C(2) shows a display example and a visual recognition example of the 3D model 2105 viewed from the user viewpoint position B in FIG. 15B. FIG. 15C(3) shows a display example and a visual recognition example of the 3D model 2105 viewed from the user viewpoint position A in FIG. 15B.

Namely, the 3D model 2015 of the bear character is rendered by varying the angle of the viewpoint in the rendering process of the 3D model so as to correspond to the plurality of user viewpoint positions having different angles. Since it is desirable to follow the changes in the user viewpoint position, this rendering is desirably a so-called real-time rendering process. The rendering process of the 3D model of the 3D data described above may be performed by the video controller 1160 under the control of the controller 1110 in FIG. 3.

Also, a GPU (Graphic Processing Unit) different from the video controller 1160 may be provided and the GPU may perform the real-time rendering process. Note that the display example and the visual recognition example of the 3D model 2105 are illustrations of rendering images, and may be considered to show the state of the mesh or texture of the 3D model after rendering.

Note that an example of the virtual spatial region 2101 corresponding to a bounding box indicating the spatial region in which the 3D model in the 3D data exists is shown in FIG. 15C(2). Namely, the virtual spatial region 2101 is a rectangular parallelepiped spatial region.

Next, a visual recognition example of the 3D model in the air floating video display apparatus 1000 in FIG. 15A will be described with reference to FIG. 15C. FIG. 15C illustrates an example of displaying the 3D model 2015 of the bear character.

FIG. 15C(1) shows a display example and a visual recognition example of the 3D model 2105 viewed from the user viewpoint position C in FIG. 15B. FIG. 15C(2) shows a display example and a visual recognition example of the 3D model 2105 viewed from the user viewpoint position B in FIG. 15B. FIG. 15C(3) shows a display example and a visual recognition example of the 3D model 2105 viewed from the user viewpoint position A in FIG. 15B.

Namely, the 3D model 2015 of the bear character is rendered by varying the angle of the viewpoint in the rendering process of the 3D model so as to correspond to the plurality of user viewpoint positions having different angles. Since it is desirable to follow the changes in the user viewpoint position, this rendering is desirably a so-called real-time rendering process. The rendering process of the 3D model of the 3D data described above may be performed by the video controller 1160 under the control of the controller 1110 in FIG. 3.

Also, a GPU (Graphic Processing Unit) different from the video controller 1160 may be provided and the GPU may perform the process. Note that the display example and the visual recognition example of the 3D model 2105 are illustrations of rendering images, and may be considered to show the state of the mesh or texture of the 3D model after rendering. Note that an example of the virtual spatial region 2101 corresponding to a bounding box indicating the spatial region in which the 3D model in the 3D data exists is shown in FIG. 15C(2). Namely, the virtual spatial region 2101 is a rectangular parallelepiped spatial region.

Next, a rendering example of the video in the air floating video 3 for realizing the display example and the visual recognition example described with reference to FIG. 15C in the air floating video display apparatus 1000 in FIG. 15A will be described with reference to FIG. 15D.

FIG. 15D(1) shows a rendering example of a video in the air floating video 3 in the case where the viewpoint position of the user 230 is the viewpoint position A.

FIG. 15D(2) shows a rendering example of a video in the air floating video 3 in the case where the viewpoint position of the user 230 is the viewpoint position B.

FIG. 15D (3) shows a rendering example of a video in the air floating video 3 in the case where the viewpoint position of the user 230 is the viewpoint position C. Note that each of the examples in FIG. 15D illustrates the case in which the intermediate position between the detected positions of the eyes of the user is used as the viewpoint position of the user.

Here, in order to realize the display example and the visual recognition example described with reference to FIG. 15C, the position of the air floating video 3 which is a real image existing in the real space of the air floating video display apparatus 1000, the detected user viewpoint position, and the position of the 3D data space including the 3D model are associated with the virtual spatial region 2101 and the virtual reference point 2102, and then the following process is performed.

Specifically, at the position where the straight line connecting the position of the 3D data space including the 3D model and the detected user viewpoint position intersects with the air floating video 3, pixel values (brightness and chromaticity) calculated by arithmetic operation based on the pixels of the texture on the surface of the 3D model or object in the 3D data space at which the straight line abuts are mapped. In this arithmetic operation, the light source settings and shader settings at the time of rendering are taken into account. This may be expressed as a projection of the 3D data space onto the air floating video 3 according to the user viewpoint position.

This process can be described as follows from the perspective of the rendering process of the 3D data. Namely, in the rendering process of the 3D model in the 3D data space, the position in the 3D data space corresponding to the user viewpoint position detected in the air floating video display apparatus 1000 is set as the position of the camera at the time of rendering, a planar region in the 3D data space corresponding to the display region (a planar rectangle is assumed in the example of FIG. 15) of the air floating video 3 of the air floating video display apparatus 1000 is set as the angle of view of the camera at the time of rendering, and rendering into a two-dimensional video is then performed.

By displaying the two-dimensional video resulting from the rendering via the display apparatus 1 and forming it as the air floating video 3, the video that realizes the display example and the visual recognition example of the 3D model 2105 described with reference to FIG. 15C can be rendered. The user 230 can visually recognize the 3D model as if it really exists near the virtual reference point 2102 in the virtual spatial region 2101 due to pseudo-stereoscopic viewing based on motion parallax.

Note that, in the examples in FIG. 15D(1), FIG. 15D(2), and FIG. 15D(3), the projection for the vertices of the virtual spatial region 2101 and the virtual reference point 2102 onto the air floating video 3 is illustrated as explanatory examples. In the example of FIG. 15D(1), the projection result of these points is shown as intersection point 2106. In the example of FIG. 15D(2), the projection result of these points is shown as intersection point 2107. In the example of FIG. 15D(3), the projection result of these points is shown as intersection point 2108.

Note that, in the examples in FIG. 15D(1), FIG. 15D(2), and FIG. 15D(3), the user viewpoint position changes on the X-Y plane. However, the principle is the same even when the user viewpoint position changes in the vertical direction (z direction), and the process is also the same because only the axial direction differs. Also, the principle is the same even when the user viewpoint position changes in the depth direction (y direction), and the process is also the same because only the axial direction differs. Therefore, even the case in which the user viewpoint position changes three dimensionally can be dealt with by using the projection process of the 3D data space onto the air floating video 3 according to the user viewpoint position described above or the rendering process described above.

Next, in the air floating video display apparatus 1000, the effect achieved by setting the virtual spatial region 2101 corresponding to a bounding box indicating the spatial region, in which the 3D model exists, at a position on the far side as viewed from the user relative to the air floating vide 3 formed as a real image as described with reference to FIG. 15A and the effect achieved by setting the virtual reference point 2102, which is a reference point for motion parallax in the stereoscopic viewing of the 3D model, similarly at a position on the far side as viewed from the user relative to the air floating video 3 formed as a real image as described with reference to FIG. 15A will be described with reference to FIG. 15E.

Figure 15E:
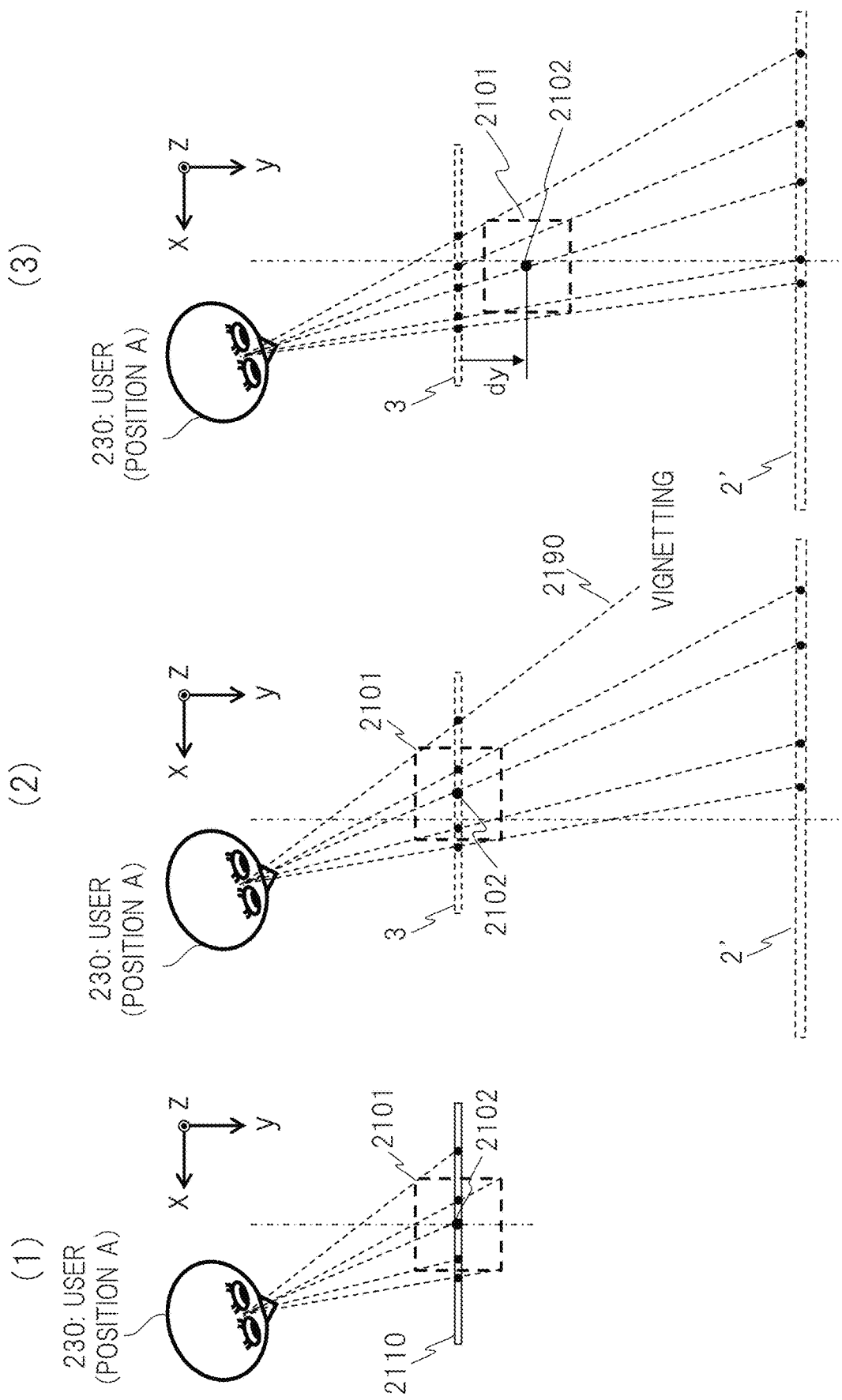
FIG. 15E is an explanatory diagram for a comparison between an example of the configuration of the air floating video display apparatus according to one embodiment of the present invention and a comparative example.

FIG. 15E(1) shows an example of stereoscopic viewing process based on motion parallax on a fixed pixel display 2110 having a display surface on the side of the user 230 as a comparative example different from the present invention. It is assumed that the size of the display region of the display screen of the fixed pixel display 2110 is the same as the size of the display region of the air floating video. It is assumed that the viewing position A of the user 230 is the same position as the viewing position A in the other diagrams of FIG. 15.

In the case of FIG. 15E(1), the virtual spatial region 2101 corresponding to a bounding box indicating the spatial region in which the 3D model exists and the virtual reference point 2102 serving as the reference point for motion parallax are preferably set near the display surface of the fixed pixel display 2110 in order to ensure a wide viewing angle with which the user 230 can achieve favorable stereoscopic viewing. This is because it is thus possible to minimize the projection area required when the virtual spatial region 2101 corresponding to a bounding box indicating the spatial region in which the 3D model exists is projected onto the surface of the fixed pixel display 2110.

In the example of FIG. 15E(1), at the viewing position A of the user 230, the user can visually recognize the 3D model displayed in the virtual spatial region 2101 without vignetting.

Meanwhile, FIG. 15E(2) is an example assuming that setting of the virtual spatial region 2101 and setting of the virtual reference point 2102 similar to the stereoscopic viewing process based on the suitable motion parallax in the fixed pixel display 2110 in FIG. 15E(1) are attempted in the air floating video display apparatus 1000. The display region of the air floating video 3 in FIG. 15E(2) has the same size as the display region of the fixed pixel display 2110 in FIG. 15E(1), and the viewing position A of the user 230 is also the same in FIG. 15E(2) and FIG. 15E(1).

Here, FIG. 15E(2) shows the position of the virtual retroreflection plate 2' shown in FIG. 15B. Namely, FIG. 15E(2) is a schematic diagram showing the optical path from the retroreflection plate 2 to the air floating video 3 linearly by eliminating the geometric reflection caused by the polarization separation mirror 101B by means of the illustration of the virtual retroreflection plate 2'. Here, how a line of sight 2190 from the viewing position A of the user 230 passing through the virtual spatial region 2101 corresponding to a bounding box indicating the spatial region in which the 3D model exists is visually recognized by the user 230 will be studied.

In this case, the intersection between the line of sight 2190 from the viewing position A of the user 230 and the plane of the air floating video 3 is included in the display region of the air floating video 3, and the geometric relationship thereof is not different from the relationship between the viewing position A of the user 230 and the display region in FIG. 15E(1). However, the virtual retroreflection plate 2' does not exist on the extension line of the line of sight 2190 in FIG. 15E(2). This means that the light flux that passes through the retroreflection plate 2 to form the air floating video 3 in the air floating video display apparatus 1000 does not include any light that enters the viewing position A of the user 230 from the angle of the line of sight 2190.

In other words, in the example of FIG. 15E(2), vignetting occurs in a part of the virtual spatial region 2101 corresponding to a bounding box indicating the spatial region in which the 3D model exists, due to the range of the virtual retroreflection plate 2' as shown by the line of sight 2190.

Namely, in the air floating video display apparatus in which the air floating video 3 is formed by a light flux that passes through the retroreflector 2, unlike the fixed pixel display 2110, it is not sufficient to simply consider vignetting of the 3D model due to the relationship between the display region on the display plane of the air floating video 3 and the setting of the virtual spatial region 2101. In the air floating video display apparatus in which the air floating video 3 is formed by a light flux that passes through the retroreflector 2, the position of the virtual spatial region 2101 corresponding to a bounding box indicating the spatial region in which the 3D model exists and the position of the virtual reference point 2102 serving as the reference point for motion parallax in stereoscopic viewing of the 3D model need to be set by taking into consideration not only the display region on the display plane of the air floating video 3 but also the geometric position and range of the region of the retroreflection plate 2 with respect to the viewing position of the user.

FIG. 15E(3) shows an example of setting the position of the virtual spatial region 2101 corresponding to a bounding box indicating the spatial region in which the 3D model exists and an example of setting the position of the virtual reference point 2102 serving as the reference point for motion parallax in stereoscopic viewing of the 3D model, which are adopted in the air floating video display apparatus 1000 according to the present embodiment described with reference to FIG. 15A. In the example of FIG. 15E(3), as compared with FIG. 15E(2), the position of the virtual spatial region 2101 corresponding to a bounding box indicating the spatial region in which the 3D model exists and the position of the virtual reference point 2102 serving as the reference point for motion parallax in the stereoscopic viewing of the 3D model are set on the far side as viewed from the user (shifted in the direction opposite to the traveling direction of the principal ray of the light flux) by a distance dy from the display plane of the air floating video 3 as a real image.

As shown in FIG. 15E(3), the virtual retroreflection plate 2' exists on the extension lines of all lines of sight that pass through parts of the virtual spatial region 2101 from the viewing position A of the user 230. Namely, in the example of FIG. 15E(3), the user can visually recognize the 3D model displayed in the virtual spatial region 2101 without vignetting at the viewing position A of the user 230.

As described above, in the air floating video display apparatus 1000 according to the present embodiment, the position of the virtual reference point 2102 serving as the reference point for motion parallax in the stereoscopic viewing of the 3D model is set to the position shifted in the direction opposite to the traveling direction of the principal ray of the light flux that forms the air floating video 3 as shown in FIG. 15E(3), so that it is possible to realize a display method of an air floating video capable of achieving a more suitable stereoscopic viewing of the 3D model with less vignetting.

Note that the virtual spatial region 2101 corresponding to a bounding box indicating the spatial region in which the 3D model exists does not necessarily have to be set entirely on the far side as viewed from the user relative to the display plane of the air floating video 3. However, in terms of the above-mentioned principle, the occurrence of vignetting of the 3D model can be more favorably reduced when the entire virtual spatial region 2101 is set on the far side as viewed from the user relative to the display plane of the air floating video 3.

Next, an example of setting the virtual spatial region 2101 corresponding to a bounding box and an example of setting the virtual reference point 2102 serving as the reference point for motion parallax in the stereoscopic viewing of the 3D model when a 3D character model is displayed as the 3D model in the air floating video display apparatus 1000 according to the present embodiment will be described with reference to FIG. 15F.

Figure 15F:
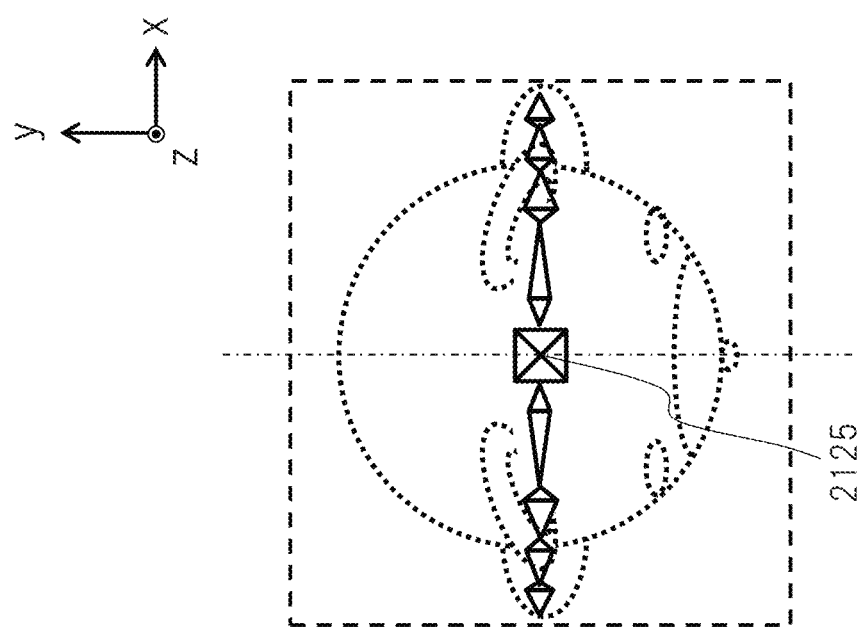
FIG. 15F is a diagram showing an example of the configuration of the air floating video display apparatus according to one embodiment of the present invention.
Figure 15F:
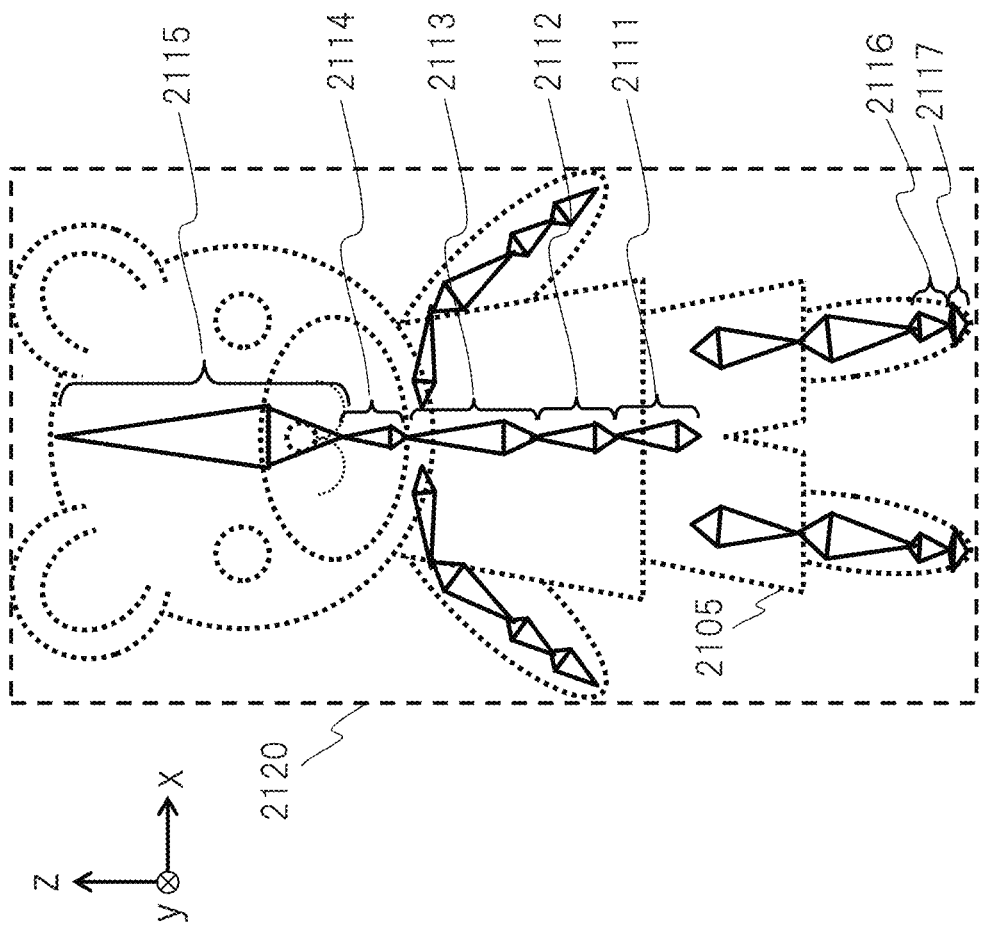

FIG. 15F shows the positional relationship between the 3D model 2105 and a bounding box 2120 in the 3D data of a 3D character model. In the 3D model 2105, parts corresponding to the mesh surfaces or textures of the 3D model are depicted by dotted lines. The bounding box 2120 is set as a rectangular parallelepiped region that includes the 3D model 2105. Here, the octahedrons each formed by combining two square pyramids vertically are referred to as bones or armatures, and are elements that imitate the human skeleton. These are mainly arranged inside along the 3D model 2105, and are necessary when animating the 3D model. Here, setting bones or armatures in the 3D model is sometimes referred to also as rigging. Furthermore, there is a style referred to as a humanoid format in the setting of bones or armatures.

The example in FIG. 15F shows the configuration of a 3D model in which bones are set in the humanoid format. When describing some of the types of bones in the humanoid format, there are Hips 2111, Spine 2112, Chest 2113, Neck 2114, and Head 2115 at the position close to the center of the human skeleton, and each of them has a start point at the lower end of an octahedron and an end point at the upper end thereof. There are Foot 2116 (including L and R), Toes 2117 (including L and R), and others near the feet of the human skeleton, and each of them has an end point of an octahedron on the toe side and a start point of the octahedron on the opposite side. Although bones corresponding to the shoulders, arms, and hands of the human skeleton are also illustrated in the drawing, descriptions thereof will be omitted.

Here, when the air floating video display apparatus 1000 according to the present embodiment displays a 3D character model in which bones are set as a 3D model and performs stereoscopic displaying based on motion parallax, the following setting is preferable as an example of setting the virtual reference point 2102 serving as the reference point for motion parallax. The following description will be given based on the premise that a 3D character is displayed so as to squarely face the user as the default display posture of the 3D character. Specifically, it is desirable that the position of the virtual reference point 2102 serving as the reference point for motion parallax in stereoscopic viewing of the 3D model in the left-right direction (x direction) as viewed from the user is set at or near a position 2125 of the start or end point of the Hips 2111 which is the bone of buttocks.

In addition, there is no difference in many cases in the position of the start point and end point in any of the bones from the Hips 2111 which is the bone of buttocks to the Head 2115 which is the bone of head in the left-right direction (x direction) as viewed from the user. Therefore, it is desirable that the position of the virtual reference point 2102 serving as the reference point for motion parallax in the stereoscopic viewing of a 3D model in the left-right direction (x direction) is set at or near the position of any of the bones from the Hips 2111 which is the bone of buttocks to the Head 2115 which is the bone of head in the left-right direction (x direction).

Next, it is desirable that the position of the virtual reference point 2102 serving as the reference point for motion parallax in the stereoscopic viewing of the 3D model in the depth direction (y direction) as viewed from the user is set at or near the position 2125 of the start or end point of the Hips 2111 which is the bone of buttocks. In addition, when there is no significant difference in the position of the start point and end point in the depth direction (y direction) as viewed from the user in any of the bones from the Hips 2111 which is the bone of buttocks to the Head 2115 which is the bone of head, the position of the virtual reference point 2102 serving as the reference point for motion parallax in the stereoscopic viewing of a 3D model in the depth direction (y direction) may be set at or near the position of any of the bones from the Hips 2111 which is the bone of buttocks to the Head 2115 which is the bone of head in the depth direction (y direction).

Next, the suitable position of the virtual reference point 2102 serving as the reference point for motion parallax in the stereoscopic viewing of a 3D model in the vertical direction (z direction) varies depending on the type of the 3D character. Specifically, in the case of a 3D character standing on a reference plane such as the ground, it is estimated that the reference plane such as the ground is located near just below the Foot 2116 which is the bone of foot and the Toes 2117 which is the bone of toe, and it is thus desirable that the virtual reference point 2102 is set at the position on the lower side in the vertical direction near the end point of the Foot 2116 which is the bone of foot or the start or end point of the Toes 2117 which is the bone of toe.

In this way, even if the user moves the viewpoint up or down, the sense of discomfort can be further reduced because the height of a reference plane such as the ground in the vertical direction does not change significantly.

When the model of 3D character in which bones are set as a 3D model described above with reference to FIG. 15F is arranged in the air floating video display apparatus 1000 according to the present embodiment as shown in FIG. 15E(3), arrangement as follows is more preferable. Specifically, since the position 2125 of the start or end point of the Hips 2111 which is the bone of buttocks is arranged near the virtual reference point 2102 serving as the reference point for motion parallax in the stereoscopic viewing of the 3D model on the x-y plane, it is desirable that the position 2125 of the start or end point of the Hips 2111 which is the bone of buttocks of the model of the 3D character is arranged at the position on the far side as viewed from the user (position shifted in the direction opposite to the traveling direction of the principal ray of the light flux) relative to the plane of the air floating video 3 formed as a real image.

Further, since it is desirable that the 3D model 2105 and the bounding box 2120 are arranged in the virtual spatial region 2101 corresponding to a bounding box indicating the spatial region in which the 3D model exists, it is desirable that all the bones set in the model of the 3D character arranged in the bounding box 2120 are arranged at the position on the far side as viewed from the user (position shifted in the direction opposite to the traveling direction of the principal ray of the light flux) relative to the plane of the air floating video 3 formed as a real image.

With the air floating video display apparatus 1000 according to the present embodiment described above, the stereoscopic displaying based on motion parallax can be performed more favorably.

In the technique according to the present embodiment, by displaying the high-resolution and high-luminance video information in the air floating state, for example, the user can operate without feeling anxious about contact infection of infectious diseases. If the technique according to the present embodiment is applied to a system used by an unspecified number of users, it will be possible to provide a non-contact user interface that can reduce the risk of contact infection of infectious diseases and can eliminate the feeling of anxiety. In this way, it is possible to contribute to "Goal 3: Ensure healthy lives and promote well-being for all at all ages" in the Sustainable Development Goals (SDGs) advocated by the United Nations.

In addition, in the technique according to the present embodiment, only the normal reflected light is efficiently reflected with respect to the retroreflection plate by making the divergence angle of the emitted video light small and aligning the light with a specific polarized wave, and thus a bright and clear air floating video can be obtained with high light utilization efficiency. With the technique according to the present embodiment, it is possible to provide a highly usable non-contact user interface capable of significantly reducing power consumption. In this way, it is possible to contribute to "Goal 9: Build resilient infrastructure, promote inclusive and sustainable industrialization and foster innovation" and "Goal 11: Make cities and human settlements inclusive, safe, resilient and sustainable" in the Sustainable Development Goals (SDGs) advocated by the United Nations.

In the foregoing, various embodiments have been described in detail, but the present invention is not limited only to the above-described embodiments, and includes various modifications. For example, in the above-described embodiments, the entire system has been described in detail so as to make the present invention easily understood, and the present invention is not necessarily limited to that including all the configurations described above. Also, part of the configuration of one embodiment may be replaced with the configuration of another embodiment, and the configuration of one embodiment may be added to the configuration of another embodiment. Furthermore, another configuration may be added to part of the configuration of each embodiment, and part of the configuration of each embodiment may be eliminated or replaced with another configuration.

REFERENCE SIGNS LIST

1 . . . display apparatus, 2 . . . retroreflection plate (retroreflective plate), 3 . . . space image (air floating video), 105 . . . window glass, 100 . . . transparent member, 101 . . . polarization separator, 101B . . . polarization separator, 12 . . . absorptive polarization plate, 13 . . . light source apparatus, 54 . . . light direction conversion panel, 151 . . . retroreflection plate, 102, 202 . . . LED substrate, 203 . . . light guide, 205, 271 . . . reflection sheet, 206, 270 . . . retardation plate, 230 . . . user, 1000 . . . air floating video display apparatus, 1110 . . . controller, 1160 . . . video controller, 1180 . . . imager, 1102 . . . video display, 1350 . . . aerial operation detector, 1351 . . . aerial operation detection sensor

The invention claimed is:

1. An air floating video display apparatus comprising:
 a video display configured to display a video;
 a retroreflection plate which a light flux from the video display enters;
 an imager; and
 a controller,
 wherein the light flux reflected by the retroreflection plate forms an air floating video as a real image in air,
 wherein the controller can set a virtual position of a 3D model relative to the air floating video as a real image,
 wherein the video display displays a video resulting from a rendering process of 3D data of the 3D model based on a viewpoint position of a user detected from an image captured by the imager and the virtual position of the 3D model, and a video for stereoscopic viewing based on motion parallax for the 3D model is displayed in the air floating video as a real image, and
 wherein the virtual position of the 3D model set by the controller is a position shifted relative to a position of the air floating video which is a real image formed in air, in a direction opposite to a traveling direction of principal ray when the light flux reflected by the retroreflection plate forms the air floating video.

2. The air floating video display apparatus according to claim 1,
 wherein, as the virtual position of the 3D model set by the controller on a horizontal plane, a position of a geometric center point on a horizontal cross section of a bounding box indicating a spatial region in which the 3D model exists is set at the position shifted relative to the position of the air floating video which is a real image formed in air in a direction opposite to a traveling direction of principal ray when the light flux reflected by the retroreflection plate forms the air floating video.

3. The air floating video display apparatus according to claim 1, further comprising a GPU,
wherein the rendering process by the controller is a real-time rendering process by the GPU.

4. An air floating video display apparatus comprising:
a video display configured to display a video;
a retroreflection plate which a light flux from the video display enters;
an imager; and
a controller,
wherein the light flux reflected by the retroreflection plate forms an air floating video as a real image,
wherein the controller can set a virtual position of a 3D model relative to the air floating video as a real image,
wherein the video display displays a video resulting from a rendering process of 3D data of the 3D model based on a viewpoint position of a user detected from an image captured by the imager and the virtual position of the 3D model, and a video for stereoscopic viewing based on motion parallax for the 3D model is displayed in the air floating video as a real image, and
wherein the 3D model is a 3D model in which bones of Humanoid format are set, and at the virtual position of the 3D model set by the controller, a start point of the bone of buttocks of the 3D model is arranged at a position shifted relative to a position of the air floating video as a real image, in a direction opposite to a traveling direction of principal ray when the light flux reflected by the retroreflection plate forms the air floating video.

5. The air floating video display apparatus according to claim 1,
wherein, at the virtual position of the 3D model set by the controller, all the bones set in the 3D model are arranged on a far side as viewed from the user relative to the position of the air floating video as a real image.

\* \* \* \* \*